United States Patent
Parent et al.

(10) Patent No.: US 6,511,616 B1
(45) Date of Patent: Jan. 28, 2003

(54) SYSTEM AND METHOD FOR CURING A RESIN DISPOSED BETWEEN A TOP AND BOTTOM SUBSTRATE WITH THERMAL MANAGEMENT

(75) Inventors: Scott R. Parent, Saco, ME (US); Thomas M. Thibault, Saco, ME (US); Donald G. Parent, Windham, ME (US)

(73) Assignee: Steag HamaTech, Inc., Saco, ME (US)

( * ) Notice: Subject to any disclaimer, the term of this patent is extended or adjusted under 35 U.S.C. 154(b) by 132 days.

(21) Appl. No.: 09/717,827

(22) Filed: Nov. 21, 2000

Related U.S. Application Data

(62) Division of application No. 09/081,154, filed on May 19, 1998, now Pat. No. 6,254,809.

(51) Int. Cl.[7] .......................... B29D 11/00; B29D 17/00
(52) U.S. Cl. ................ 264/1.33; 156/275.5; 156/275.7; 156/379.8; 264/1.38; 425/174.4; 425/810; 425/143
(58) Field of Search ................................ 264/1.33, 106, 264/107, 347, 1.36, 1.38, 348; 425/174.4, 810, 143; 156/275.3, 275.7, 275.5, 379.6, 379.8

(56) References Cited

U.S. PATENT DOCUMENTS

| 3,946,367 A | 3/1976 | Wohlmut |
| 4,219,704 A | 8/1980 | Russell |
| 4,385,372 A | 5/1983 | Drexler |

(List continued on next page.)

FOREIGN PATENT DOCUMENTS

| DE | 3720525 | 12/1988 |
| EP | 574975 | 12/1993 |
| EP | 0744739 A1 | 11/1996 |
| EP | 793224 | 9/1997 |
| JP | 3-228061 | 10/1991 |
| JP | 4-023243 | 12/1992 |
| JP | 5-109126 | 4/1993 |
| JP | 6-176407 | 6/1994 |
| JP | 8-297868 | 11/1996 |
| JP | 10-079143 | 3/1998 |
| JP | 10-154360 | 6/1998 |
| JP | 10-255339 | 9/1998 |
| WO | WO 97/01657 | 1/1997 |
| WO | WO 97/36738 | 4/1997 |
| WO | WO 97/36737 | 10/1997 |
| WO | WO 97/43111 | 11/1997 |
| WO | WO 97/43760 | 11/1997 |

OTHER PUBLICATIONS

Patent Abstracts of Japan, vol. 097, No. 003, Mar. 31, 1997 (see above JP 8–297868).
Patent Abstracts of Japan, vol. 018, No. 519, Sep. 29, 1994 (see above JP 6–176407).
Patent Abstracts of Japan, vol. 017, No. 471, Aug. 26, 1993 (see above JP 50109126).
Patent Abstracts of Japan, vol. 016, No. 186, May 7, 1992 (see above 4–023243).
Patent Abstracts of Japan, vol. 016, No. 005, Jan. 8, 1992 (see above JP 3–228061).

(List continued on next page.)

Primary Examiner—Mathieu D. Vargot
(74) Attorney, Agent, or Firm—Hale and Dorr LLP

(57) ABSTRACT

A system and method cure a combination of a top and a bottom substrate with a resin disposed in-between. A cure platform includes a chuck on which the combination rests. A cure device cures the resin. An actuation assembly separates the chuck from the platform to thermally isolate the chuck during a curing operation performed by the cure device. A post cooling assembly may be provided to cool the chuck and the combination after a curing operation is performed by the cure device.

4 Claims, 55 Drawing Sheets

U.S. PATENT DOCUMENTS

| | | | |
|---|---|---|---|
| 4,450,553 A | 5/1984 | Holster | |
| 4,493,887 A | 1/1985 | Peeters et al. | |
| 4,735,878 A | 4/1988 | Hamersley et al. | |
| 4,905,215 A | 2/1990 | Hattori et al. | |
| 4,990,208 A | 2/1991 | Kano | |
| 5,009,818 A | 4/1991 | Arai et al. | |
| 5,093,174 A | 3/1992 | Suzuki et al. | |
| 5,126,996 A | 6/1992 | Ilda et al. | |
| 5,171,392 A | 12/1992 | Ilda et al. | |
| 5,202,875 A | 4/1993 | Rosen et al. | |
| 5,238,772 A | 8/1993 | Yashiro et al. | |
| 5,255,262 A | 10/1993 | Best et al. | |
| 5,279,866 A | 1/1994 | Bourget et al. | |
| 5,303,224 A | 4/1994 | Chikuma et al. | |
| 5,303,225 A | 4/1994 | Satoh et al. | |
| 5,538,579 A | 7/1996 | Ishimura et al. | |
| 5,540,996 A | 7/1996 | Hintz | |
| 5,676,809 A | 10/1997 | Billman | |
| 5,709,785 A | 1/1998 | LeBlanc, III et al. | |
| 5,744,193 A | 4/1998 | Kitano | |
| 5,779,855 A | 7/1998 | Amo et al. | |
| 5,785,793 A | 7/1998 | Arai et al. | |
| 5,888,433 A | 3/1999 | Amo | |
| 5,904,795 A | 5/1999 | Murakami et al. | |
| 5,916,368 A | 6/1999 | Ebert | |
| 6,107,608 A | 8/2000 | Hayes | |

OTHER PUBLICATIONS

Patent Abstracts of Japan, vol. 098, No. 011, Sep. 30, 1998 (see above JP 10–154360).

Patent Abstracts of Japan, vol. 098, No. 014, Dec. 31, 1998 (see above JP 10–255339).

Patent Abstracts of Japan, vol. 098, No. 008, Jun. 30, 1998 (see above JP 10–079143).

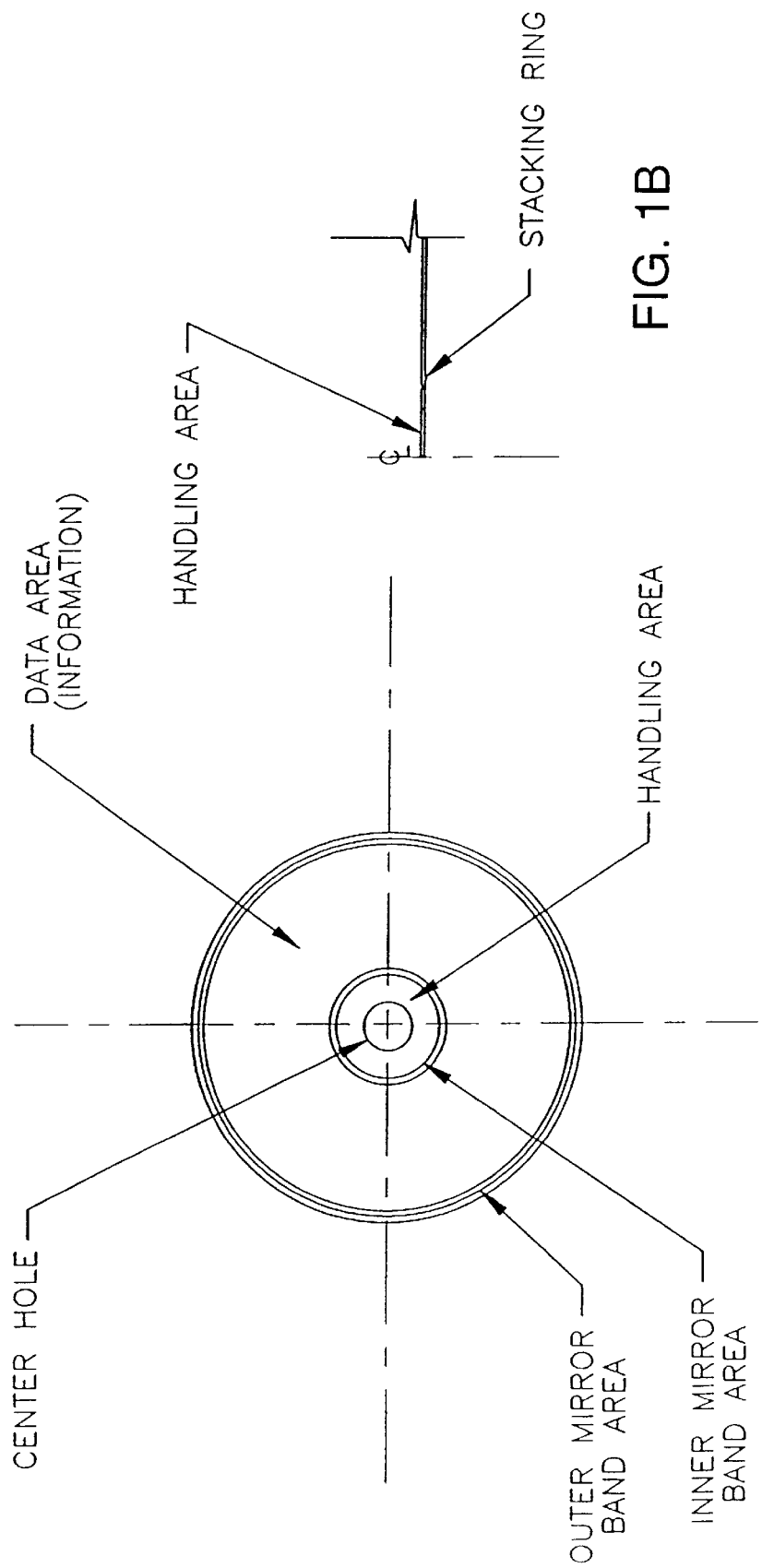

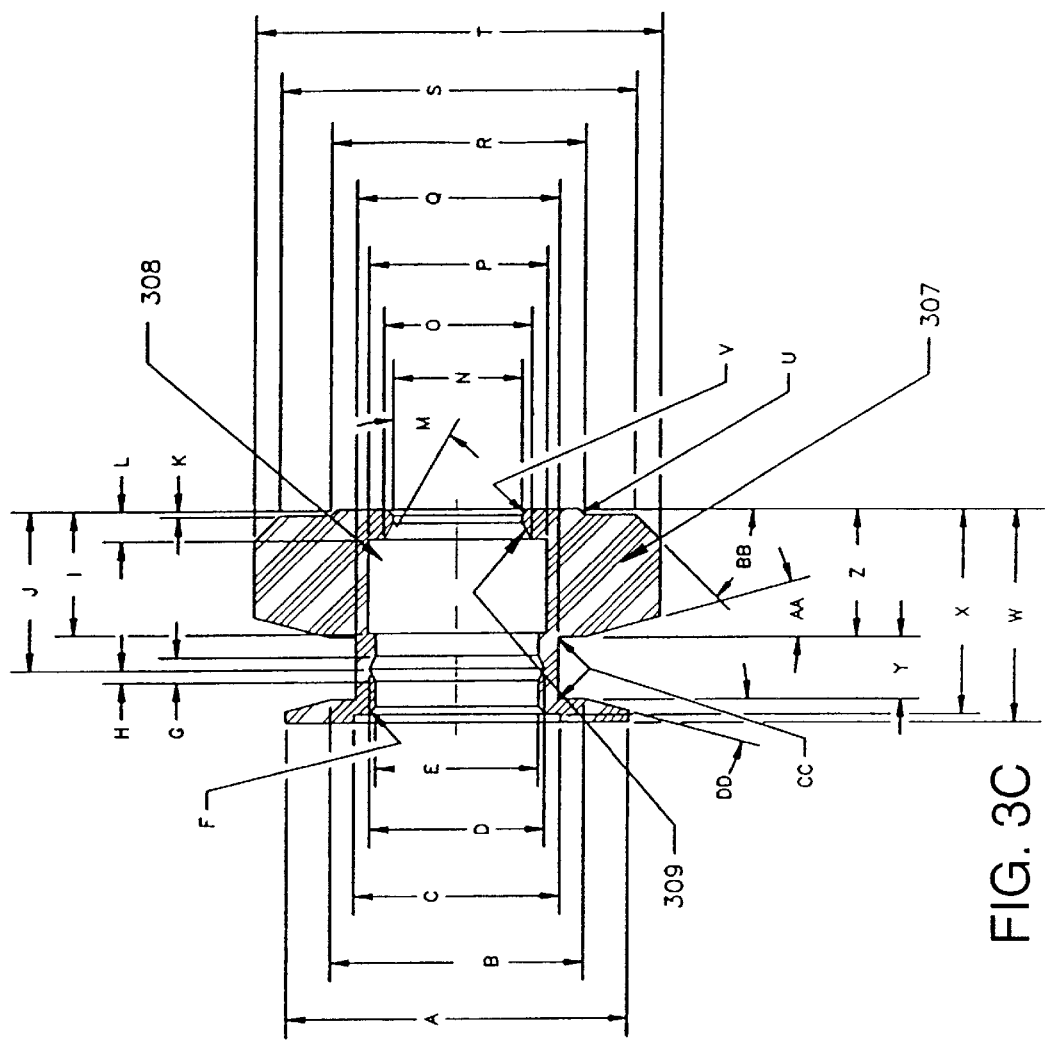
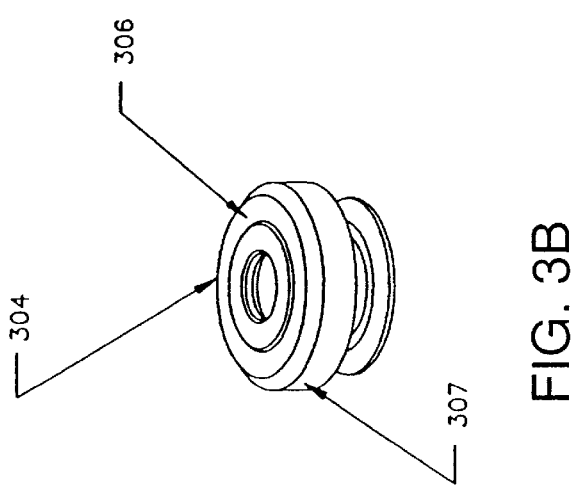
FIG. 3C
FIG. 3B

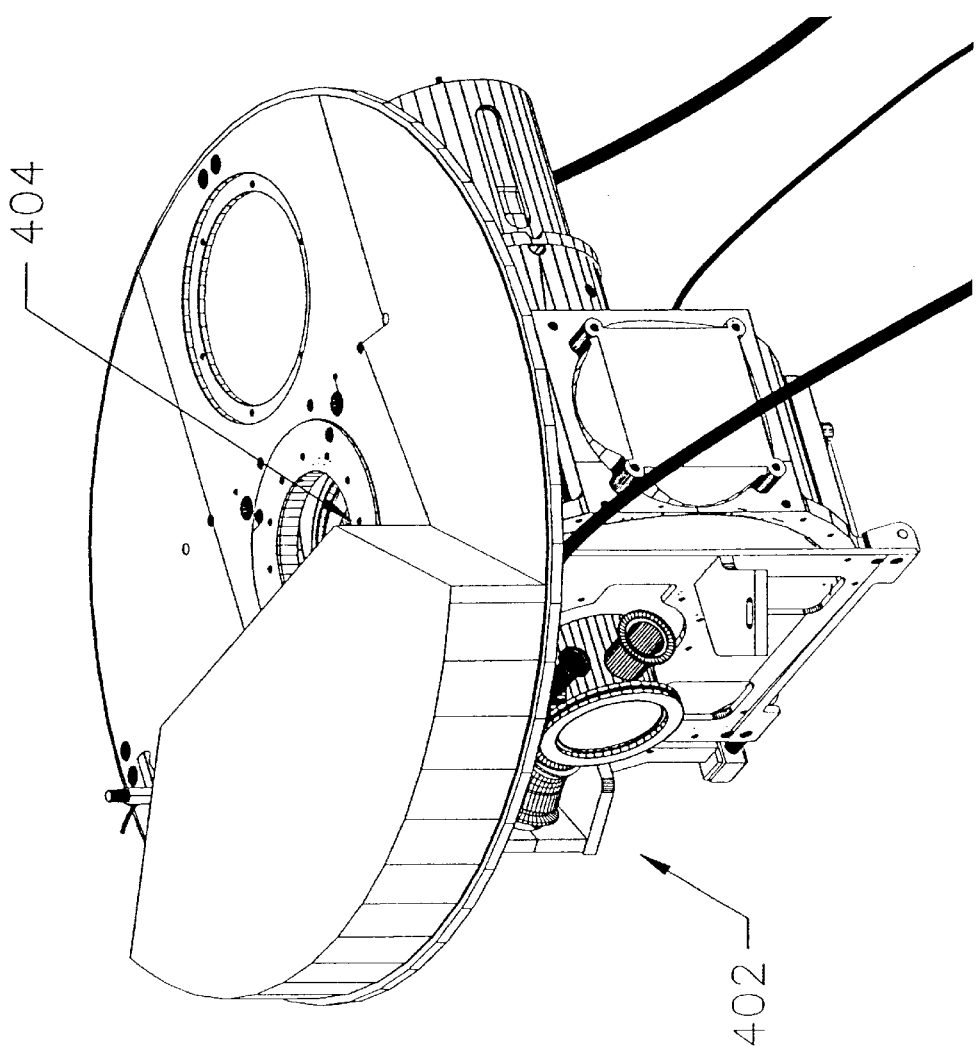

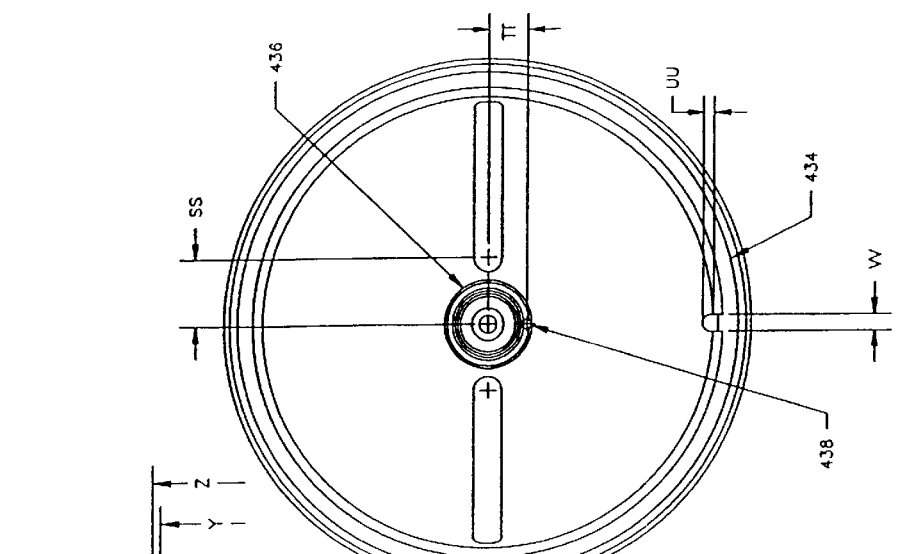
FIG. 4F
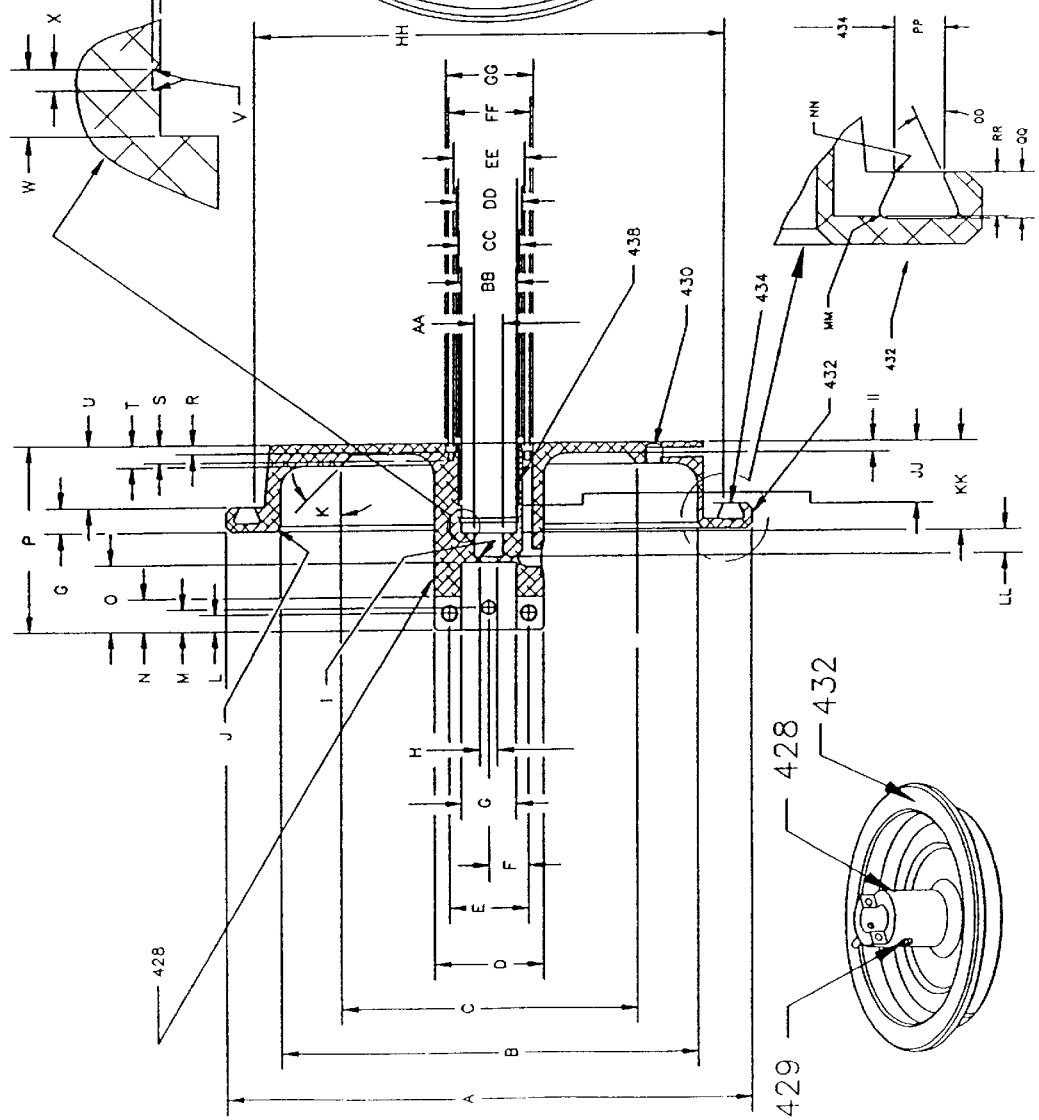
FIG. 4G
FIG. 4E

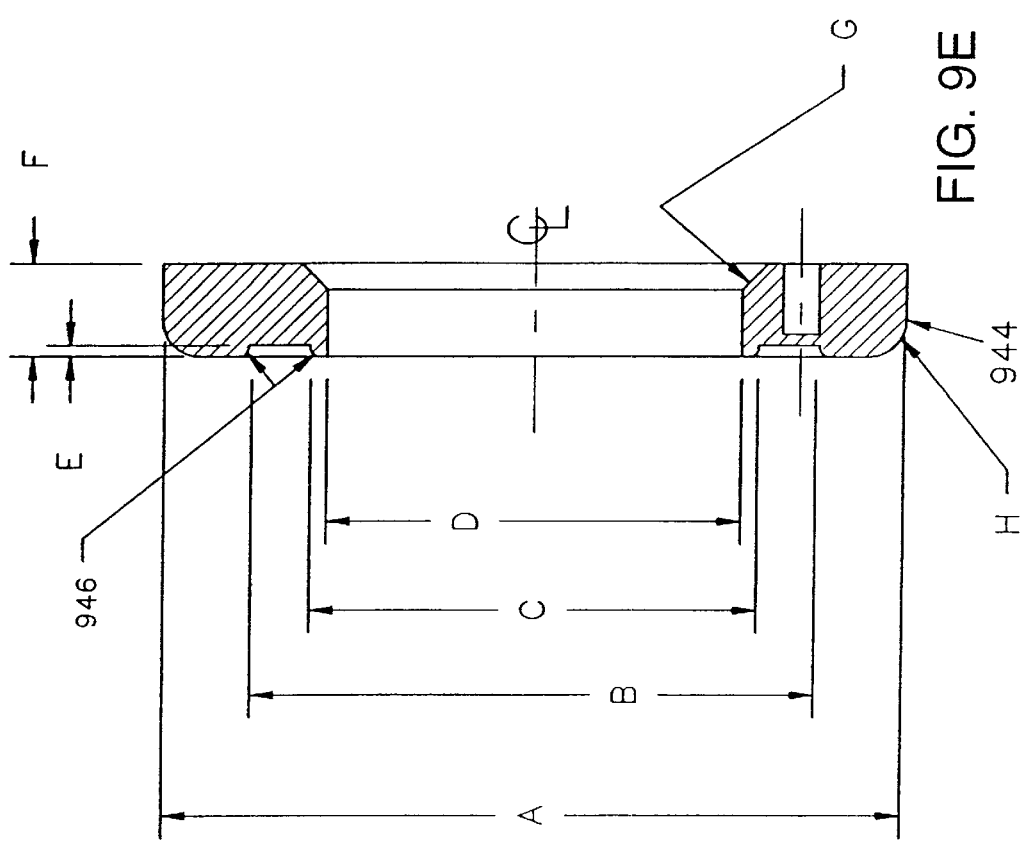
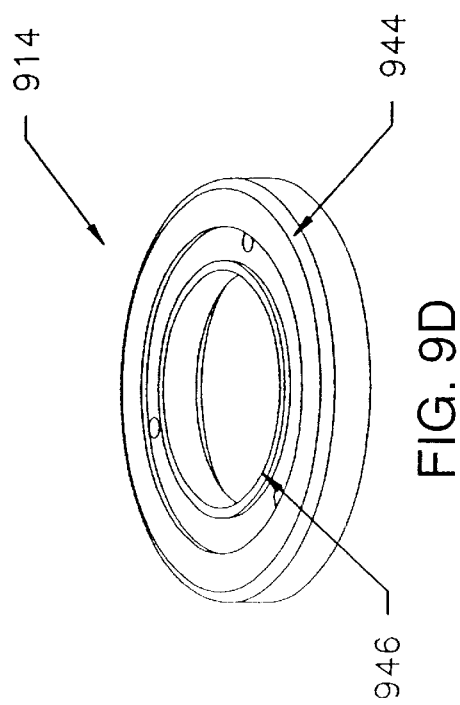
FIG. 9E
FIG. 9D

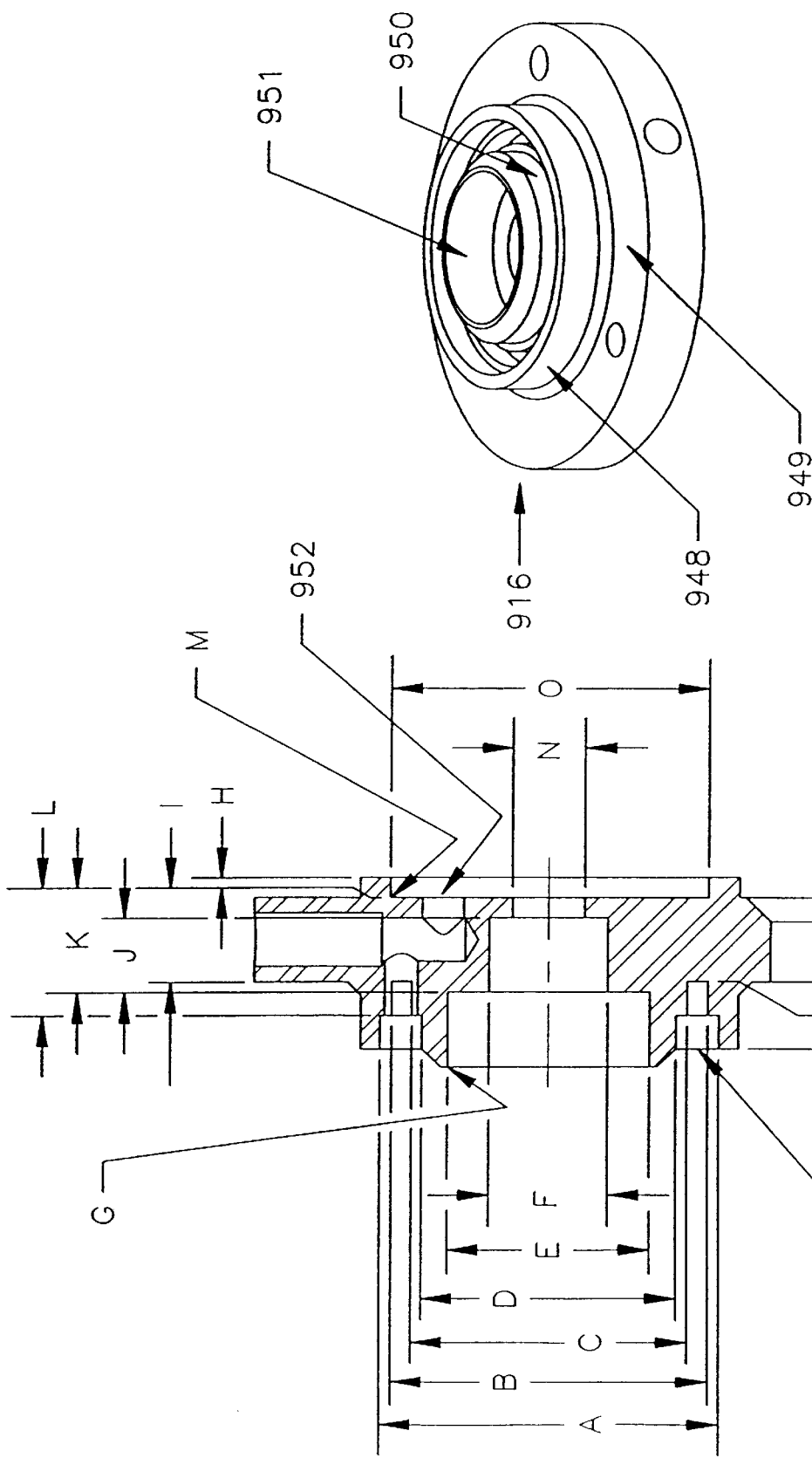

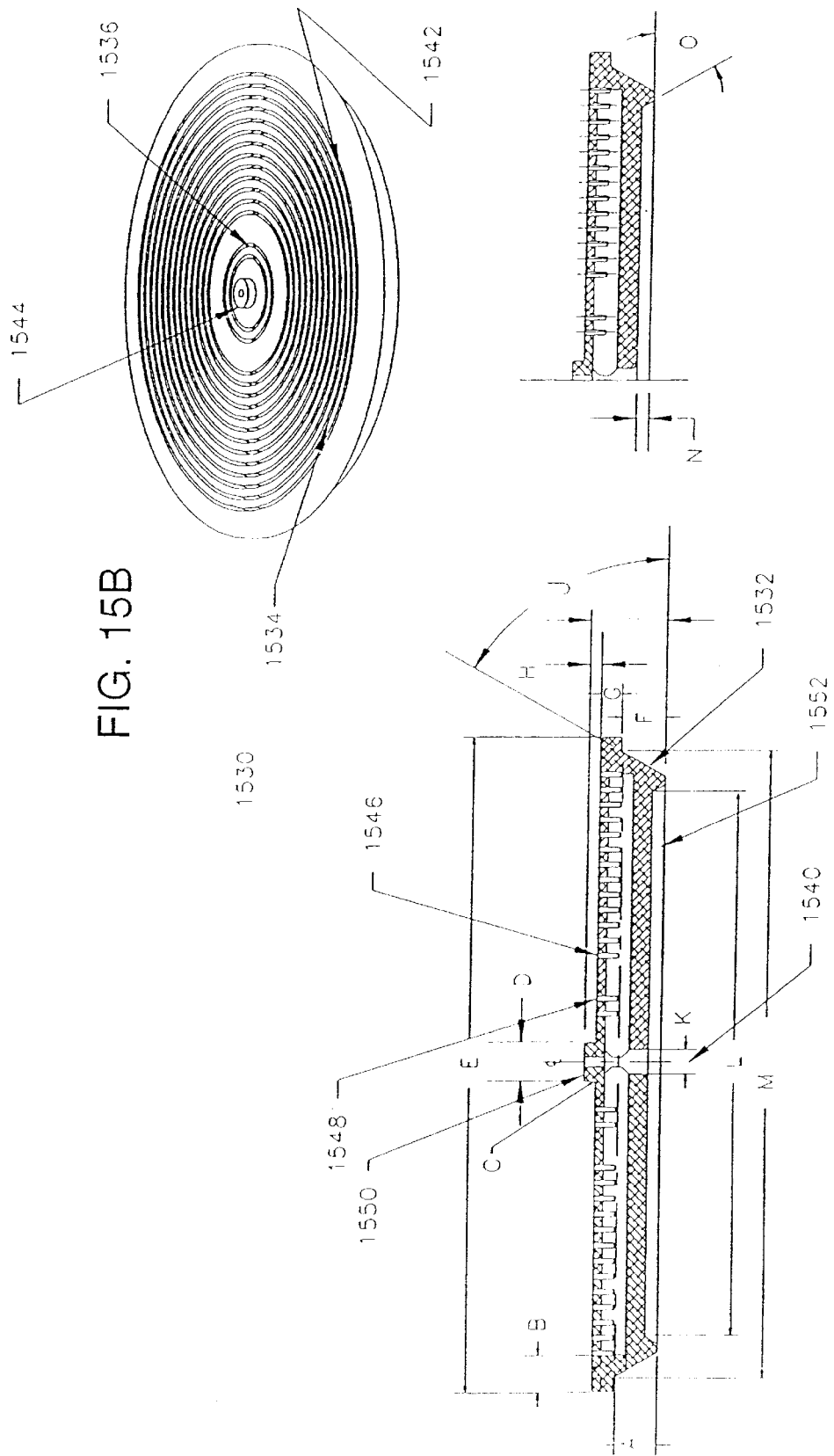

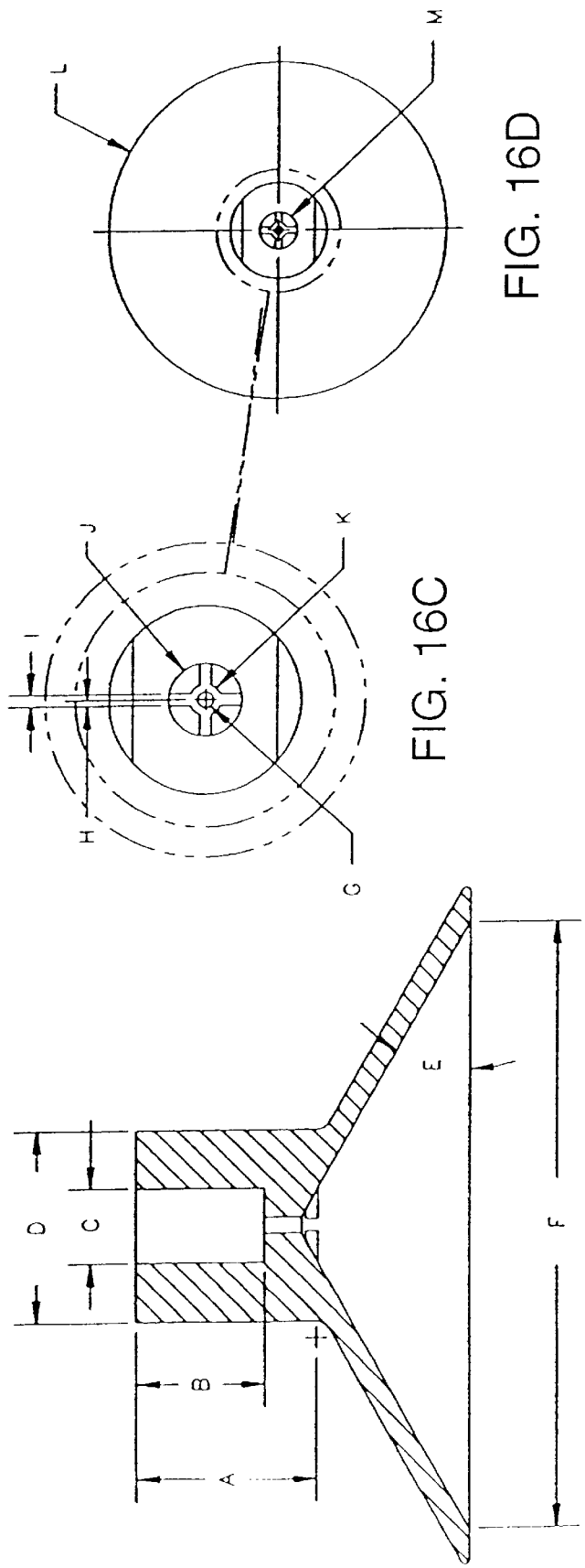

SYSTEM AND METHOD FOR CURING A RESIN DISPOSED BETWEEN A TOP AND BOTTOM SUBSTRATE WITH THERMAL MANAGEMENT

CROSS REFERENCE TO RELATED APPLICATION

This application is a divisional of now pending U.S. patent application Ser. No. 09/081,154 filed on May 19, 1998 now U.S. Pat. No. 6,254,809

This application is related to the following applications, all of which are filed on the same date that this application is filed, all of which are assigned to the assignee of this application, and all of which are incorporated by reference in their entirety:

System and Method for Maintaining Concentricity of a Combination of a Top and Bottom Substrate During the Assembly of a Bonded Storage Disk (U.S. patent application Ser. No. 09/081,115);

System and Method for Thermally Manipulating a Combination of a Top and Bottom Substrate Before a Curing Operation (U.S. patent application Ser. No. 09/081,153);

System and Method for Forming Bonded Storage Disks with Low Power Light Assembly (U.S. patent application Ser. No. 09/081,536);

System and Method for Dispensing a Resin Between Substrates of a Bonded Storage Disk (U.S. patent application Ser. 09/081,116);

System and Method for Distributing a Resin Disposed Between a Top and Bottom Substrate (U.S. patent application Ser. No. 09/081,537); and Improved System and Method for Curing a Resin in a Bonded Storage Disk(U.S. patent application Ser. No. 09/081,117).

BACKGROUND OF THE INVENTION

1. Field of the Invention

This invention relates to bonded storage disks and, more particularly, to improved methods of and systems for forming bonded storage disk, such as digital versatile disks ("DVDs").

2. Discussion of Related Art

Two popular forms of storage media are compact disks ("CDs") and digital versatile disks ("DVDs"). Each is a form of a bonded storage disk. A bonded storage disk has two or more substrates held together by a cured bonding agent. At least one of the substrates is formed to have "pits," the distribution of which is representative of the information to be stored on the disk. These pits are metallized so that when they are "hit" by an optical signal they will reflect a signal indicative of the pit and thus the information.

Because of their ability to store vast amounts of information, DVDs have been well received in the market. To date, there are four specified DVD formats: DVD5, DVD9, DVD10, and DVD18. DVD5 is a single-sided, single-layered format (see FIG. 1C); DVD9 is a single-sided, dual layered form (see FIG. 1E); DVD10 is a dual-sided, single-layered format (see FIG. 1D); and DVD18 is a dual-sided, dual-layered format (see FIG. 1F). "Single-sided" means that the disk is intended to be read from one side only. "Dual-sided" means that the disk may be read from either side, with each side storing information. "Single-layered" means that for a given side there is one "layer" of information only. In this regard, a layer of information would mean a distribution of metallized pits 4, which when hit with a light source 9 will reflect an information-carrying optical signal. "Dual-layered" means that for a given side there are two layers 4 of information. The specifications are provided in the DVD Book, v. 1.0, by the DVD Forum, which is hereby incorporated by reference in its entirety. The Figures are not to scale. For example, in actuality the substrate 6 is about 0.6 mm thick; for DVD9 the bonding layer 8 is about 50 microns thick ±15 microns, ±10 microns within a DVD, and ±4 microns within a revolution; and the metallization layer 4 is on the order of tens of nanometers.)

The formats specify several, but not all, characteristics of a disk. For example, referring to FIGS. 1A–F, which show a plan view of a DVD and a cross-section view of DVD5, DVD9, DVD10, and DVD18 formats, the formats specify the inner diameter of the center hole, the outer diameter of the DVD, the handling area, the inner mirror band, the data area, and the outer mirror band. They also specify the shape and location of a stacking ring, the pit size, the reflectivity of the metal layers and the type of the metal, and for some formats the thickness and optical characteristics of the bonding agent used to form bond layer 8. In addition, the specifications list acceptable tolerances of certain "bulk parameters," such as "radial tilt" and "tangential tilt." The specifications also specify the thickness of the bonding layer and the acceptable amounts of bubbles and contaminants.

On the other hand, some aspects are undefined. For example, commercially-available substrate molding machines produce substrates having machine-specific moat locations and shapes. In the art, for example, there are known 22 mm moat geometries and 34 mm moat geometries. In addition, though the reflectivity of the metal layers is specified (sometimes by minimums, other times by minimums and maximums) the actual amount of metallization is not.

Typical DVD players include an optical reading mechanism for transmitting an optical signal to a surface of the DVD and for reading a reflected signal. Typically, this mechanism will read a bottom surface of the DVD, as perceived by an end-user and a DVD player. For two-sided formats, the DVD needs to be flipped to read the other side of the DVD. For dual-layer formats, the player adjusts the focus of the optical signal to read a given layer of the two layers of a given side. One orientation is used to illuminate a semi-reflective layer (which would be nearest to the read mechanism) and another orientation is used to illuminate a reflective layer (which would be farthest from the read mechanism). When reading the reflective layer, the optical signal passes through the semi-reflective layer and the bond layer on its way to and from the reflective layer, thus making the bond layer an optical component.

To date, manufacturing DVDs has been problematic, especially for dual-layer formats and especially for achieving desirable yields. In part this is the result of the extremely tight manufacturing tolerances specified by the formats and required by the market. In other part this is due to the complexities introduced with the dual-layer arrangements having the bonding layer be an optical component of a DVD.

Known systems are operating at undesirably low yields. Moreover, due to the difficulty in manufacturing these disks, many if not all DVD manufacturing systems operate as batch processes. These are undesirable because they require partially completed disks to be stored and staged before a subsequent manufacturing step is performed, thus increasing the cost and complexity of manufacturing.

Consequently, there is a need in the art for a system and method that can manufacture DVDs, including dual-layered disks, at high yields. There is also a need in the art for an in-line system that can manufacture DVDs, including dual-layer format DVDs, at acceptable yields.

SUMMARY

Under a preferred embodiment, a system and method cure-a combination of a top and a bottom substrate with a resin disposed in-between. A cure platform includes a chuck on which the combination rests. A cure device cures the resin. An actuation assembly separates the chuck from the platform to thermally isolate the chuck during a curing operation performed by the cure device.

Under another preferred embodiment, a post cooling assembly cools the chuck and the combination after a curing operation is performed by the cure device.

BRIEF DESCRIPTION OF THE DRAWING

In the drawings,

FIGS. 1A–F show the geometries of DVDs according to known DVD formats;

FIGS. 3A–E show an exemplary conveyor;

FIGS. 4A–I show an exemplary metallization station;

FIGS. 9A–K show an exemplary bottom station;

FIGS. 15A–H show an exemplary cure table assembly;

FIGS. 16A–D show an exemplary pre-cooling device;

DETAILED DESCRIPTION

Preferred embodiments of the invention provide an in-line manufacturing system that attains high yields for bonded storage disks even for dual-layer formats. The system and method include novel resin dispensing, resin spinning, resin curing, and thermal management of the disks and the system. They also include novel aspects in the handling of substrates.

In this description, unless otherwise noted, reference to a top or a bottom substrate refers to a manufacturing perspective in which a top substrate is positioned above a bottom substrate during assembly of a DVD. This reference is the same as that of a DVD player's perspective except for DVD9 format in which case the top substrate from the manufacturing perspective will be the bottom substrate from the DVD player's perspective.

1. OVERALL SYSTEM

Figure 2:
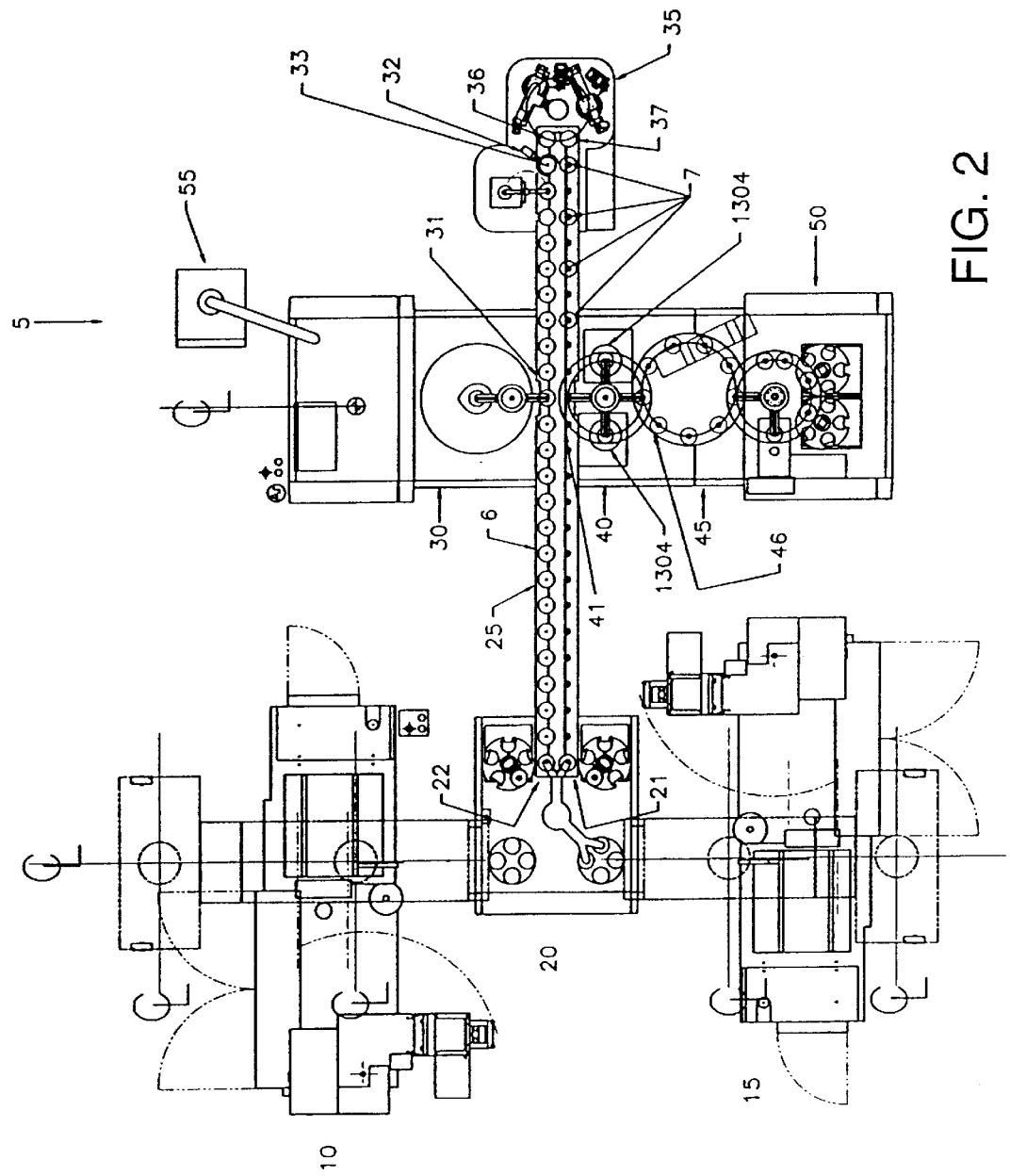
FIG. 2 is a plan view of an exemplary system.

FIG. 2 is a plan view of an in-line manufacturing system 5 according to a preferred embodiment of the invention, shown working in conjunction with commercially-available molding machines 10, 15 and in-feed handling system 20.

The preferred system is capable of making, under programmatic control, DVDs according to the DVD5, DVD9, and DVD10 formats.

Each exemplary mold station provides 0.6 mm disk substrates 6. One machine produces a top substrate for an eventual DVD and the other produces a bottom substrate. Each substrate has a distribution of "pits" representative of the information stored by the eventually-formed DVD. As explained above, the top substrate for DVD5 has no information layer.

The substrates 6 are received by in-feed station 20, which may perform some initial handling and processing steps (e.g., ionization), and which transfers the substrates on to conveyor 25.

The conveyor 25 carries the substrates 6 in a sequence of neighboring top and bottom substrates to metallizer station 30, which forms a reflective or semi-reflective metallization layer on one side of a substrate 6 and which transfers metallized substrates back on to the conveyor 25. All substrates 6 are metallized except for DVD5 format in which case every bottom substrate is metallized.

The conveyor 25 then carries the substrates 6 with the metallization face-up to dispense station 35. The dispense station 35 includes mechanisms for arranging two consecutive substrates 6 (i.e., a top and bottom substrate) into alignment, with metallized surfaces facing each other in a bowed relationship to receive a V-curable bonding agent ("resin") in fluid state between the two aligned substrates. The mechanisms form a ring-like capillary bridge of resin between the top and bottom substrates. A resulting combination 7 of substrates and bonding agent ("combination") is transferred back to conveyor 25.

The conveyor 25 then carries the combination 7 to spin station 40. This portion of conveyor 25 will be populated with combinations 7 at every other conveyor index. The spin station 40 and dispense station 35 are separated to allow capillary forces sufficient time to cause a desirable distribution of the resin extending to, but not beyond, the moats of the substrates. The spin station 40 spins the combination to distribute the resin more evenly and to better fill the space between the two substrates.

The spun combination 7 is then transferred to cure station 45. Cure station 45 subjects the combination to a thermally-managed UV cure process to cure the bonding agent and bond together the two substrates of a combination 7 to form a DVD.

The DVD is then transferred to finishing station 50, which performs quality assurance testing and transfers the cured DVD to an appropriate rack of acceptable DVDs or rejected DVDs.

The various stations are managed, monitored, and controlled by control station 55. As will be explained below in context, control consists of the proper sequencing of a variety of pneumatical and electrical actuation in conjunction with the proper sequencing of vacuum and activation of valves and pumps. To keep the figures uncluttered, plumbing lines for resin, vacuum, and electrical signals are omitted, as are other conventional mechanisms such as pumps, tanks, and the like.

The discussion below is often described in relation to advancing a substrate 6 or combination 7 by "index" position. In this regard, unless otherwise noted, one index position corresponds to a unit of time. This unit of time in turn will depend on the type of DVD being manufactured, as will be explained below. Thus, distances measured in index positions correlate to time. Because the control of the system is effectively event driven, the index time may fluctuate and may involve some jitter.

The various stations and conveyor are enclosed and include air-cleaning mechanisms to attain a class 100 cleanroom rating. Unless otherwise noted references to vacuum means about 22 inches of water.

2. MOLDING STATIONS

The system 5 is designed to work with automated injection molding stations 10, 15 to provide molded substrates 6. Exemplary molding stations include the Discjet 600 from Netstal and the SD30 from Sumitomo. Though the DVD specification calls for a finished inner diameter of 15 mm, the system 5 preferably operates with substrates having inner diameters of between 15.04 mm and 15.08 mm to facilitate the handling of substrates.

3. IN-FEED STATION

An exemplary in-feed station 20 is the FLT U3000 available from First Light Technology, Inc., with software control to ensure that top-bottom pairs of substrates are presented to the conveyor 25. Conveyor index 21 receives a top substrate and index 22 receives a bottom substrate for DVD5 and DVD10 formats (stacking ring, if any, projecting down); for DVD 9 this top-bottom positioning is reversed. Both substrates are placed stacking ring down, moat side up.

4. CONVEYOR

Referring to FIG. 2, under a preferred embodiment, there are 14 index positions between in-feed station 20 (index position 22) and metallization station 30 thus corresponding to a time delay of approximately 32 seconds. During this time, the cooling fans are activated to cool the substrates 6 from approximately 250° F. to approximately 80° F. There are 10 index positions between the dispense station 35 (index position 37) and the spin station 40 thus corresponding to a time delay of approximately 23 seconds. Each index is separated from a neighboring index by about 3 inches.

The structure of the conveyor 25 is shown better in FIGS. 3A–E. Conveyor 25 includes a drivable, programmatically-controllable track 300 having "index" positions defined by spring-loaded, substrate-centering conveyor arbors 302 that project upward through a center of a conveyor nest 304 on which substrates or combinations may rest. The conveyor uses conventional driving and cooling technology and enclosures, such as that used in the U3000 family of systems from First Light, Inc, but has improved arbors 302 and nests 304. The conveyor 25 includes a stand (not shown) to align conveyor nests 304 with the various stations to which and from which substrates 6 or combinations 7 are transferred, as described below.

Conveyor nest 304 is shown more particularly in FIGS. 3B–C, in perspective and cross-section views. The nest 304 is preferably made of ultra high molecular weight ("UHMW") plastic but could be made of any other material that is suitably smooth and that has a similar wear character. FIG. 3C particularly shows the production dimensions of a preferred nest 304. The sizes of the dimensions measured in inches are shown in Table 1, below.

TABLE 1

| dimension | size |
| --- | --- |
| A | 1.69 |
| B | 1.25 |
| C | 1.02 |
| D | 0.868 |
| E | 0.808 |
| F | 0.04 × 45° |
| G | 0.125 |
| H | 0.063 |
| I | 0.062 |
| J | 0.792 |
| K | 0.03 |
| L | 0.149 |
| M | 30° |
| N | 0.640 |
| O | 0.734 |
| P | 0.886 |
| Q | 1.002 |
| R | 1.25 |
| S | 1.75 |
| T | 2.00 |
| U | 45° |
| V | 0.04 × 45° |
| W | 1.062 |
| X | 1.023 |
| Y | 0.309 |
| Z | 0.637 |
| AA | 15° |
| BB | 45° |
| CC | .010 RAD. |
| DD | 15° |

Figure 3A:
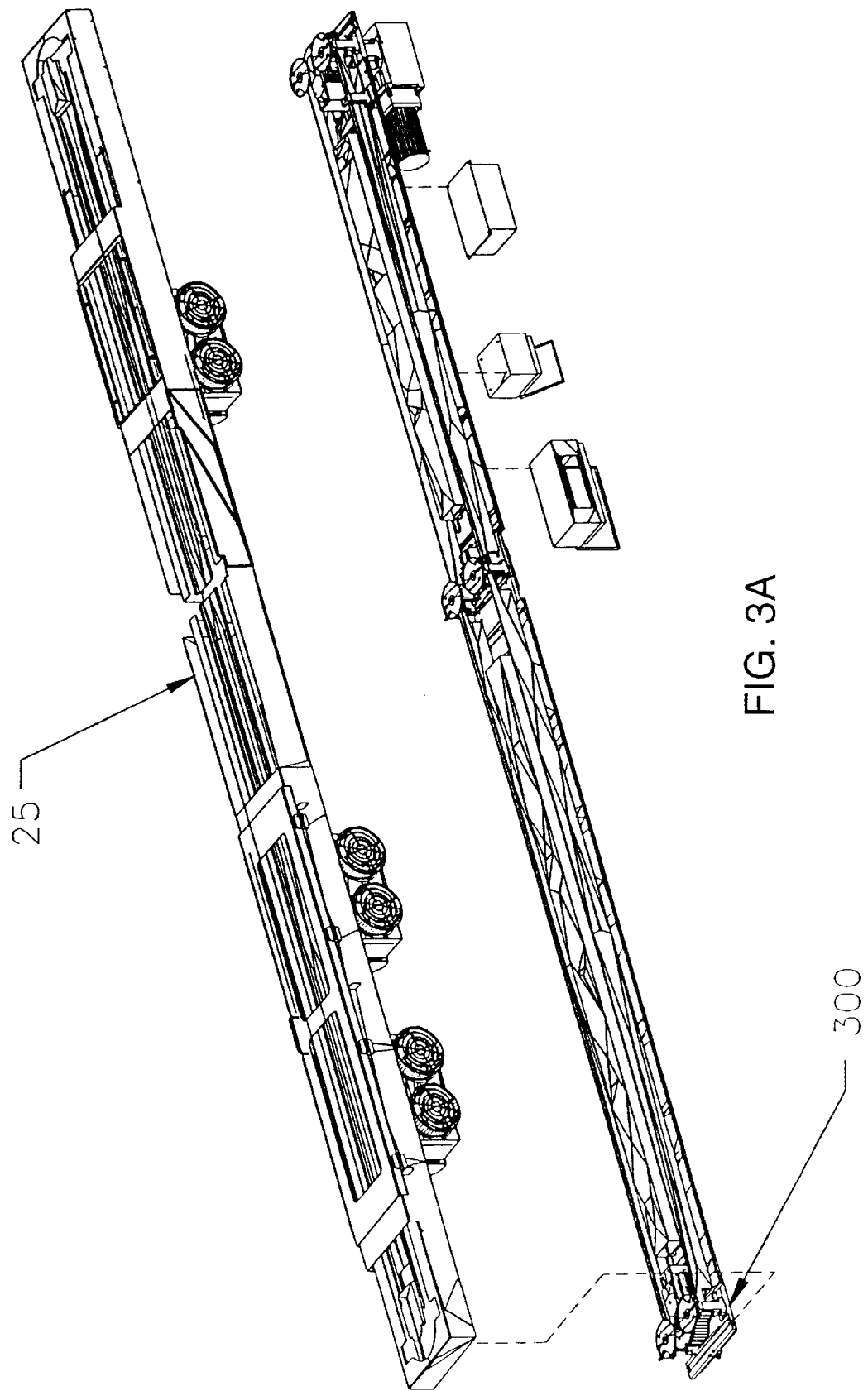
Figure 3E:
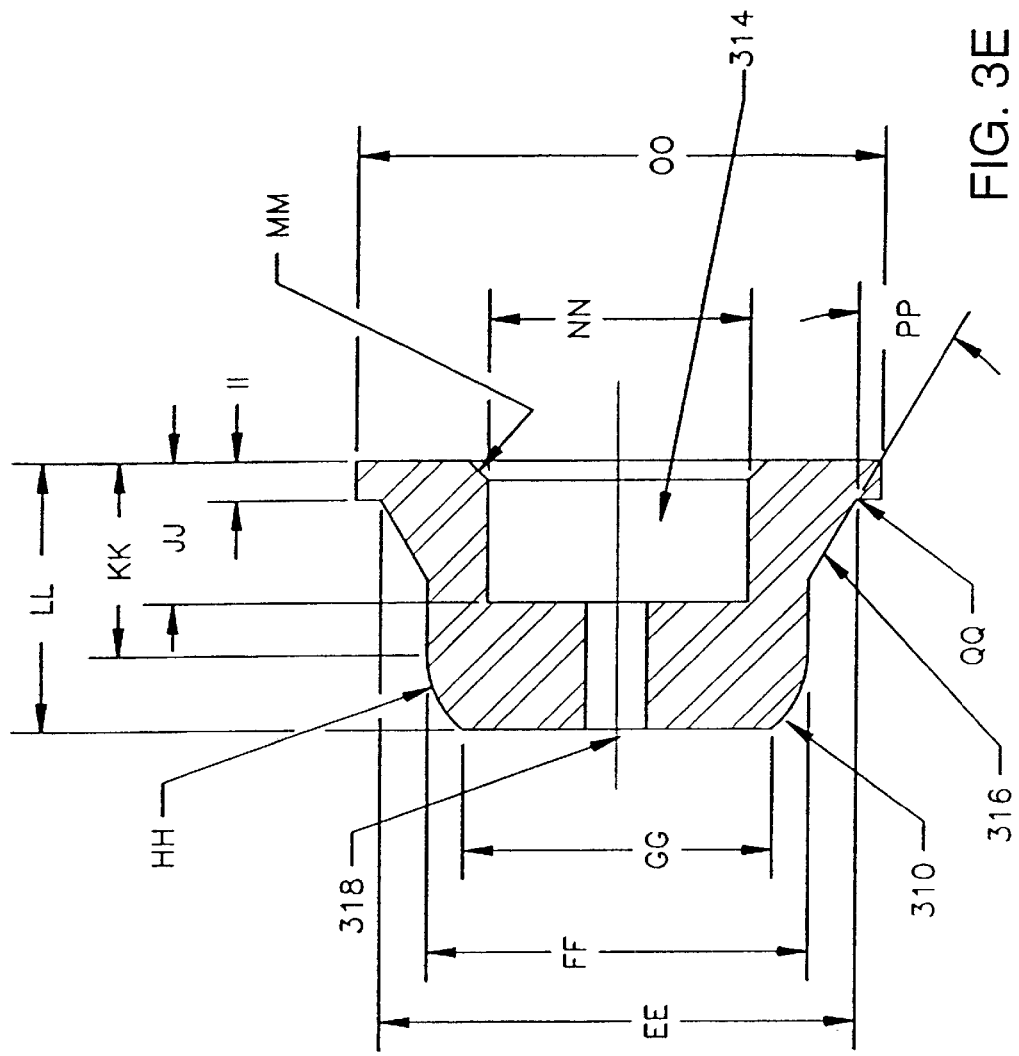
Figure 3D:
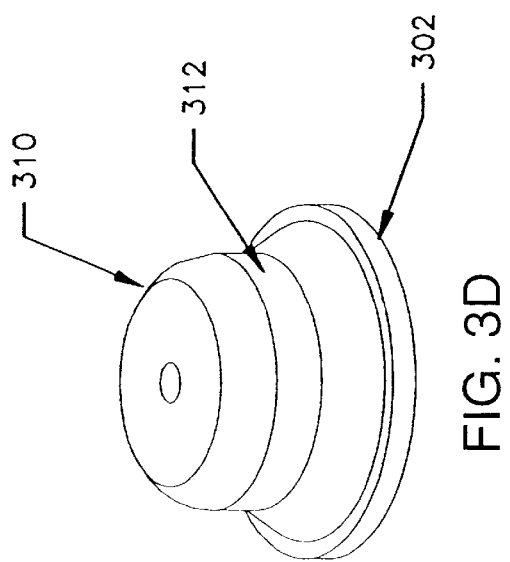

Though some aspects of nest 304 are the result of legacy issues concerning the conventional driving mechanisms, other aspects of the shape are novel. An upper surface 306 has an outside diameter wide enough to support the handling area of a substrate 6 and has a hole 308 through which a conveyor arbor 302 (see FIGS. 3D–E is positioned. More specifically, the internal bore of the hole 308 has a diameter, length, and beveled shape 309 chosen to mate with a preferred conveyor arbor 302, so that the arbor 302 may be biased upwardly through the hole, but stopped by bevel 309 so that arbor 302 centers itself. The hole 308 also allows the arbor 302 to be depressed downward through the hole 308 below the surface 306. This allowable movement in conjunction with the spring-loaded nature and shape of the arbor 302 forms part of a concentricity constraint for eventually formed combinations 7. The other part of the concentricity constraint is formed by pick heads of handling robots, discussed below.

Conveyor arbor 302 is shown more particularly in FIGS. 3E–G, in perspective, cross-section, and plan views. The arbor 302 is preferably made of hardened and polished tool steel that is electro-less nickel plated. FIG. 3E particularly shows the production dimensions of a preferred arbor 302. The sizes of the dimensions measured in inches are shown in Table 2, below.

TABLE 2

| dimension | size |
| --- | --- |
| EE | 0.730 |
| FF | 0.587 |
| GG | 0.474 |
| HH | 0.150 RAD. |
| II | 0.060 |
| JJ | 0.22 |
| KK | 0.302 |
| LL | 0.419 |

TABLE 2-continued

| dimension | size |
|---|---|
| MM | 0.03 × 45° |
| NN | 0.40 |
| OO | 0.806 |
| PP | 30° |
| QQ | 0.004 RAD. |

The arbor 302 is shaped to fit into upper portion 307 of nest 304, yet be constrained from entirely passing through the hole 308. Angled portion 316 mates with beveled portion 309 of nest 304, so that the arbor may center itself when projecting upward. The arbor 302 is also shaped to allow its downward movement through the bore of hole 308. Arbor 302 includes an inner recess 314 to receive a stainless steel biasing spring (not shown) to allow the arbor 302 to move vertically in response to the application and removal of force. The other end of the spring rests against a plate (not shown) carried by conveyor 25. A preferred spring has a diameter of 0.375 inches, a length of 1.75 inches and a wire diameter of 0.035 inches. When upwardly biased by the spring, the arbor 302 projects above the upper surface 306 of the conveyor nest 304 by about 0.25 inches. In response to the application of downward force, the arbor can be pushed below surface 306 of nest 304. This allowable movement forms part of a concentricity constraint for eventually formed combinations 7. A rounded edge 310 of an upwardly projecting portion 312 of the arbor facilitates the handling of the substrates to transfer them on or off the arbor 302. This is so because the handling robot only needs to center the i.d. hole of a substrate on the approximately 0.47 inch diameter of the upper portion of the arbor 302, and gravity in conjunction with the low friction surface will cause the substrate to nest around the approximately 0.587 diameter of a lower portion of the upwardly projecting portion 312. Hole 318 is used to receive mounting hardware (not shown).

5. METALLIZATION STATION

A preferred metallization station 30 (see FIG. 2) includes a dual cathode sputtering device 402 (see FIG. 4A) and a two-arm metallizer robot 400 (see FIGS. 4B–I). The sputtering device 402 and robot 400 are mounted on stands (not shown) to place them in alignment with the conveyor 25 (see FIG. 2), as described below.

The metallization station 30 is responsible for receiving substrates 6 pit-side up and producing metallized substrates with metallization face up. The metallization covers the pits within a predetermined range of reflectivity to produce an information layer.

a. Operation

In operation, pick heads 406 and 408 are actuated downward to simultaneously vacuum-grab a metallized substrate from opening 404 and a substrate 6 from conveyor 25 at index position 31 (see FIG. 2). During the same index interval that the substrates are grabbed, i.e., without advancement of the conveyor 25, the pick heads are actuated upward to lift the grabbed substrates, rotate 180° about axis 410, and lower and release a substrate 6 to device opening 404 and a metallized substrate to the conveyor 25 at index 31.

The substrate grabbed from index 6 is subsequently sputtered by the sputtering device 402, under programmatic control, to metallize a top surface of a received substrate with one of either a reflective or semi-reflective metal. The substrate grabbed from device 402 and released on the conveyor 25 is carried to dispense station 35.

For DVD5 format, every bottom substrate on the conveyor 25 is sputtered with aluminum and every top substrates is unsputtered. Under a preferred embodiment, the top substrates are not grabbed by the metallizer robot and instead immediately advance to the dispense station. This causes a certain off-set between the pairs of substrates that were initially presented to the conveyor 25, but the sequence of top-bottom substrates is maintained. In another embodiment, the top substrate is presented to the sputtering device but is not metallized. For DVD9 format, every top substrate is sputtered with aluminum., for example, and every bottom substrate is sputtered with gold, for example. For DVD10 format, every substrate is sputtered with aluminum.

b. Sputtering Device

A preferred dual-cathode sputtering device 402 is described in U.S. Pat. No. 5,709,785, which is hereby incorporated by reference in its entirety. For the sake of brevity that description is not repeated here. The sputtering device 402 is capable of receiving a substrate 6 once every index interval and providing a metallized substrate once every index interval. There is a four index interval delay between the time when a substrate 6 is presented to the sputtering device 402 and when it emerges. The sputtering device 402 may be controlled to sputter a given substrate with one of the two cathode metals, e.g., aluminum or gold. In this fashion, the substrates may be sputtered with a reflective or semi-reflective material to form one of the information layers specified in a DVD format.

Under a preferred embodiment, the sputtering device is controlled to provide between 60–70% reflectivity for the reflective surface for DVD5; about 24% reflectivity for the semi-reflective surface and 60–70% reflectivity for the reflective surface for DVD9; and for about 60–70% reflectivity for DVD10. Like other process parameters the amount of reflectivity may be adjusted by the user. Moreover it has been discovered by the inventors that the distribution of metal layer 4 is not even; the sides of the pits have substantially less metal than the tops.

c. Metallizer Robot

Under a preferred embodiment, the metallizer robot 400 rotates 180° about axis 410 under programmatic control of rotary servo 412. The pick heads 406 and 408 are mounted to pistons 405 which are programmatically controlled to move downward and upward. Each pick head 406 and 408 includes a load-lock assembly 414 to mate with an opening 404 of the sputtering device 402 to create a suitable vacuum seal.

More specifically, the servo 412 (part no. CP DR-5030B available from Compumotor) is mounted on a plate 416 which holds end stops 418 to prevent over-rotation and limit switches 420 to further facilitate in the prevention of over-rotation. Plate 416 is mounted to adapter 422 which is used to mount the robot 400 on a stand (not shown). Sheath 422 is used to hold plumbing (not shown).

An upper portion 413 of robot 400 is mounted to servo 412 with mounting hardware 411 and includes a cap 423 and equal length and radial arms 424 and 425 to which are mounted pneumatically-controllable pistons 405. Aluminum load-lock assemblies 414 mount to pistons 405 (part no.

CDQ2KWB32-UIA970655 available from SMC) and include a gasket 415 (part no. 2-356B70 available from National) mounted in recess 434 on the polished underside of lip 432 to help seal the assembly 414 with sputtering device opening 404 when so positioned. With particular reference to FIGS. 4E–G, an inner diameter ring 426 ("i.d. ring") is compression fit into annular chamber 436 on the underside of load-lock assembly 414 and is in fluid communication with vacuum port 429 by a 0.113 inch diameter gland 438 in housing portion 428. A preferred embodiment uses an i.d. ring 426 available from First Light, Inc. as part no. 10108. By application of vacuum to port 429 the ring 426 may be caused to vacuum grab a substrate 6 within a handling region of the substrate 6. Vacuum port 430 is used to create a vacuum within opening 404 of the sputtering device, before a substrate is presented into an inner chamber (not shown) of device 400.

FIGS. 4E–G particularly show the production dimensions of a preferred load lock assembly 414. The sizes of the dimensions measured in inches are shown in Table 3, below.

TABLE 3

| dimension | size |
|---|---|
| A | 6.00 |
| B | 4.75 |
| C | 3.38 |
| D | 1.25 |
| E | 0.906 |
| F | 0.453 |
| G | 0.6305 |
| H | 0.199 |
| I | .005/.010 |
| J | .06 × 45° |
| K | 45° |
| L | 0.188 |
| M | 0.250 |
| N | 0.385 |
| O | 0.766 |
| P | 2.134 |
| Q | 0.28 |
| R | 0.085 |
| S | 0.2 |
| T | 0.25 |
| U | 0.721 |
| V | .005 RAD. |
| W | 0.173 |
| X | 0.055 |
| Y | 0.625 |
| Z | 0.665 |
| AA | 0.366 |
| BB | 0.625 |
| CC | 0.689 |
| DD | 0.753 |
| EE | 0.82 |
| FF | 0.94 |
| GG | 0.998 |
| HH | 5.35 |
| II | 0.13 |
| JJ | 0.72 |
| KK | 1.036 |
| LL | 0.269 |
| MM | .03125 RAD |
| NN | 0.015 RAD. |
| OO | 24° |
| PP | 0.173 |
| QQ | 0.18 |
| RR | 0.17 |
| SS | 0.75 |
| TT | 0.438 |
| UU | 0.12 |
| VV | 0.19 |

Figure 4B:
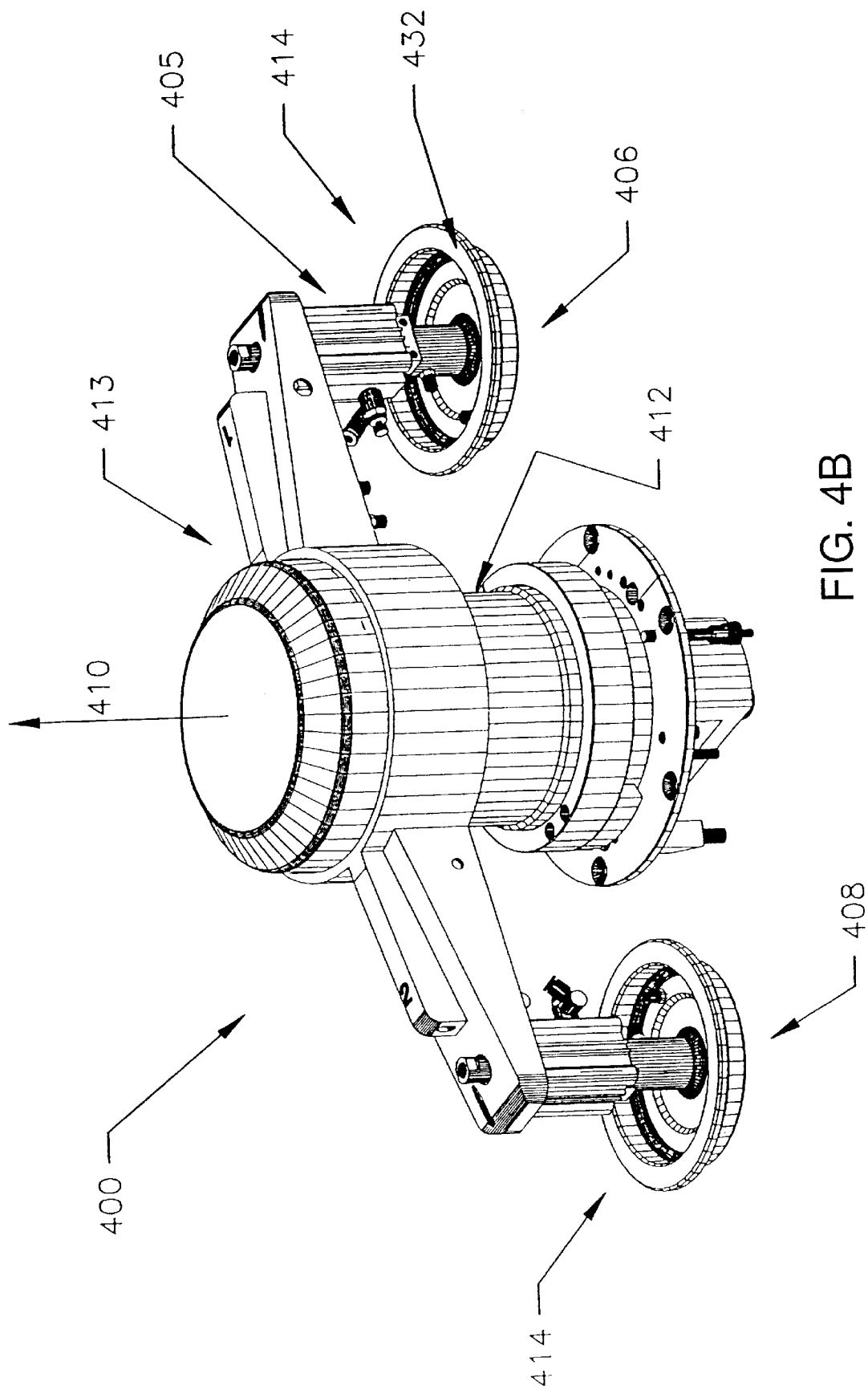
Figure 4C:
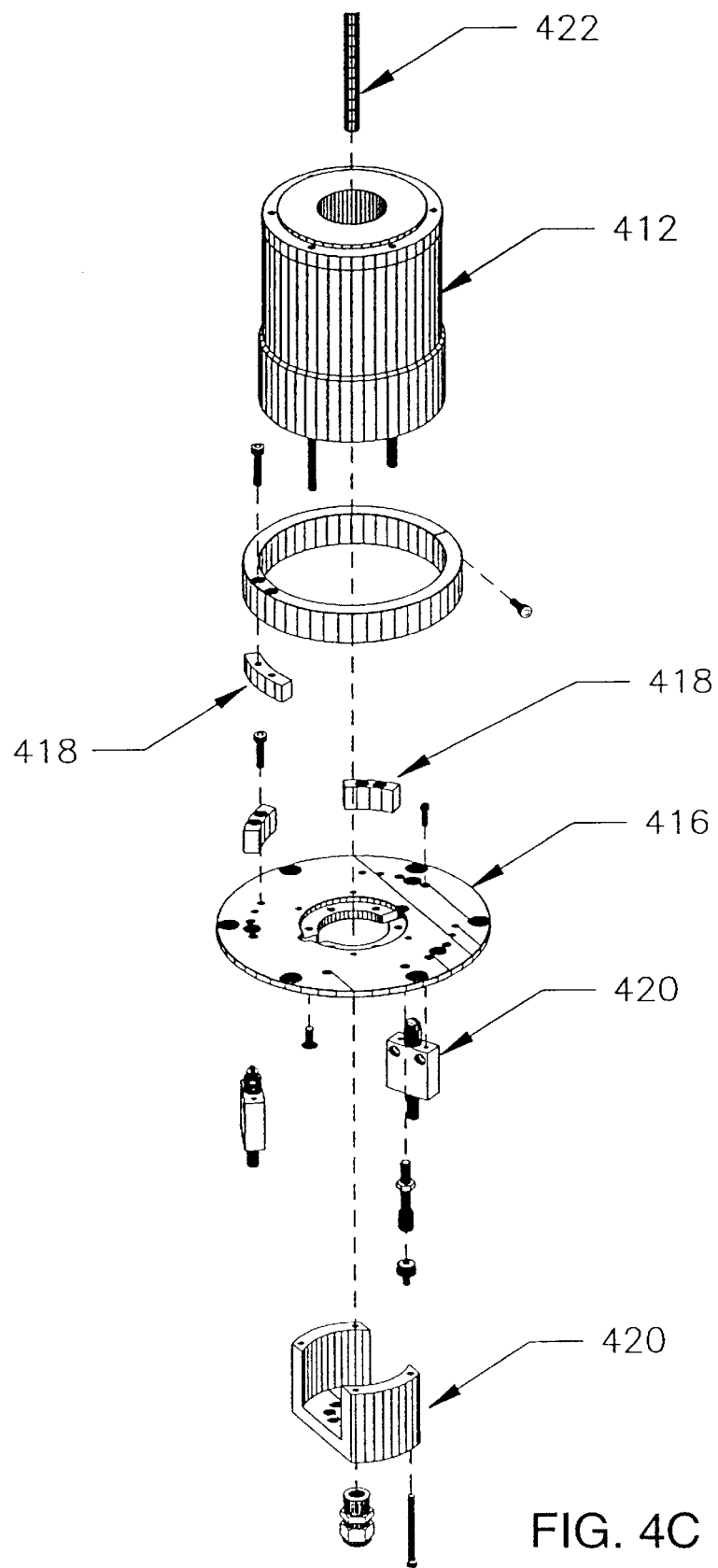
Figure 4D:
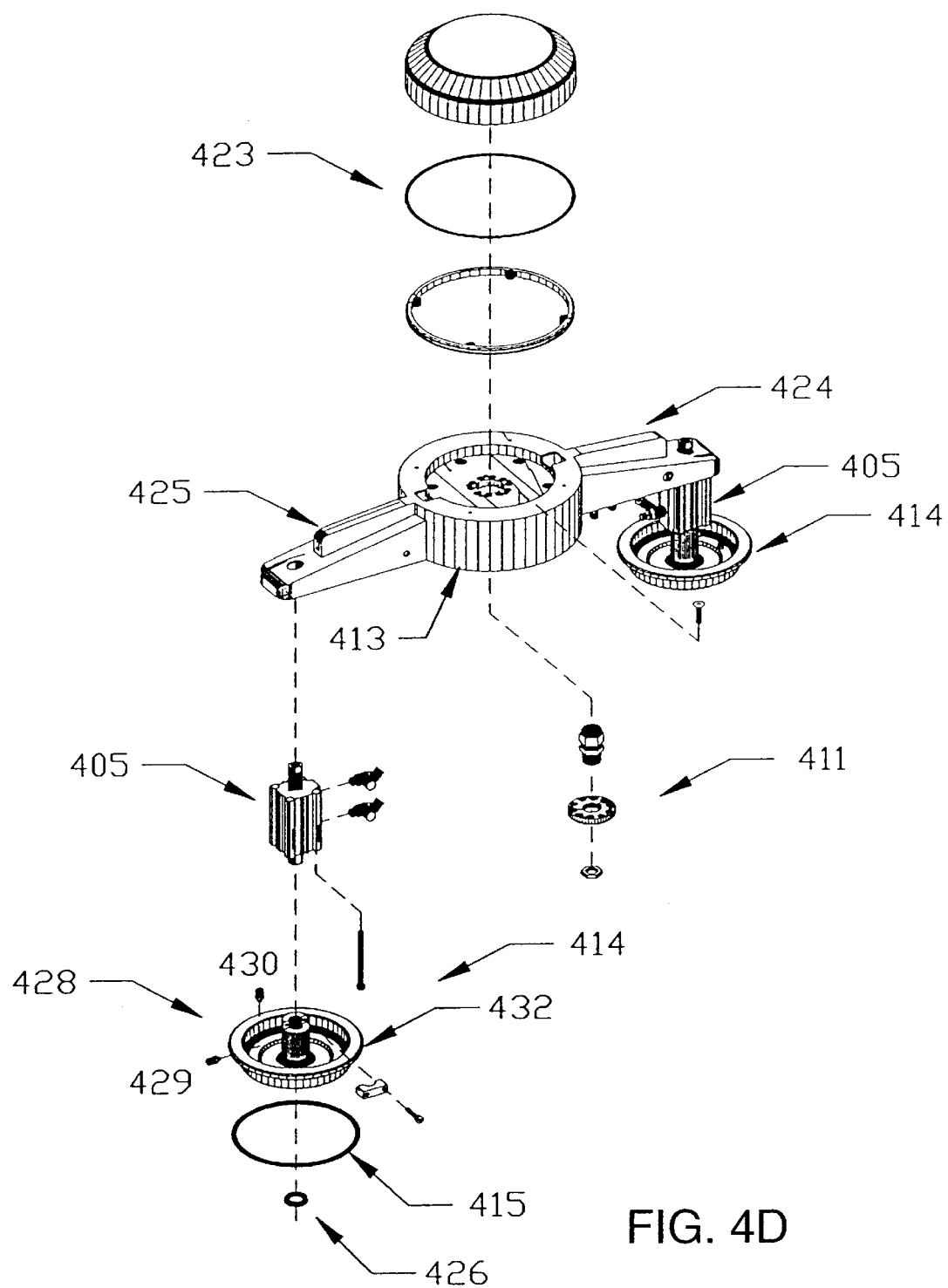
Figure 4I:
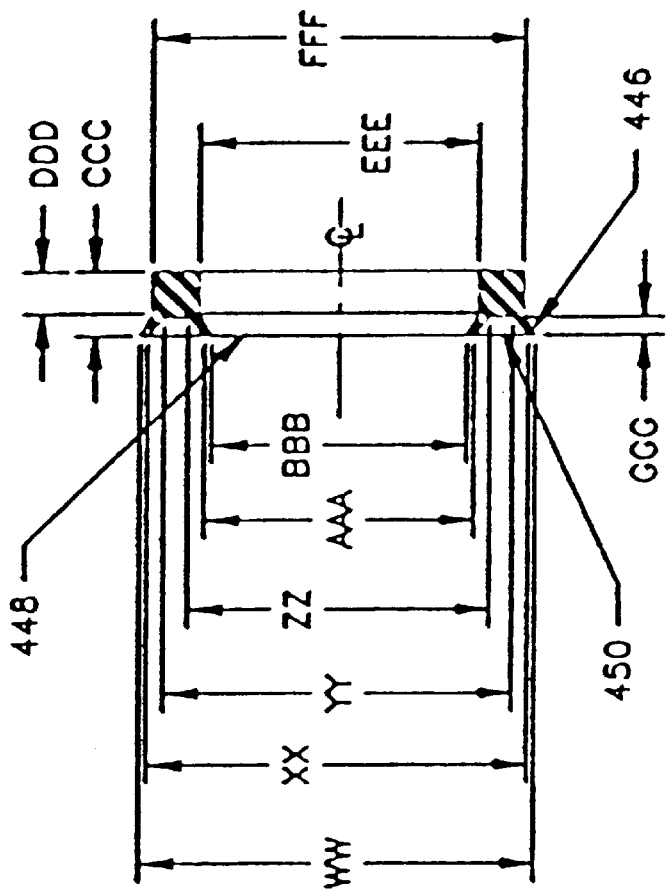
Figure 4H:
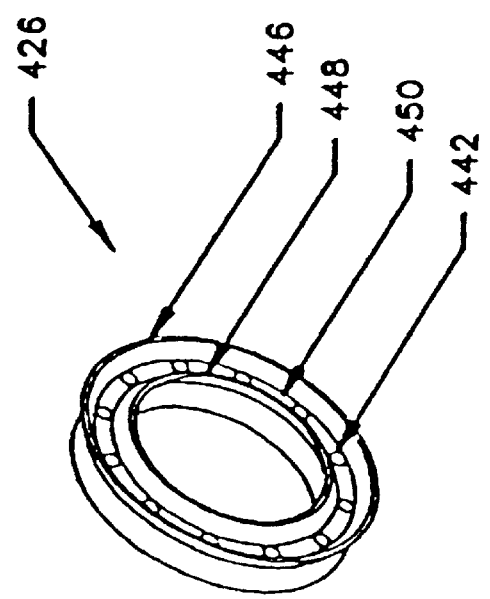

The structure of i.d. ring 426 is shown in FIGS. 4H–I in perspective and cross-section views. Ring 426 preferably has a durometer rating of 55. The ring 426 is defined by angled lip 446, projecting up and radially outward, and angled lip 448, projecting up and radially inward. An annular region 450 is defined in-between and at a base of the lips. Twelve equally-distributed holes 442 of about 0.06 inch diameter extend through region 450. FIG. 4I particularly shows the production dimension of a preferred ring 426, and table 4 shows the sizes of these dimensions measured in inches.

TABLE 4

| dimension | size |
|---|---|
| WW | 1.065 |
| XX | 1.025 |
| YY | 0.939 |
| ZZ | 0.811 |
| AAA | 0.725 |
| BBB | 0.685 |
| CCC | 0.177 |
| DDD | 0.115 |
| EEE | 0.75 |
| FFF | 1.0 |
| GGG | 0.049 |

6. DISPENSE STATION

Figure 5A:
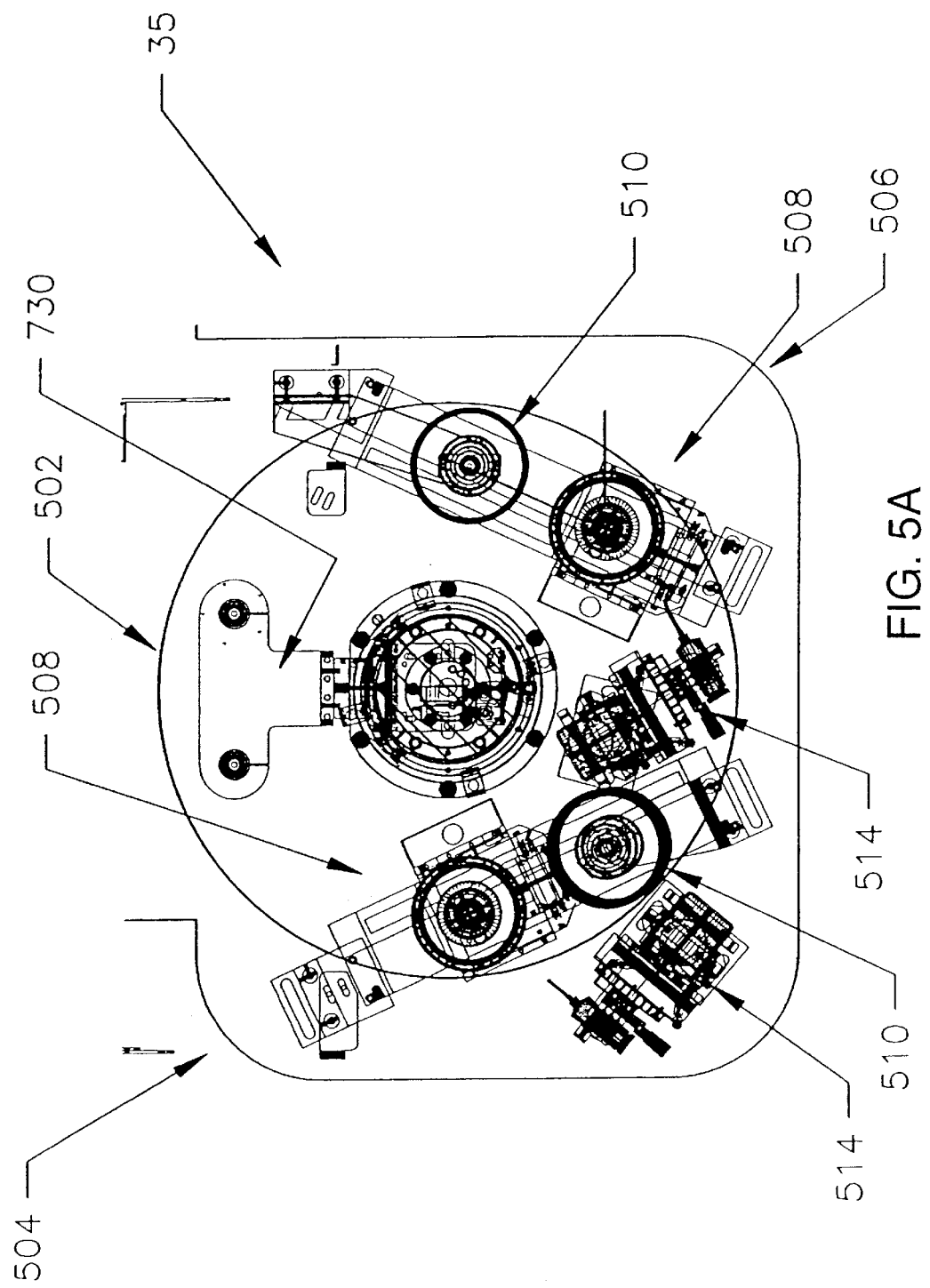
FIGS. 5A–B show an exemplary dispense station.
Figure 5B:
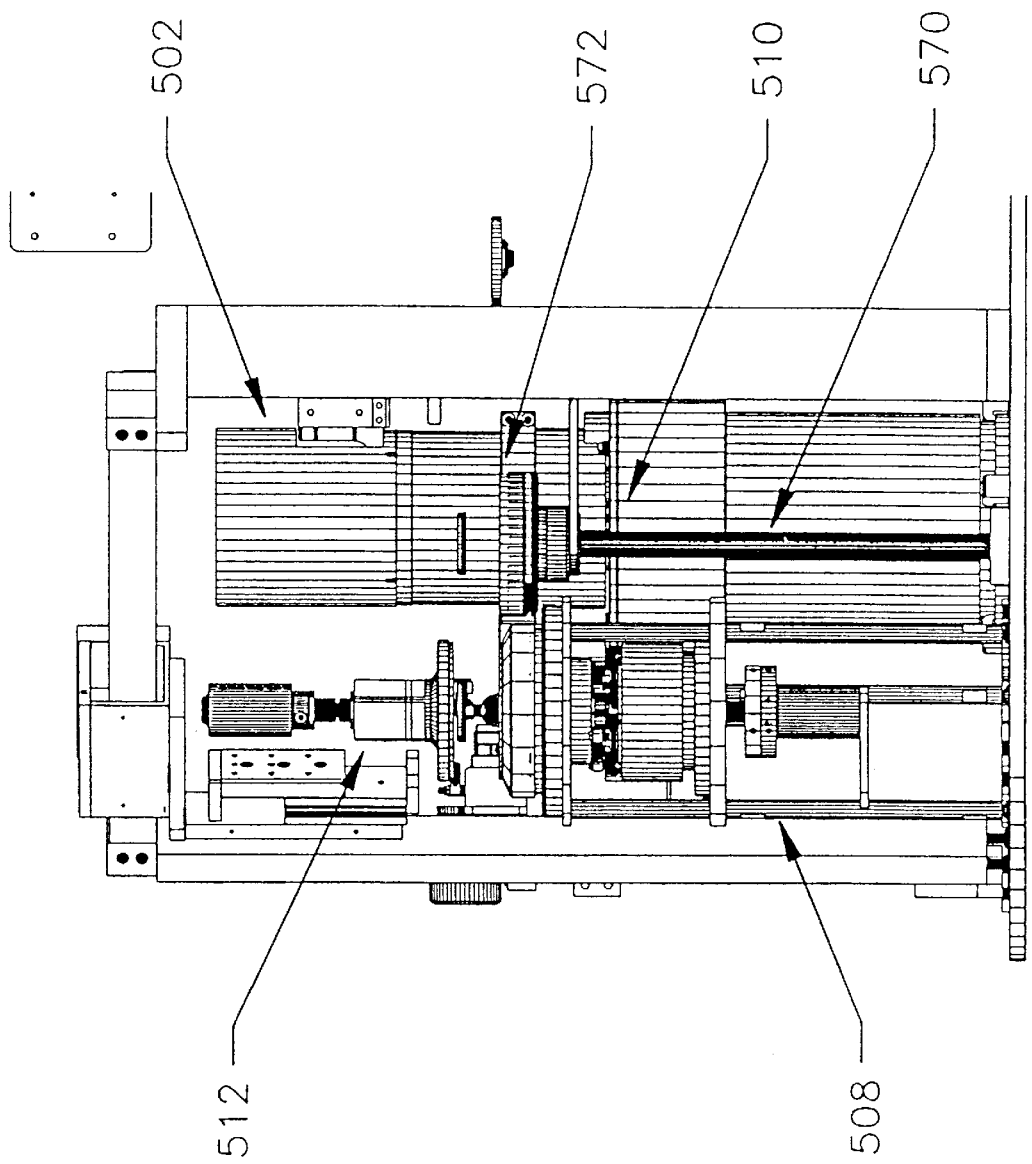
Figure 11A:
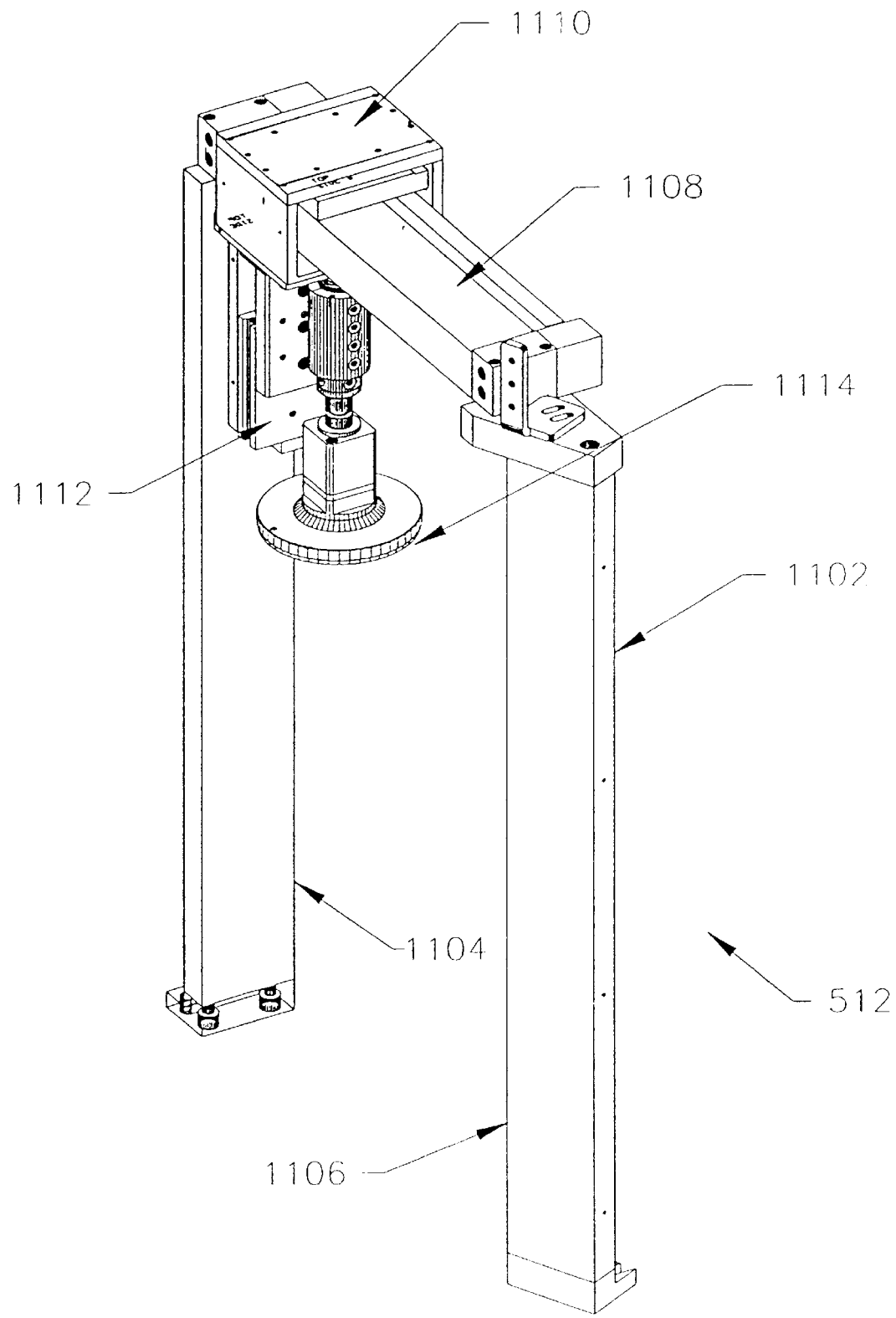
FIGS. 11A–D show an exemplary top substrate bowing device.
Figure 11B:
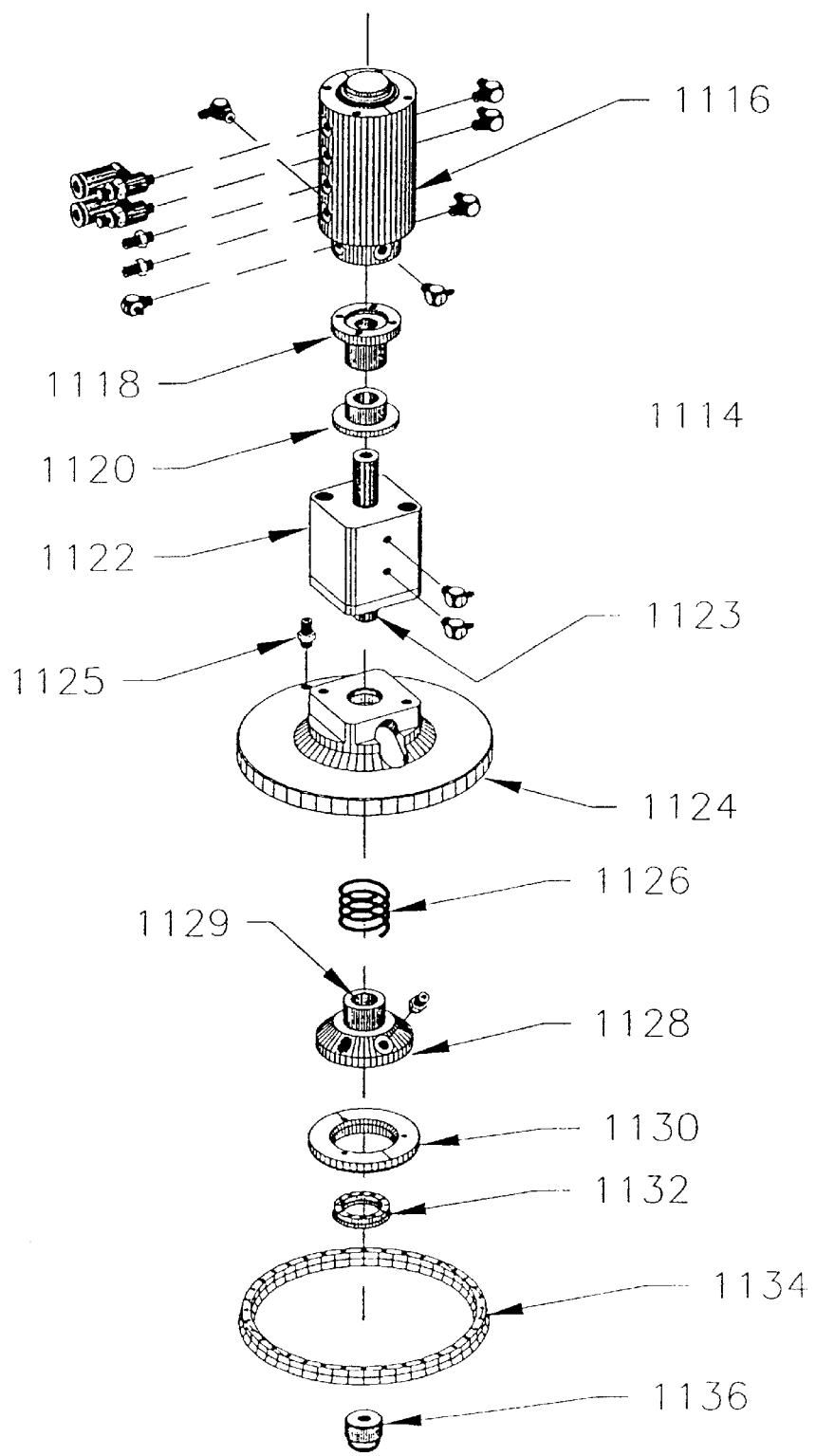

A portion of a preferred dispense station 35 is shown in plan view in FIG. 5A. Dispense station 35 includes a dispense robot 502, and two dispense machines 504 and 506, each having a top station 510, a bottom station 508, a resin dispenser 514, and a top substrate bow device 512 (see FIG. 11A). FIG. 5B shows a dispense machine, e.g., 504, shown in side elevation view. Not shown in these Figures, but shown in plan view in FIG. 2, is a robot substrate flipper 600 (see FIG. 6) at index 33. The dispense machines, flipper, and robot are mounted in alignment so that substrates may be removed from conveyor 25 at indexes 36 and 37 and so that substrates may be returned to index 36, as explained below.

The dispense station 35 is responsible for receiving a top and a bottom substrate 6, moat-side up (and consequently metallization, if any, face-up), from conveyor 25 and producing a combination 7 of substrates in which a top substrate's and a bottom substrate's moat side face each other and in which a bubble-free capillary bridge of resin is disposed as a ring-like pattern between the substrates. As will be explained below, this distribution of resin should distribute itself further throughout a region between the substrates as a consequence of capillary forces, and the consequent distribution should extend radially inward to the moat and should be substantially bubble-free.

a. Operation

In operation, a robot flipper 500 (see FIG. 6) of dispense station 35 lifts every top substrate off a conveyor nest at index 33, rotates the substrate 180° so the top substrate is now moat-side down, and lowers the substrate back on to the same conveyor nest.

While one top substrate is being flipped, two neighboring substrates 6 are at index positions 36 (bottom substrate) and 37 (top substrate).

A dispense robot 502 vacuum grabs the two substrates at indexes 36 and 37 and moves them to an open dispense machine, i.e., one which is not currently in the process of forming a combination 7. The top substrate is moved to a top station 510 (see particularly FIG. 5B) of a given, open dispense machine, e.g., 504, and the bottom substrate is moved to a bottom station 508 of the open machine.

A top substrate bow device 512 (see FIG. 11A) of that machine then grabs and lifts the top substrate from the top station 510 and moves it into vertical alignment with the bottom substrate at the bottom station. The top substrate bow device 512 and bottom station 508, under programmatic control, cause the two substrates to form a bowed relationship according to a preferred bow profile and to rotate while maintaining this profile. The top substrate is bowed concave up, and the bottom substrate is bowed concave down.

A resin dispenser 514 of the dispense machine is programmatically controlled to move to a preferred position relative to the bow profile and to dispense a resin in the bowed opening to form a ring-like capillary bridge between the substrates. The substrates are then released at a controlled rate from the bow device 512 and bottom station 508 under programmatic control.

Prior to and while the above is occurring the other dispense machine, e.g., 506, has been in the process of doing the same to a different pair of top and bottom substrates and has finished forming a combination 7. During the same index interval that the substrates are removed from indexes 36 and 37 and provided to one dispense machine, the robot 502 moves a combination 7 from the bottom station 508 of the other machine and moves into index 36. This process is repeated to use the two dispense machines 504 and 506 in interleaved fashion.

b. Robot Flipper

Figure 6:
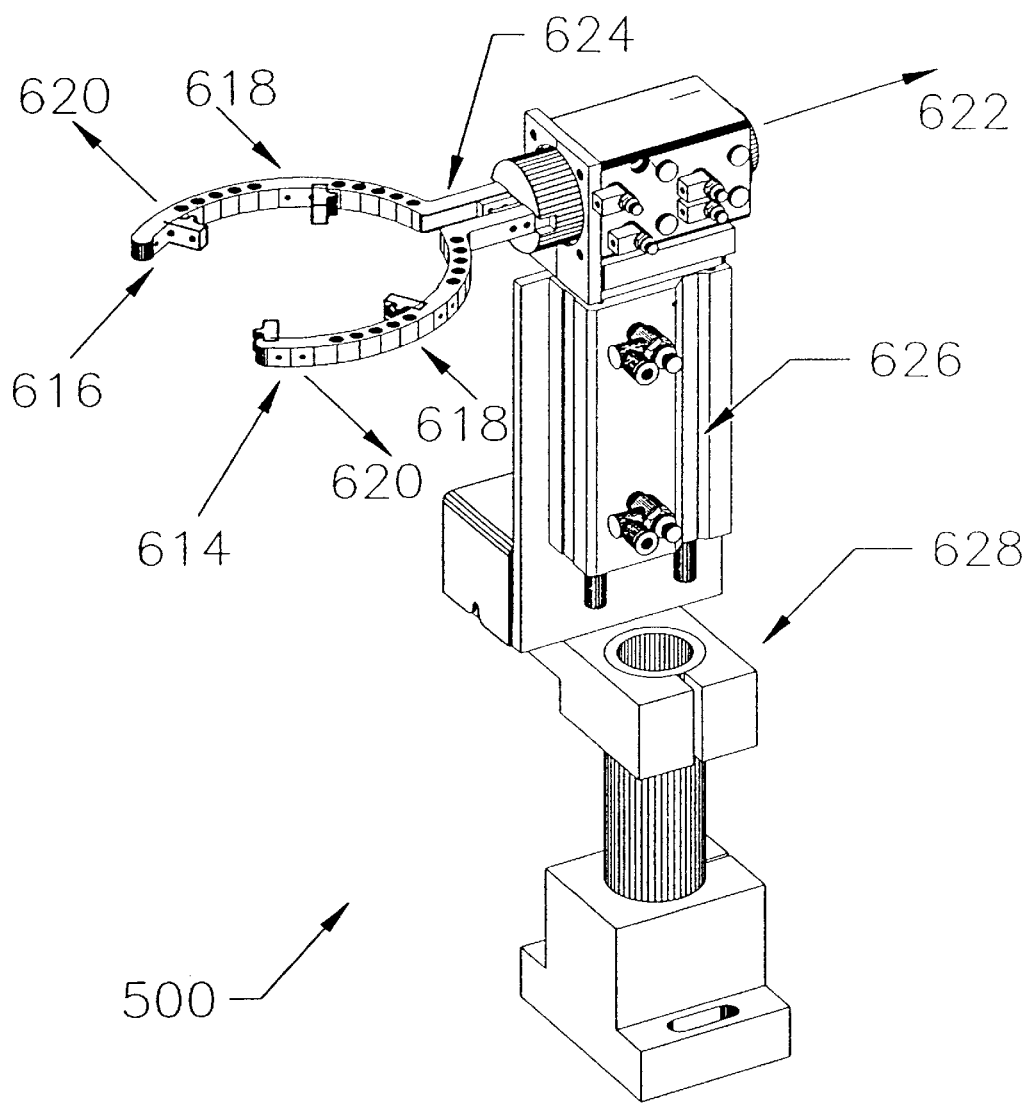
FIG. 6 shows an exemplary substrate flipper.

The suture of robot flipper 600 at index 33 (see FIG. 2) is shown in FIG. 6 perspective view. Flipper 600 includes two identical outer diameter, arcuate gripping arms 614 held by rotary grip 617 so that the arms form a partial circle. Each arm includes grooved fingers 616 having a lengthwise groove. The arms 614 and fingers 616 are shaped to grab an edge of a substrate when the arms are moved inward as shown by arrow 618, and to release the edge when the arms are moved outward as shown by arrow 620. The rotary grip 617 (part no. MRHQ16S-180S-F9PVL-F9PL available from SMC) has linear actuation of the arms along arrows 618 and 620 and rotary actuation about axis 622 which is parallel to a longitudinal direction of each arm, as defined by arm members 624. A pneumatically-controllable actuator 626 (part no. MGQL20-100-Z73 available from SMC) is mounted on stand 628 and holds rotary grip 617 so that when the actuator is in a lowered state the grooves of fingers 616 are in substantial horizontal alignment with and radially outward of a top substrate at index 33 and so that when the actuator is in a raised state there is substantial vertical clearance to rotate the arms 614 about axis 622 180°. In this fashion, the arms 614 may be actuated inward as shown by arrow 618 to grab a substrate at index 33, to raise it, and to flip it, and they may be actuated outward as shown by arrow 620 to release a flipped substrate back on to a conveyor nest at index 33.

c. Dispense Robot

The structure of dispense robot 502 is shown in FIGS. 7A–E in perspective exploded and cross section views. Dispense robot 502 includes a dual grabber assembly 730 that, under programmatic control, may be rotated about axis 731 by rotary servo 732 to place the grabber assembly in three states: a first state vertically aligns grabber assembly 730 above indexes 36 and 37 (as shown in FIG. 5A); a second state vertically aligns grabber assembly 730 above a top station 510 and bottom station 508 of a first dispense machine 504; and a third state vertically aligns grabber assembly 730 above a top station 510 and bottom station of a second dispense machine 506. In any of the three states, the grabber assembly 730, under pneumatic control, may be lowered as shown by arrow 733 to grab substrates from the conveyor 25, to release the substrates to a top and bottom station of one of the two dispense machines, or to grab a combination 7 from a bottom station 508 of one of the two dispense machines. Likewise, the assembly 730 may be raised to lift substrates from the conveyor 25, to rotate the assembly 730 out of position after the release of the substrates to a top and bottom station of one of the two dispense machines, or to lift a grabbed combination 7 from one of the two dispense machines.

The servo 732 (part no. CP DR-5030B available from Compumotor) is mounted to plate 738 through a collar 734. The plate holds end stops 736 and limit switches to help protect against over-rotation of the servo 732. The plate 738 is mounted to stand assembly 750 which holds the servo 732 so that the grabber assembly 730 is above conveyor 25.

Grabber assembly 730 includes a grabber mount 752, which is mounted to strain relief 742, and which holds pneumatically-controllable vertical actuator 754 (part no. MXS16-30-AT-A93L available from SMC). Actuator 754 is in fluid communication with vacuum ports 756 and is mounted to vertical plate 758, which in turn is connected to assembly arm 760. The arm includes two fixed grabber arbors 764 that project downward. On the hidden underside of arm 760 are two annular chambers in which i.d. rings 766 are compression fit. The i.d. rings are identical to i.d. rings 426, described above, in relation to FIGS. 4H–I. The annular chambers are each in fluid communication via a vacuum gland (not shown) in arm 760 which is in communication with vacuum ports 762. A plate 768 is attached to arm 760 in the position corresponding to a bottom substrate. Plate 768 is preferably made of UHMW plastic shaped to have a slightly raised, downward-projecting lip (not shown) of about 0.03 inches at an outer diameter region. The lip provides support to a top surface of a bottom substrate so that a bottom station 508 may later vacuum grab an outer diameter region of the substrate, as will be explained below. A sheath 744 protects plumbing (not shown) from friction. Electrical strain relief 746 is used to hold wiring and cap 748 covers the components.

Figure 7A:
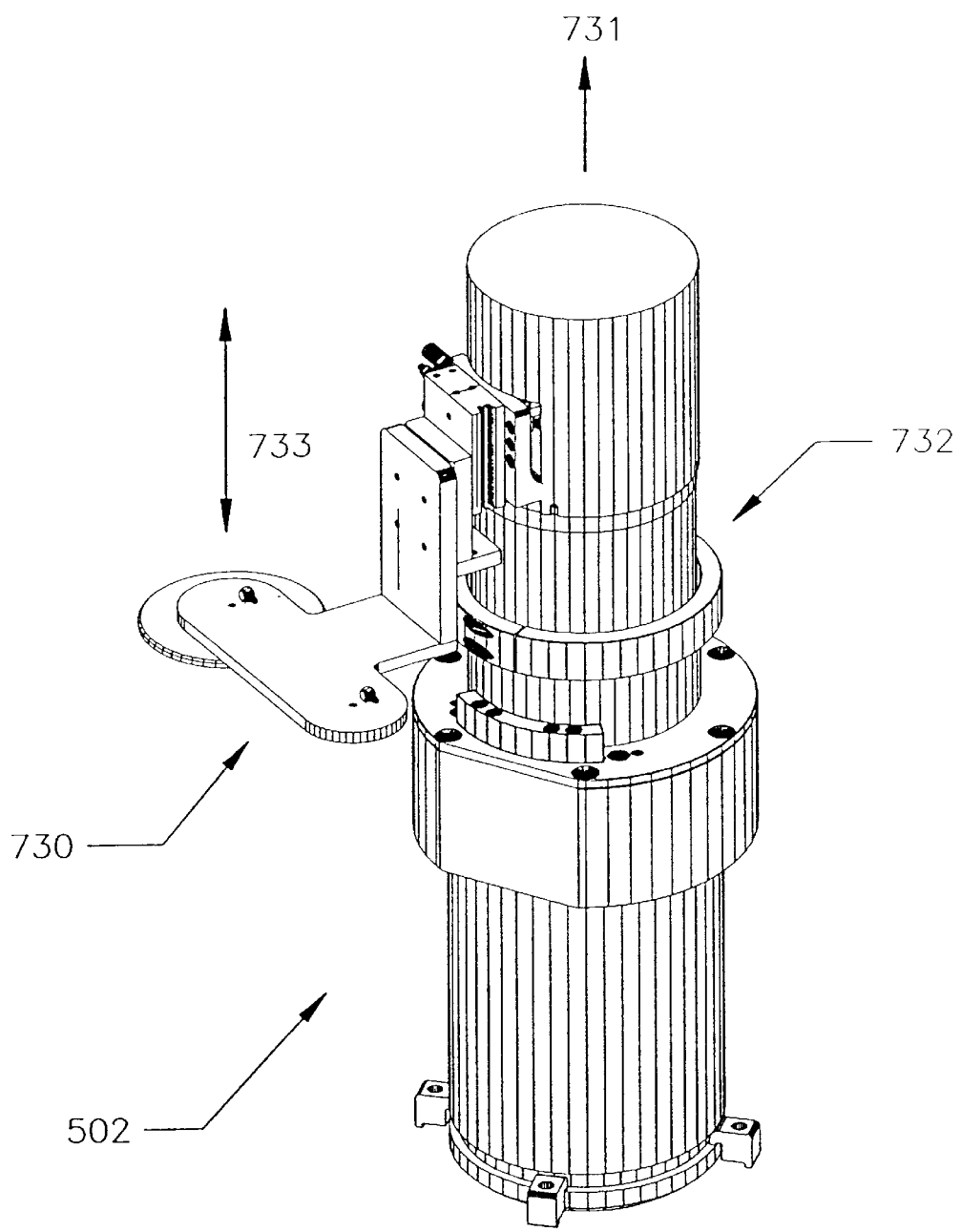
FIGS. 7A–E show an exemplary dispense robot.
Figure 7B:
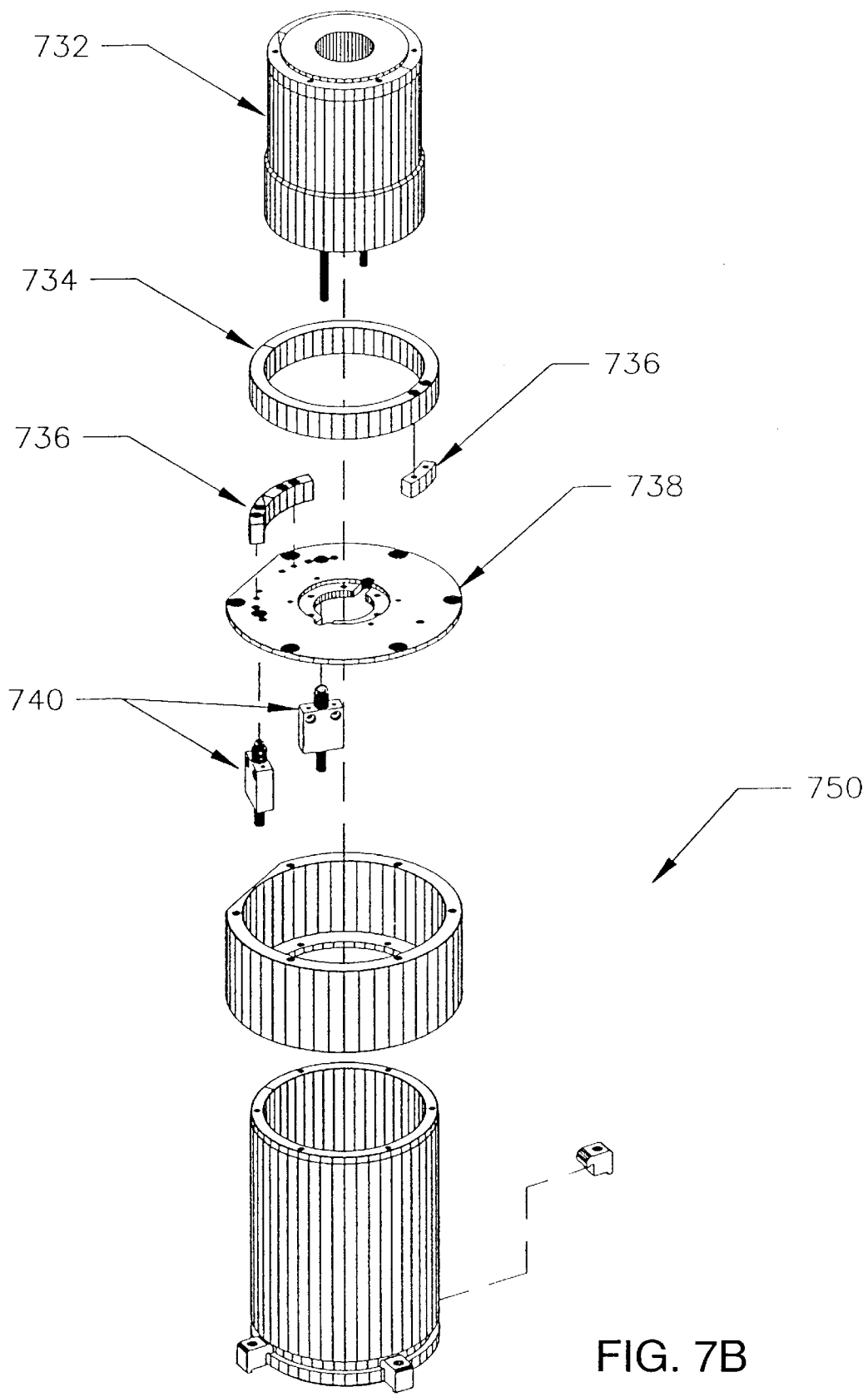
Figure 7C:
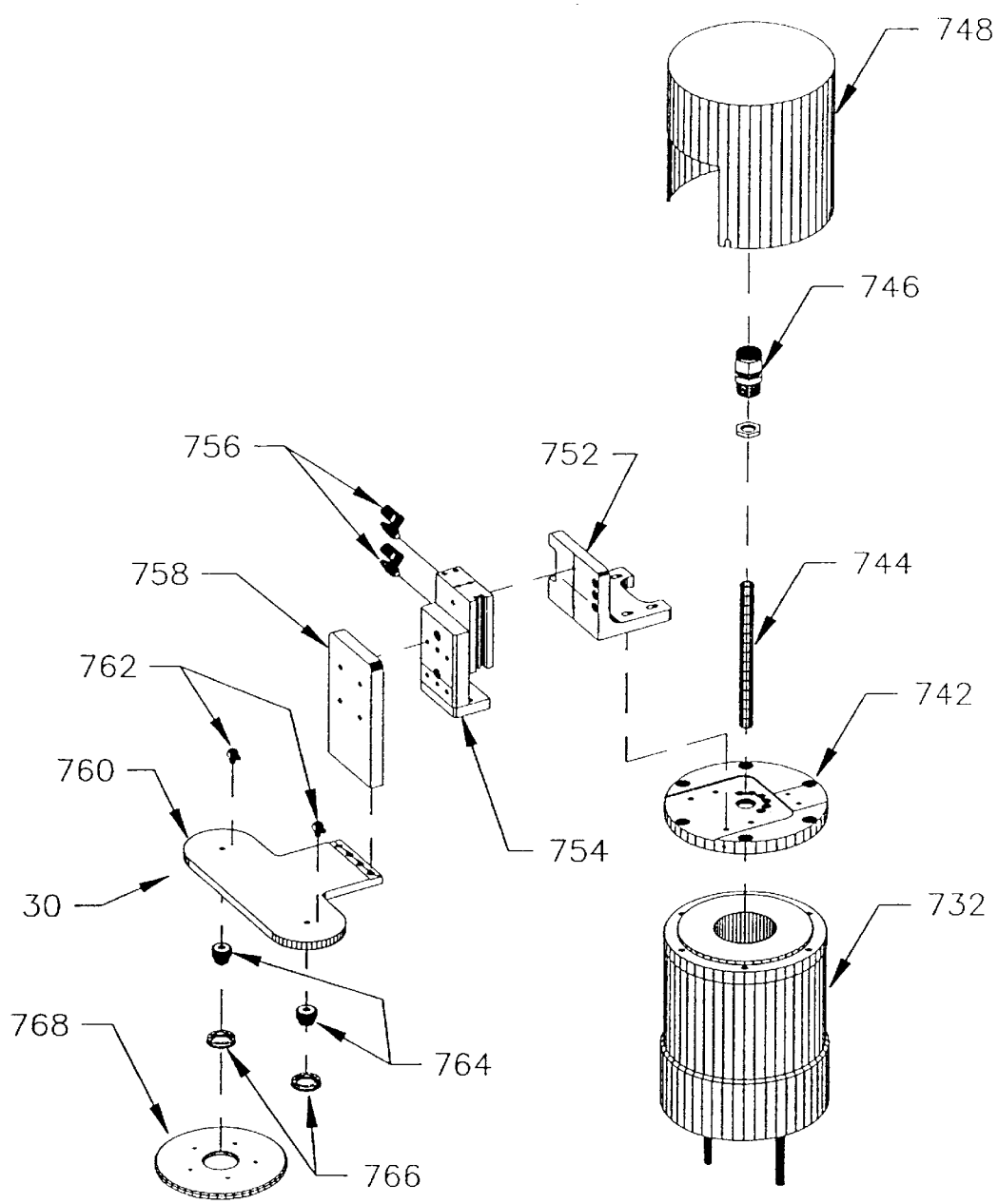
Figure 7D:
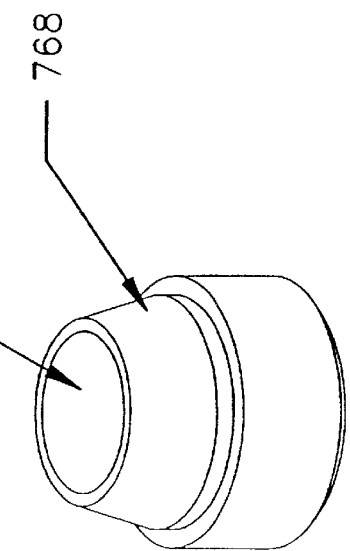
Figure 7E:
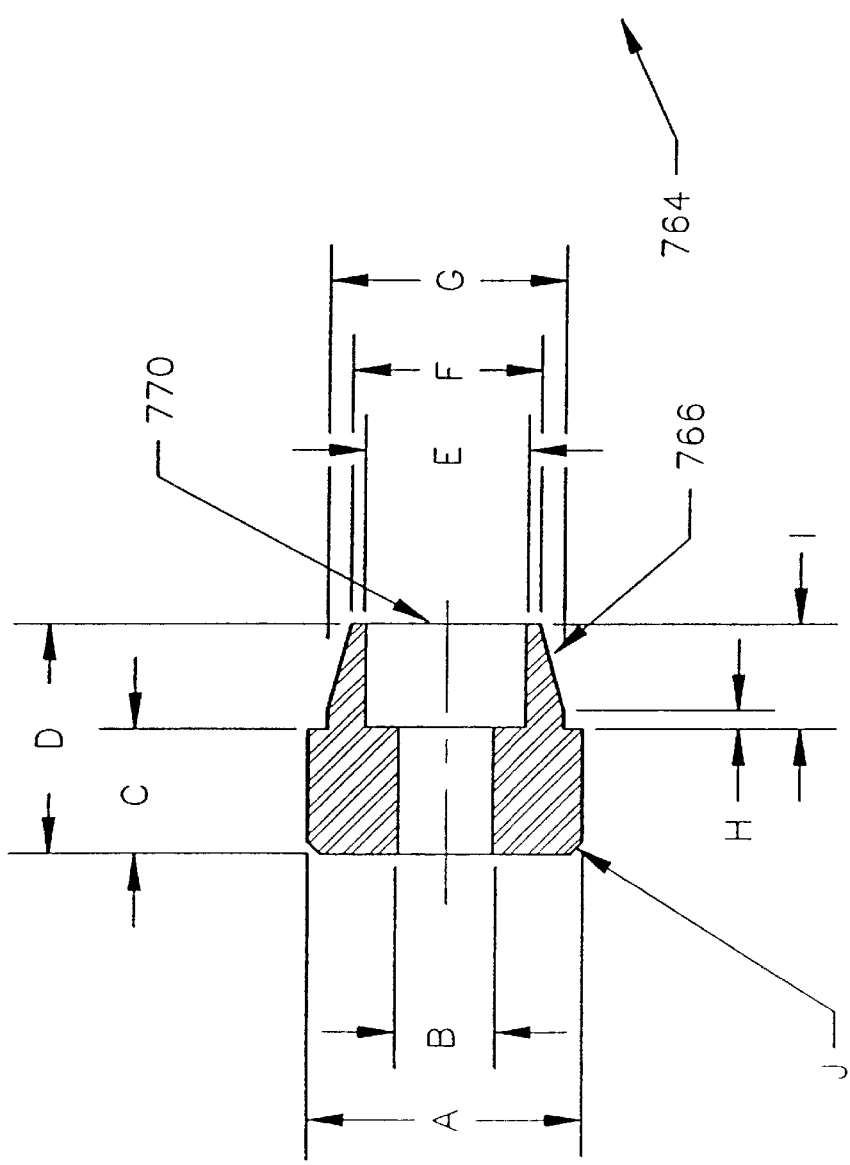

The structure of a fixed arbor 764 of grabber assembly 730 is shown in FIGS. 7D–E in perspective and cross-section views. The arbor 764 is preferably made of hardened and polished tool steel that is electro-less nickel plated. FIG. 7E particularly shows the production specifications of a preferred arbor 764, and Table 5 shows the sizes of those dimensions measured in inches.

TABLE 5

| dimension | size |
| --- | --- |
| A | 0.687 |
| B | 0.250 |
| C | 0.311 |
| D | 0.576 |
| E | 0.410 |
| F | 0.474 |
| G | 0.5925 |
| H | 0.08 |
| I | 0.26 |
| J | .03 × 45° |

An angled edge 766 of a downward projecting portion 768 of the arbor facilitates the handling of the substrates to place them on or off the arbor 764. The arbor 764 is shaped to fit into the i.d. hole of a substrate and to engage the conveyor arbor 302 (see FIG. 3E) to depress arbor 302 into nest 304. Arbor hole 770 receives mounting hardware (not shown). The combination of arbors 302 and 764 forms a concentricity constraint that keeps the top and bottom substrates of a combination 7 aligned at the i.d. hole when the robot 502 transfers combinations 7 to conveyor 25. More specifically, the 15.0 mm center hole is maintained to within +0.1 mm and −0.0 mm.

d. Top Station

Figure 8B:
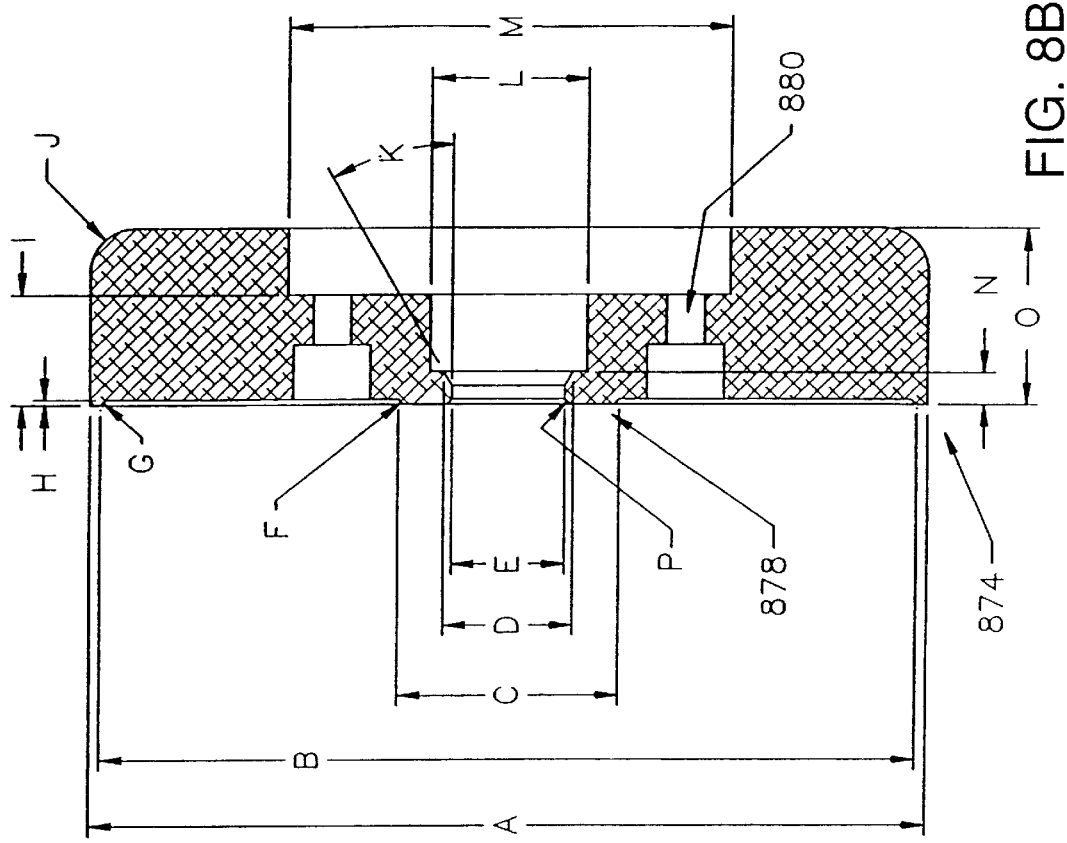
FIGS. 8A–B shows an exemplary plate of a top station.
Figure 8A:
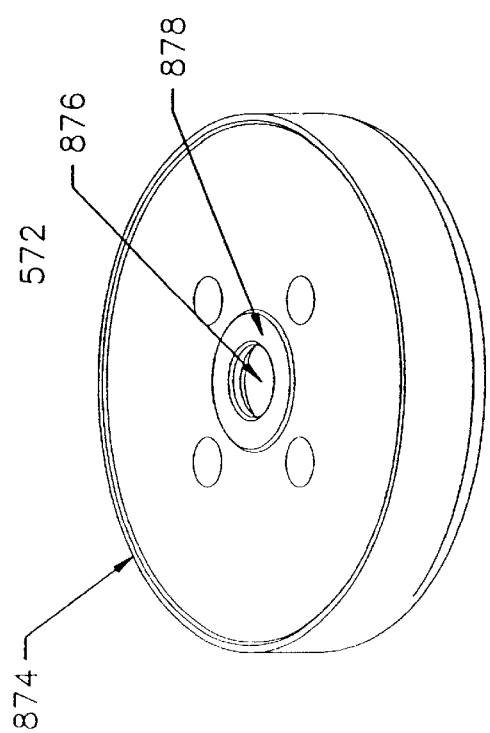

The structure of a top station 5110 of a dispense machine is shown in FIG. 5B and FIGS. 8A–B. FIG. 5B is an elevation view of a dispense machine and illustrates that the top station 510 includes a stand 570 on which is mounted a plate 572 which is in horizontal alignment with bottom station 508. FIG. 8A shows the plate 572 in perspective view, and FIG. 8B shows the plate 572 in cross-section view and particularly shows the production dimensions of a preferred plate 572. The sizes of the dimensions measured in inches are shown in Table 6.

TABLE 6

| dimension | size |
| --- | --- |
| A | 4.725 |
| B | 4.675 |
| C | 1.25 |
| D | 0.724 |
| E | 0.64 |
| F | 45° |
| G | 45° |
| H | 0.03 |
| I | 0.625 |
| J | R.25 |
| K | 30° |
| L | 0.886 |
| M | 2.5 |
| N | 0.183 |
| O | 1.0 |
| P | .03 × 45° |

The stand 570 holds the plate in horizontal alignment with a top surface of bottom station 508. Preferably the plate 572 is made of UHMW plastic. Plate 572 includes a hole 876 sufficiently sized to receive the arbor 764 of the grabber assembly 730. It also includes an upwardly-projecting lip 874 in alignment with upper surface portion 878. Lip 874 provides support to a bottom surface (in this instance the moat-side, and metal-side, if any) of the top substrate so that a top substrate bow device 512 may vacuum grab an outer diameter region of the substrate, as will be explained below. Upper surface portion 878 provides support to a bottom surface (in this instance the moat-side, and metal-side, if any) of the top substrate so that a top substrate bow device 512 may vacuum grab a handling area region of the substrate, as will be explained below. Holes 880 receive hardware (not shown) for mounting plate 572 to stand 570.

e. Bottom Station

Figure 9A:
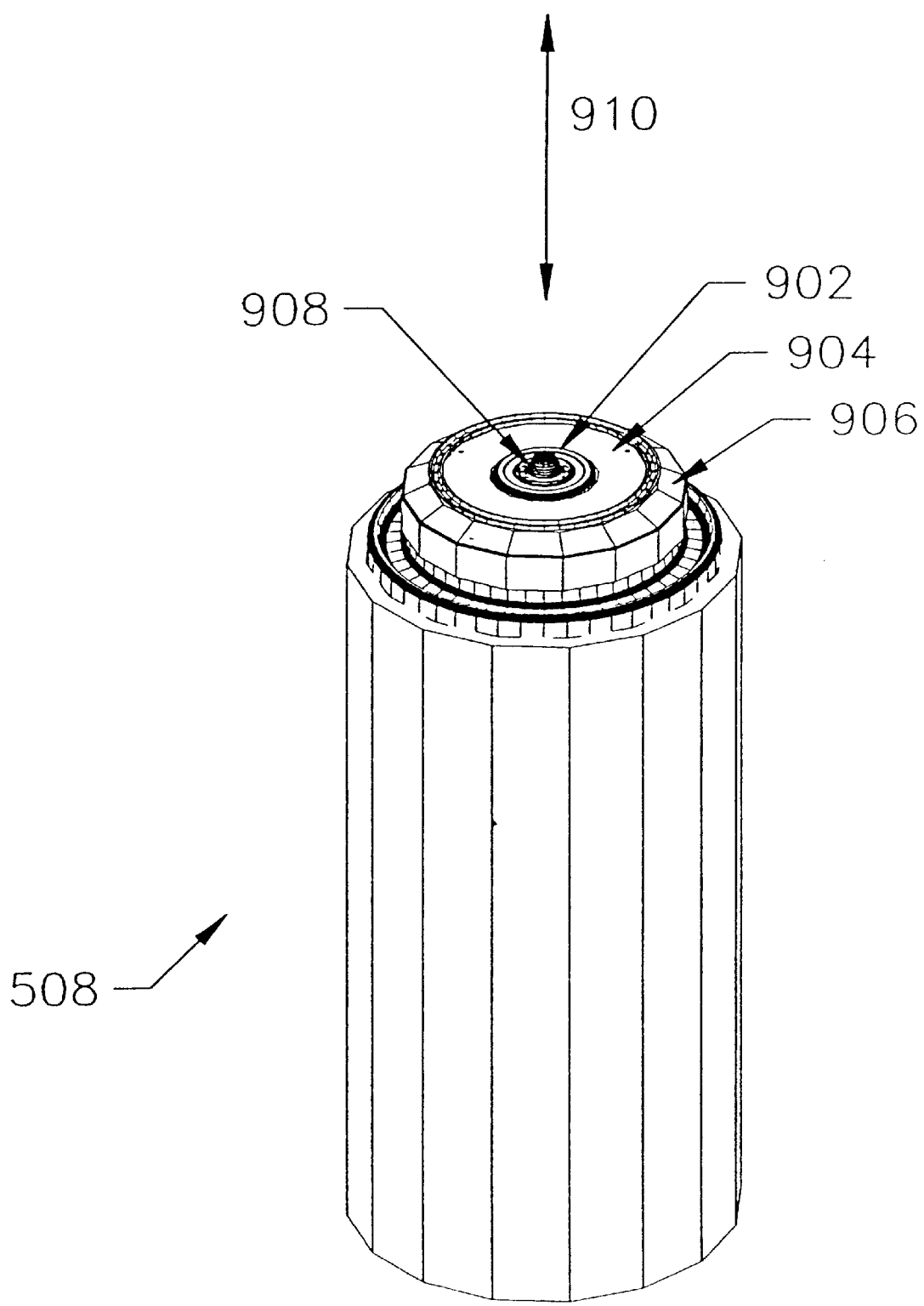
Figure 9B:
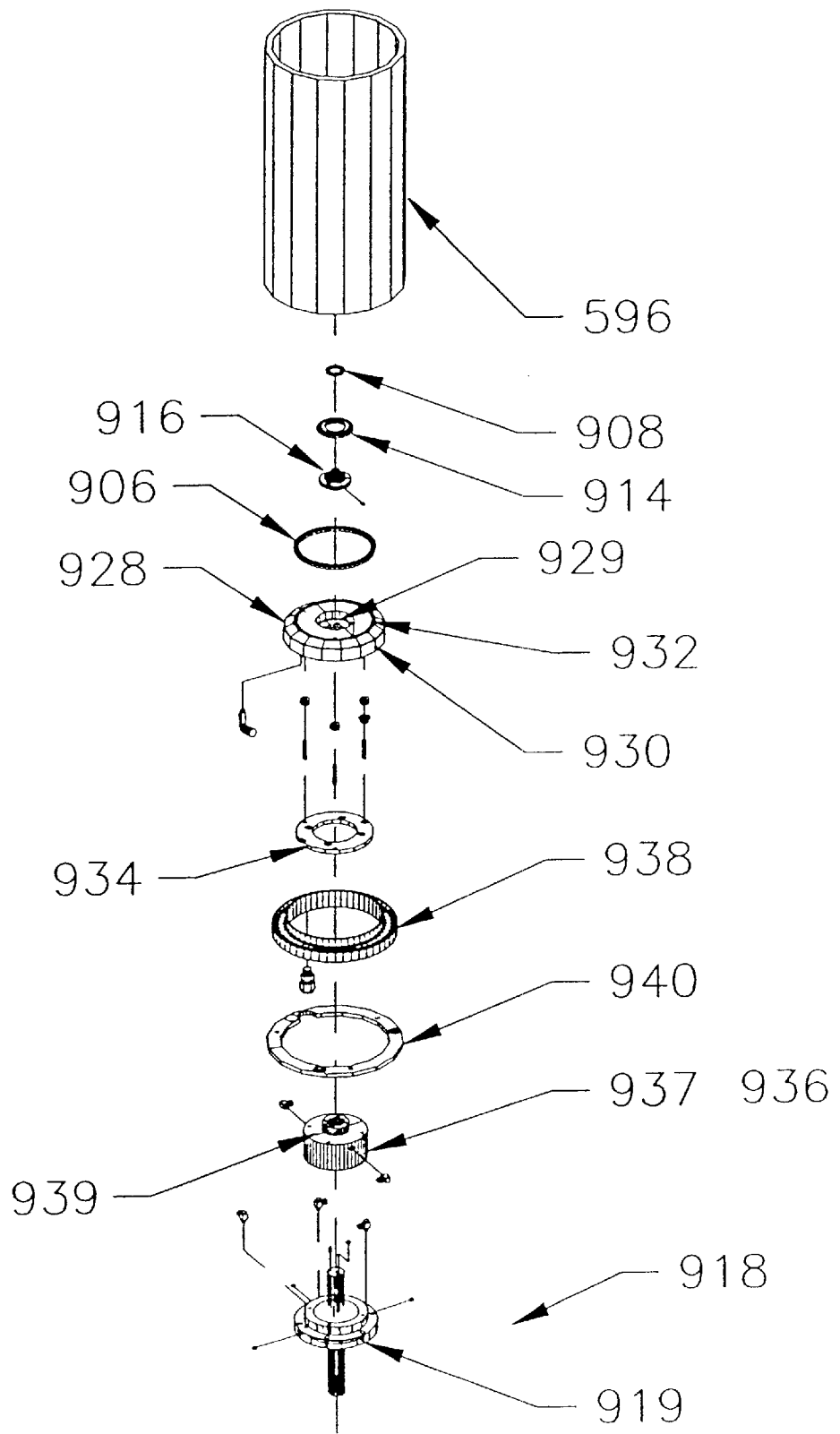
Figure 9C:
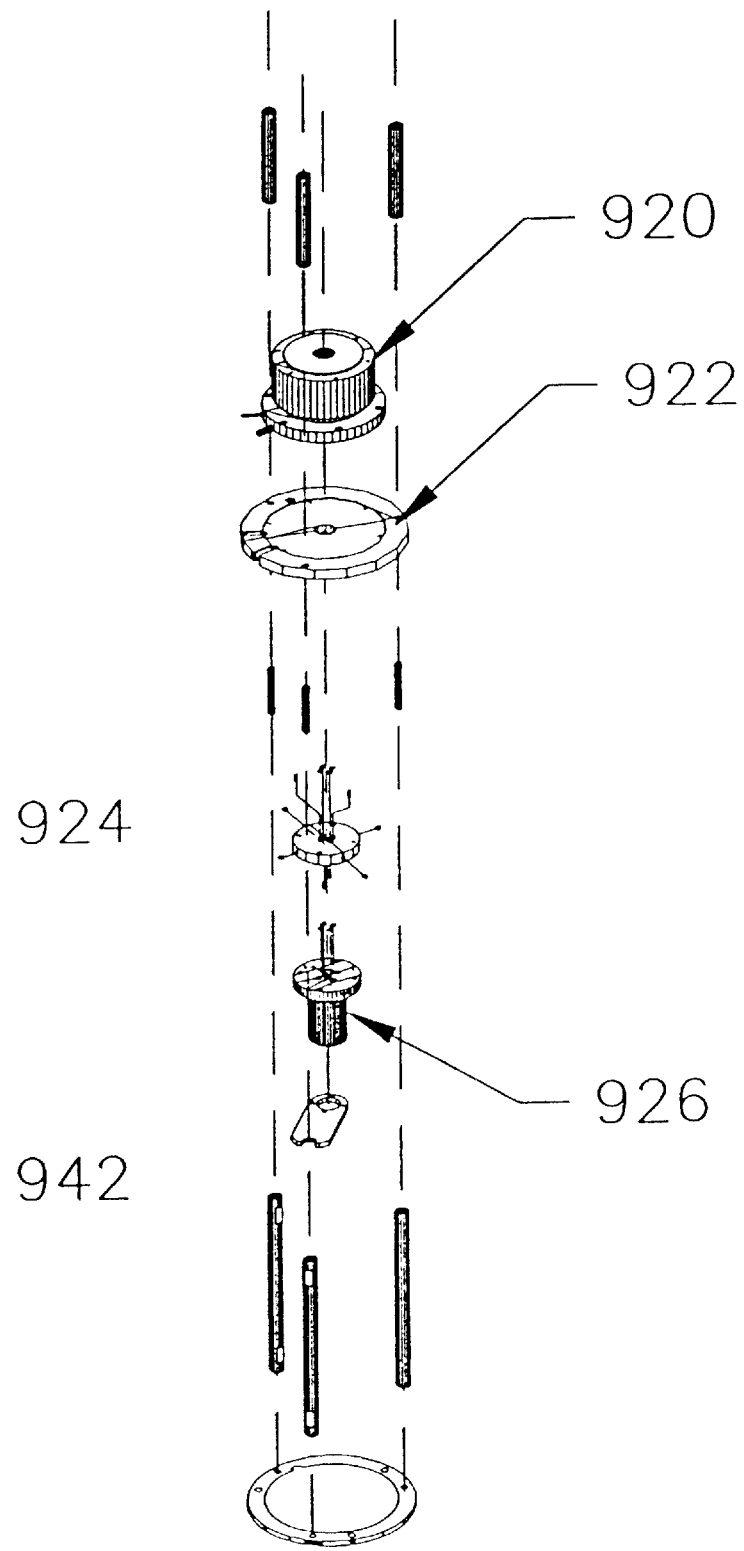
Figure 9I:
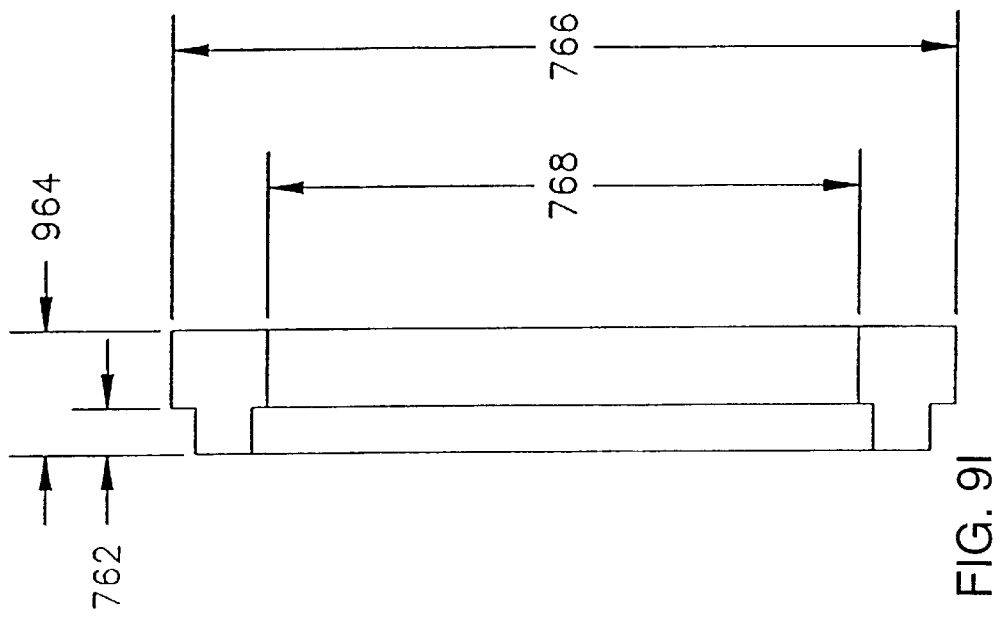
Figure 9H:
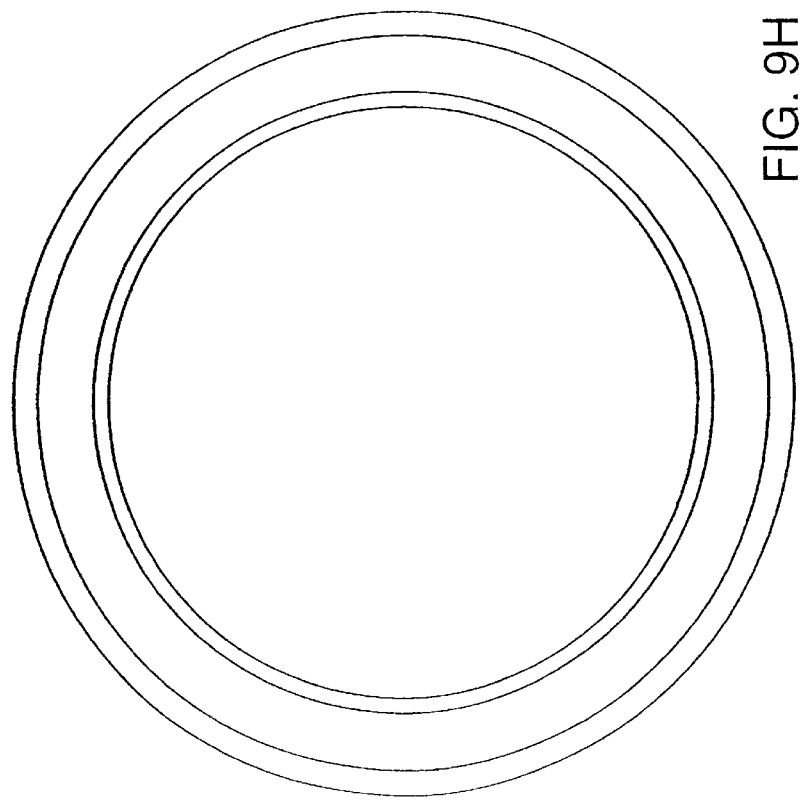
Figure 9K:
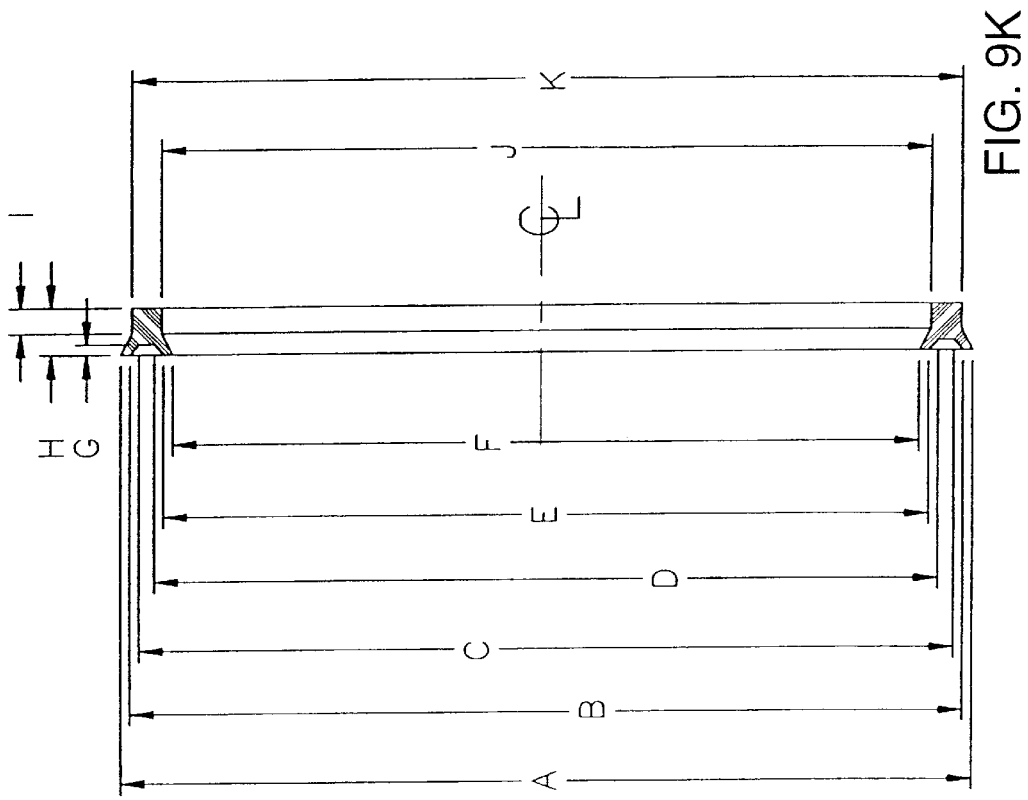
Figure 9J:
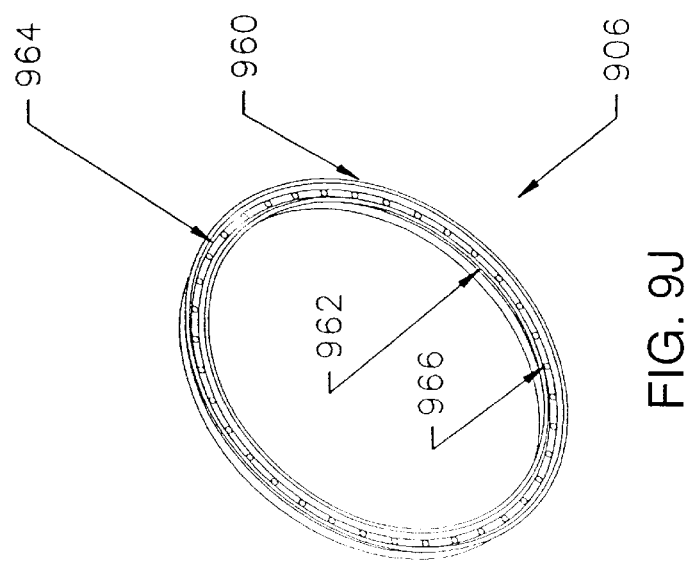
Figure 10A:
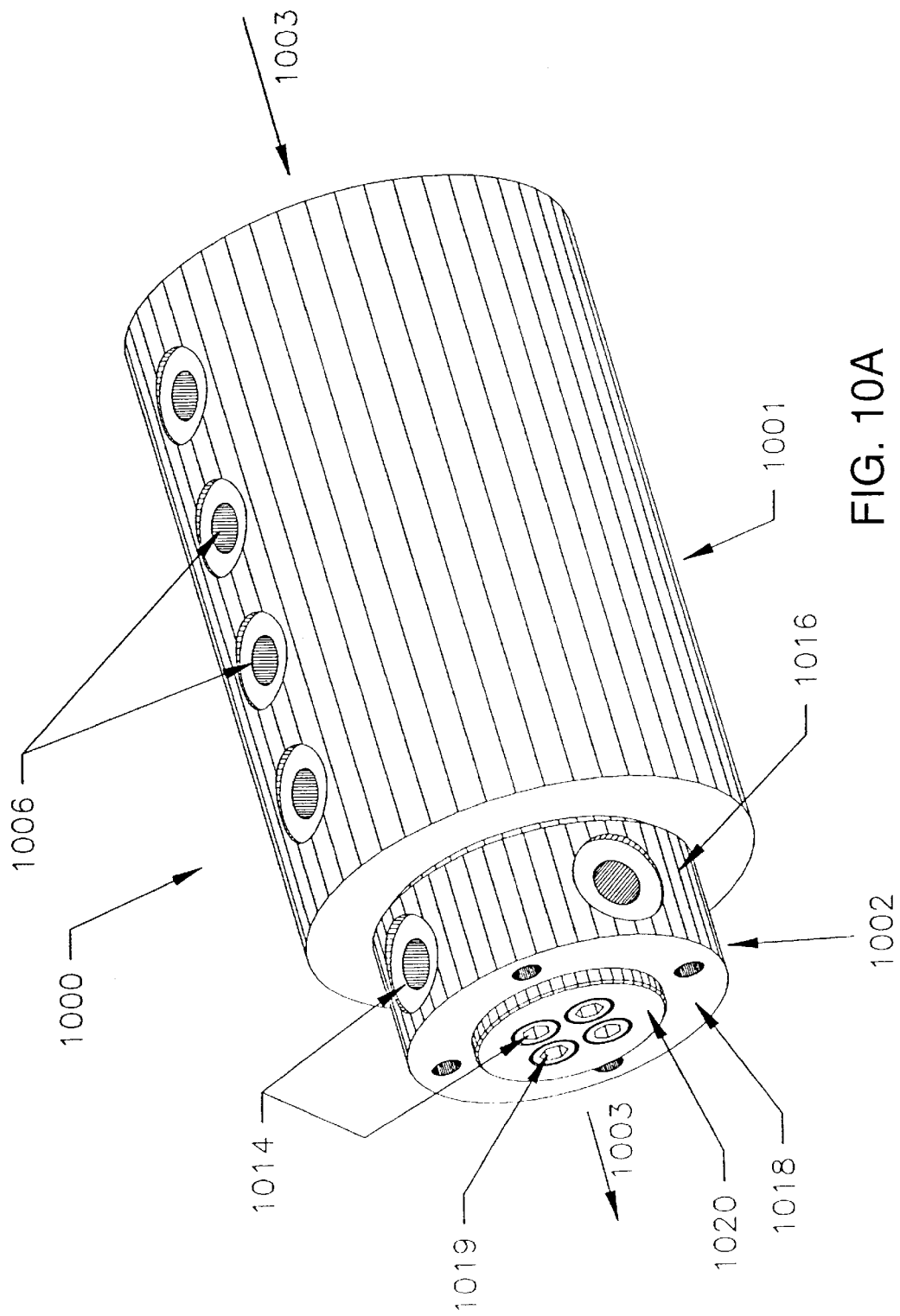
FIGS. 10A–B show an exemplary rotary union.
Figure 10B:
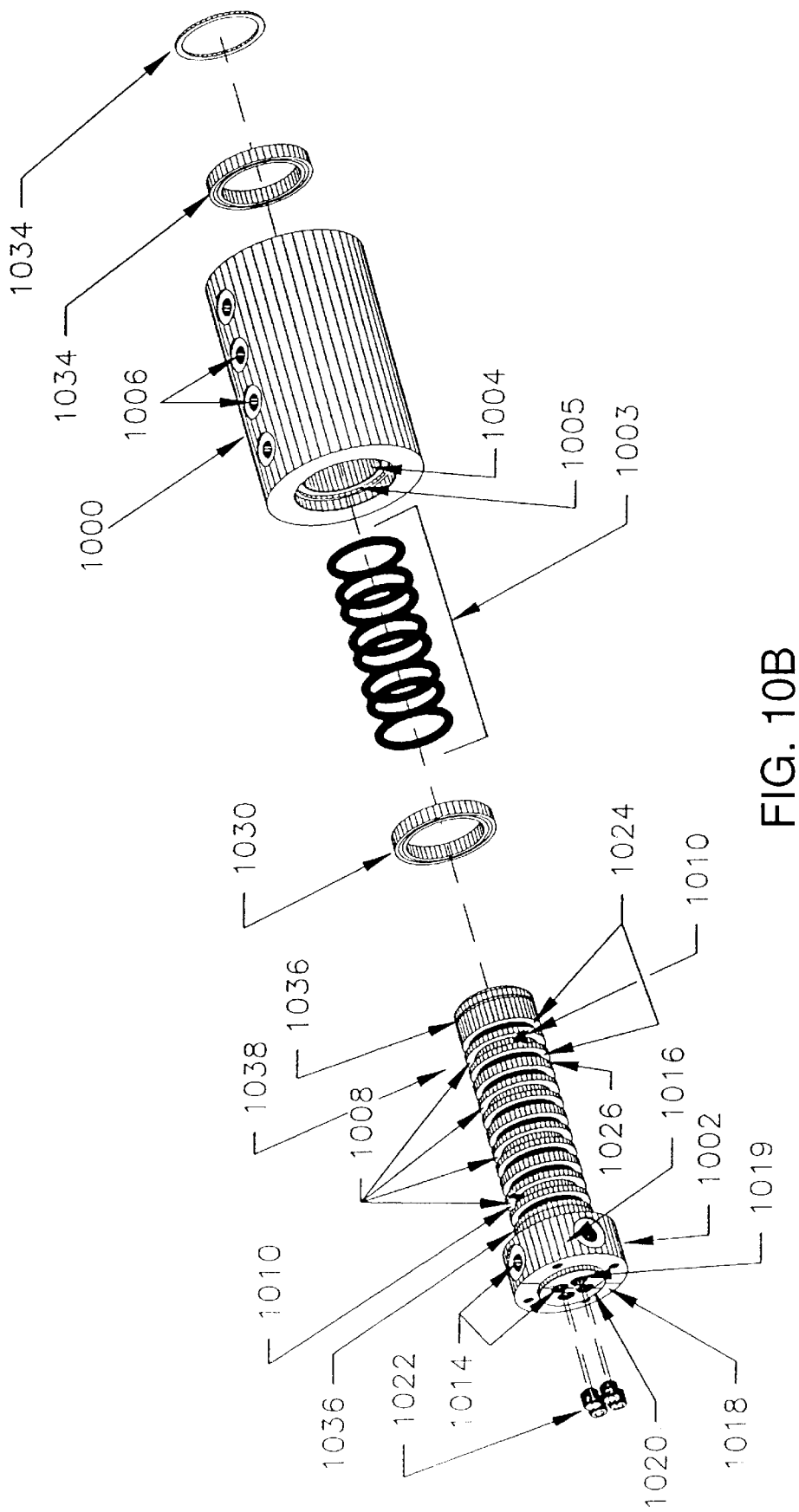

The structure of a bottom station 508 of a dispense machine is shown in FIG. 9A–K in perspective and exploded views, along with FIGS. 10A–B which show a perspective and exploded view of a rotary union similar to one used by the bottom station. The bottom station 508 includes an i.d. region grabber assembly 902 and an o.d. region grabber assembly 904 in outward radial relation to assembly 902. The i.d. region grabber assembly 902 and the o.d. region grabber assembly 904 may be caused to vacuum grab a bottom substrate presented to it by robot grabber assembly 730 of robot 502. The i.d. region grabber assembly 902 vacuum grabs a substrate at a handling area region of a bottom surface of a bottom substrate, and the o.d. region grabber assembly 904 vacuum grabs a substrate at an outer diameter region of a bottom surface of a bottom substrate. The vacuum grabbing elements, described below, are activated when the vacuum grabber assembly 730 of robot 502 is in a state that places plate 768 over the bottom station 508. In this fashion, the downward projecting lip of plate 768 provides support to the o.d. region and facilitates the vacuum grabbing of the o.d. region by a compressible o.d. vacuum ring 906 of 45 durometer. In a raised state, assembly 902 and 904 are in horizontal alignment, and in a lowered state, activated under programmatic control, the o.d. region grabber assembly 904 may be actuated vertically in the direction of axis arrow 910 to bow the bottom substrate concave down.

More specifically, the i.d. region grabber assembly 902 includes an i.d. ring 908 that is compression fit into an annular chamber of i.d. centering device 916 and around which i.d. chuck 914 is mounted. Ring 908 is identical to the i.d. ring 766 of robot 502 and ring 426 of robot 400. The i.d. centering device 916 includes an opening 951 through which arbor 764 of grabber assembly 730 may fit and includes a vacuum gland 952 (see FIG. 9G) in fluid communication with the annular chamber 950 holding ring 908 and with a vacuum supply at the top of rod-mount 918. Rod-mount 918 is attached to servo 920 passes through plate 922 and abuts plate 924, which has holes in fluid communication with hub ports at a top surface of rotary union 926. Rotary union 926 receives vacuum at its sleeve ports (see FIGS. 10A–B) and provides the vacuum at hub ports at the top surface. Thus, vacuum applied to rotary union 926 is in fluid communication with i.d. ring 908. Rod-mount 918 is attached to rotary servo 920 (part no. DM1004C available from Compumotor) so that the i.d. region assembly may be caused to rotate under programmatic control. (The above arrangement is the one used for 34 mm geometries. For 22 mm geometries the i.d. ring 908 is removed and replaced with a stepped metal insert 970 (see FIG. 9H))

The o.d. region grabber assembly 904 includes o.d. ring 906 that is compression fit into annular chamber 932 of o.d. chuck 928. The annular chamber is in fluid communication with a vacuum gland (not shown) and o.d. vacuum port (not shown) on chuck 928. Thus vacuum applied to the o.d. vacuum port is in fluid communication with o.d. ring 906. The o.d. chuck 928 include recess 929 into which i.d. centering device 916 fits when the bottom station is in the raised state. The o.d. chuck 928 is mounted to plate 934 which in turn is mounted to pneumatically-controllable bow actuator 936 (part no. Q97-4098 available from Compact Air) which is mounted to the plate portion 919 of rod-mount 918. Actuator 936 includes a fixed inner portion 939 and a movable outer portion 939 that is attached to plate 934 and thus may be used to cause the o.d. chuck 928 to move along the longitudinal direction of rod-mount 918. Because the o.d. assembly is also attached to servo 920 via rod-mount 918 it moves in unison with the inner assembly 902.

The bottom station 508 further includes mounting hardware 942 to align the components as described above, a sheath 596 to cover the components, and a drain bowl 938 to catch resin residue, if any, from a dispensing operation.

The structure of i.d. chuck 914 is shown in FIGS. 9D–E in perspective and cross-section views. A preferred chuck is made of UHMW plastic and is sized to fit around a projected portion 948 on top of a horizontal portion 949 of centering device 950. FIG. 9E shows the production dimensions of a preferred chuck and table 7 shows the sizes of these dimensions measured in inches.

TABLE 7

| dimension | size |
| --- | --- |
| A | 2.0 |
| B | 1.522 |
| C | 1.207 |
| D | 1.118 |
| E | 0.03 |
| F | 0.25 |
| G | .07 × 45° |
| H | .05 RAD. |

The structure of i.d. centering device 916 is shown in FIGS. 9F–G in perspective and cross-section views. FIG. 9G shows the production dimensions and table 8 shows the sizes of those dimensions measured in inches.

TABLE 8

| dimension | size |
| --- | --- |
| A | 0.995 |
| B | 0.935 |
| C | 0.815 |
| D | 0.752 |
| E | 0.595 |
| F | 0.35 |
| G | .01 × 45° |
| H | 0.060 |
| I | 0.25 |
| J | 0.22 |
| K | 0.28 |
| L | 0.348 |
| M | .01 RAD. |
| N | 0.213 |
| O | 0.939 |
| P | 0.2 |

The centering device includes annular chamber 950 in to which ring 908 is compression fit- Chamber 950 is in fluid communication with gland 952. Opening 951 is sized to receive arbor 764 (see FIG. 7D).

The structure of stepped metal insert 970 is shown in FIGS. 9H–I in plan and cross-section views. The metal insert is shaped to fit into the annular chamber used to hold the i.d. ring for the 34 mm geometry arrangement. It includes an initial elevation 762 of approximately 0.062 inches and a total height 764. For the top bow device insert this height is 0.172 inches and for the bottom station this is 0.162 inches. The outer diameter 766 is approximately 0.998 inches and the inner diameter 768 is about 0.752 inches.

The structure of o.d. ring 906 is shown in FIGS. 9J–K in perspective and cross-section views. Ring 906 preferably has a durometer rating of 45. The ring 906 is defined by angled lip 960, projecting up and radially outward, and angled lip 962, projecting up and radially inward. An annular region 964 is defined in-between and at a base of the lips. Thirty-six equally-distributed holes 966 of about 0.08 inch diameter extend through region 964. FIG. 9K particularly shows the production dimensions of a preferred ring, and the sizes of the dimensions are shown in Table 9 measured in inches.

TABLE 9

| dimension | size |
| --- | --- |
| A | 4.53 |
| B | 4.43 |
| C | 4.333 |
| D | 4.167 |
| E | 4.07 |
| F | 3.97 |
| G | 0.55 |
| H | 0.25 |
| I | 0.136 |
| J | 4.09 |
| K | 4.41 |

The structure of an exemplary rotary union 1000 is shown in FIGS. 10A–B in perspective, exploded, and cross-section views. Rotary union 926 is identical to the union 1000 shown except that the hub of union 926 is sized differently to mate with plate 924 than the hub 1018 of union 1000. Specifically the hub of union 926 is 3 inches in diameter and 0.5 inches thick. Union 1000 includes a sleeve 1001, which receives body 1002 over which o-rings 1003 are placed at o-ring grooves 1024. At each end of sleeve 1001 and around body 1002 a bearing 1030 is placed, and optionally a washer 1032. Snap ring 1034 facilitates holding the assembly together.

In operation sleeve 1001 is stationary and body 1002 may rotate about the longitudinal axis of body 1002. A given port of sleeve ports 1006 is in fluid communication with a hub port pair 1014 of hub 1018. Thus, the rotary union 1000 allows the provision of fluid, such as air under pressure or vacuum, to rotating hub 1018. Depending on the application, the fluid may emerge from a port on side 1016 of hub 1018 (as shown) or through a port 1019 on top surface 1020 (in this case shown plugged).

Sleeve 1001 has an outer diameter of about 1.75 inches and an inner bore of about 0.874 inches. Four sleeve ports 1006 extend through a surface of the sleeve 1001 and are positioned to be in alignment, when the union is constructed, with port grooves 1008 of body 1002. Stepped opening 1005 includes an outer opening of about 1.125 inches diameter and about 0.126 inches deep to receive a top bearing 1030 and an inner opening of about 1.042 inches diameter and about 0.04 inches deep to form a gap to accommodate an inner race bearing 1030. Identical openings exist at the opposite hidden end.

The body 1002 has an outer diameter at groove portion 1038 of about 0.870 inches and a series of port grooves 1008 and o-ring grooves 10024. Each port groove 1008 has a corresponding o-ring groove on either side. Each groove has a depth of about 0.180 inches. The o-ring grooves 1024 are machined at the inner diameter to have a curved surface, concave radially outward. Each port groove 1008 has an opening 1010 (two openings being hidden from view) that extends radially inward and that is in fluid communication with a gland (not shown) about 0.166 inches in diameter that extends to hub 1018. The hub 1018 includes four port pairs 1014, each consisting of a hub port on a side edge 1016 of hub 1018 and a hub port on a top surface 1020 of hub 1018. Two neighboring o-ring grooves are separated by a groove wall 1026 of about 0.108 inches wide, and groove walls 1028 are about 0.07 inches wide and separate an o-ring groove 1024 and a vacuum port groove 1008. The o-ring grooves 1024 are about 0.111 inches wide, and the port grooves 1008 are about 0.12 inches wide. The hidden surface of hub 1018 extends to a neck 1036 that is about 0.146 inches deep and that has the same outer diameter of groove portion 1038. Neck 1036 includes a stepped portion (not shown) about 0.970 inches in diameter and about 0.02 inches deep immediately adjacent to hub 1018. Preferably the o-rings 1003 are well lubricated before fitting them into o-ring grooves 1024. Snap ring groove 1036 is shaped to receive a snap ring 1034.

f. Top Substrate Bow Device

FIGS. 11A–E show top substrate bow device 512 in perspective and exploded views. Top substrate bow device 512 includes frame 1102 having vertical supports 1104 and 1106 and horizontal member 1108. A horizontal actuator 1110 is carried over horizontal member 1108, and under pneumatic control it may be moved from a first position, which is in vertical alignment with top station 510, to a second position, which is in vertical alignment with bottom station 508. The horizontal actuator 1110 is connected to a vertical actuator 1112 which has substrate bowing assembly 1114 mounted to it. The vertical actuator 1112 is used to raise and lower the bowing assembly 1114 to grab a substrate from the top station 510 when in the first position and to lower the assembly 1312 to close proximity of the bottom substrate on the bottom station 508 when in the second position. The bowing assembly 1114 grabs and bows the top substrate as outlined above when describing the dispense operation.

More specifically, the bow assembly 1114 includes a rotary union 1116 identical to the union 1000 described in relation to FIG. 10, coupled to a mount 1118 on one end and attached to actuators 1110 and 1112. The mount 1118 is coupled to spacer 1120, which limits the throw of bow actuator 1122 (part no. CQ2KWB25-10D-XG10 available from SMC). Actuator 1122 is attached to housing 1124, which on its hidden surface includes features for receiving compliance spring 1126, housing 1128, and o.d. ring 1134. Actuator 1122, under programmatic control, may be caused to lift the housing 1124 and thus the outer diameter region of the top substrate. Housing 1124 includes an annular chamber (not shown) on its hidden side into which o.d. ring 1134 is compression fit and which is in fluid communication with a vacuum gland (not shown). Vacuum is supplied to the chamber via port 1125. Spring 1126 is preferably made of music wire and has a diameter of 0.975 inches, a length of 0.88 inches, and a wire diameter of 0.074 inches. Spring 1126 helps dampen the release of the housing 1124. The dampened release has been found to minimize the existence of bubbles in eventually cured DVDs. The i.d. housing 1128 receives vacuum through opening 1129, which is supplied by rotary union 1116, via actuator shaft 1123. The i.d. housing 1128 includes features on its underside to receive chuck 1130, i.d. ring 1132 and arbor 1136. The i.d. ring 1132 is compression fit into an annular chamber (not shown) that is in fluid communication with vacuum supplied by port 1129. The i.d. ring is identical to those described above. The chuck 1130 is identical to chuck 914 described above (see FIGS. 9D–E). (The above arrangement is the one used for 34 mm geometries. For 22 mm geometries the i.d. ring 1132 is removed and replaced with a stepped metal insert 970 (see FIG. 9H))

Figure 11C:
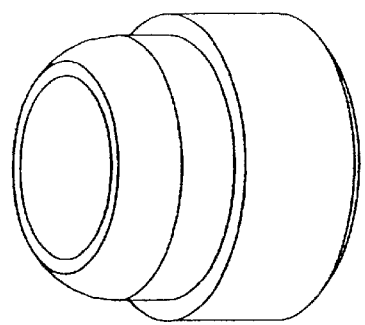
Figure 11D:
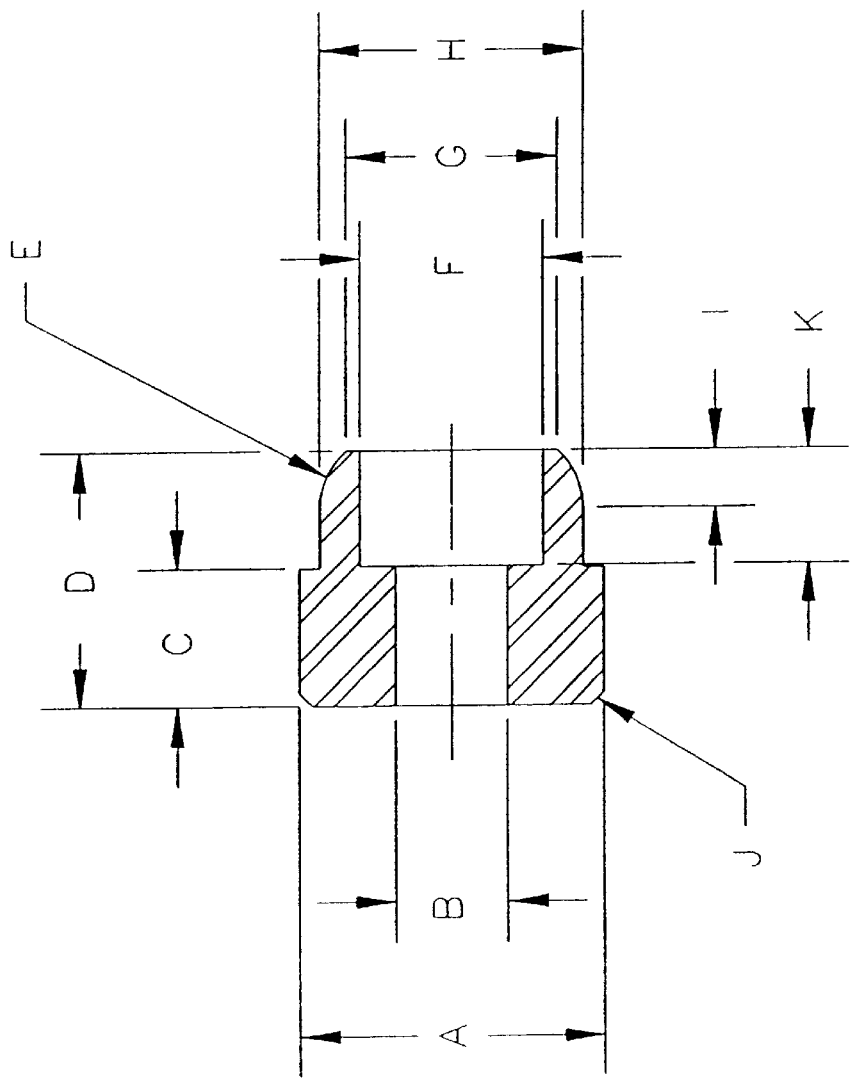

The structure of arbor 1136 is shown in FIGS. 11C–D in perspective and cross-section views. The arbor 1136 is preferably made of hardened and polished tool steel that is electro-less nickel plated. FIG. 11D particularly shows the production dimensions of a preferred arbor 1136, and Table 10 shows those dimensions measured in inches.

TABLE 10

| dimension | size |
|---|---|
| A | 0.687 |
| B | 0.250 |
| C | 0.311 |
| D | 0.576 |
| E | .15 RAD. |
| F | 0.410 |
| G | 0.474 |
| H | 0.5925 |
| I | 0.131 |
| J | .03 × 45° |
| K | 0.26 |

Rounded edge 1138 facilitates mating with the i.d. centering device and helps form a concentricity constraint to keep the i.d. holes of the substrates aligned. Hole 1140 receives mounting hardware (not shown)

After the top substrate is moved into vertical alignment with the bottom substrate and lowered, the top substrate is bowed 1.5–4 mm up at the outer diameter and the bottom substrate is bowed 0–2 mm down at the outer diameter.

g. Resin Dispenser

Figure 12A:
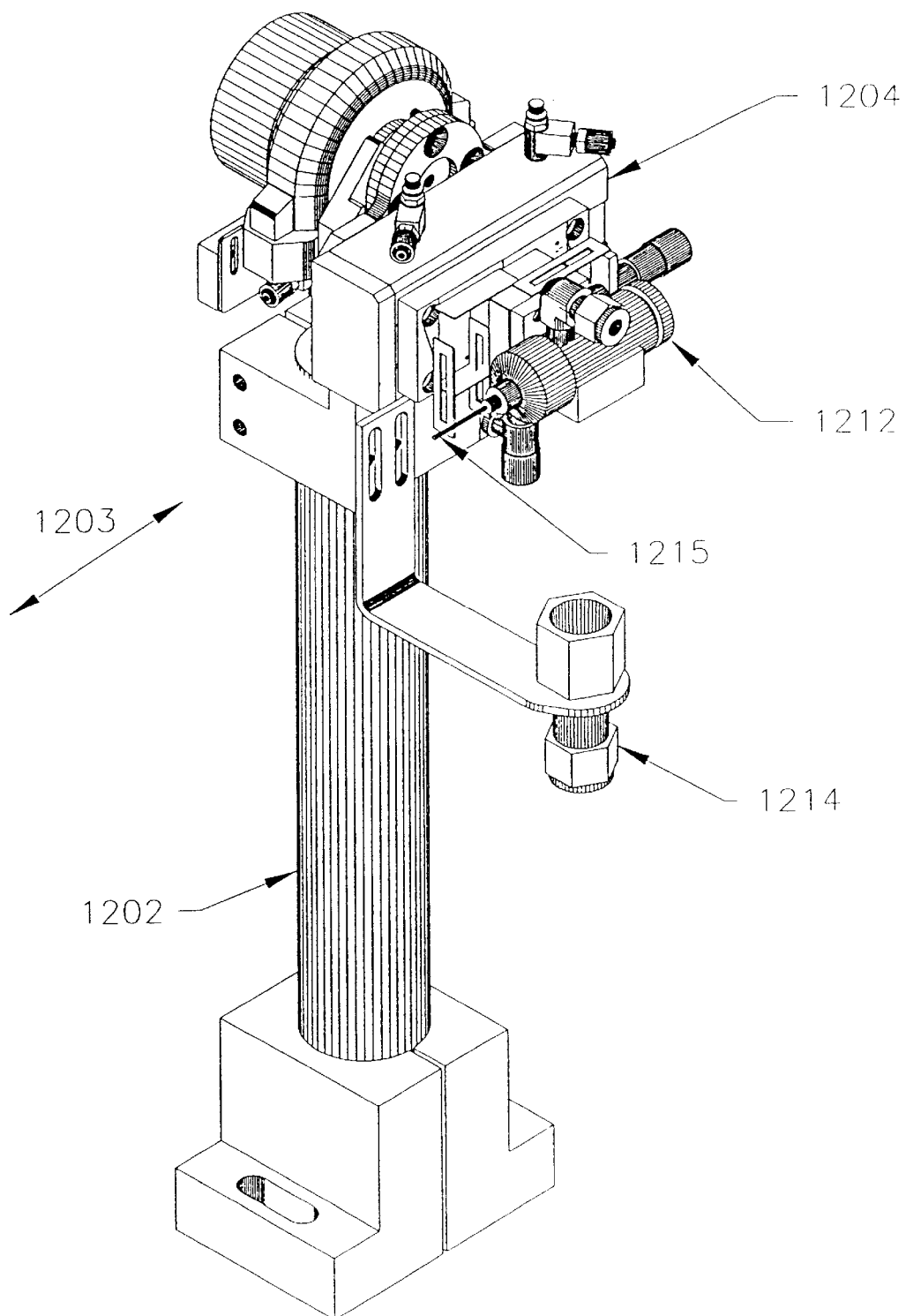
FIGS. 12A–C show an exemplary dispense machine.
Figure 12B:
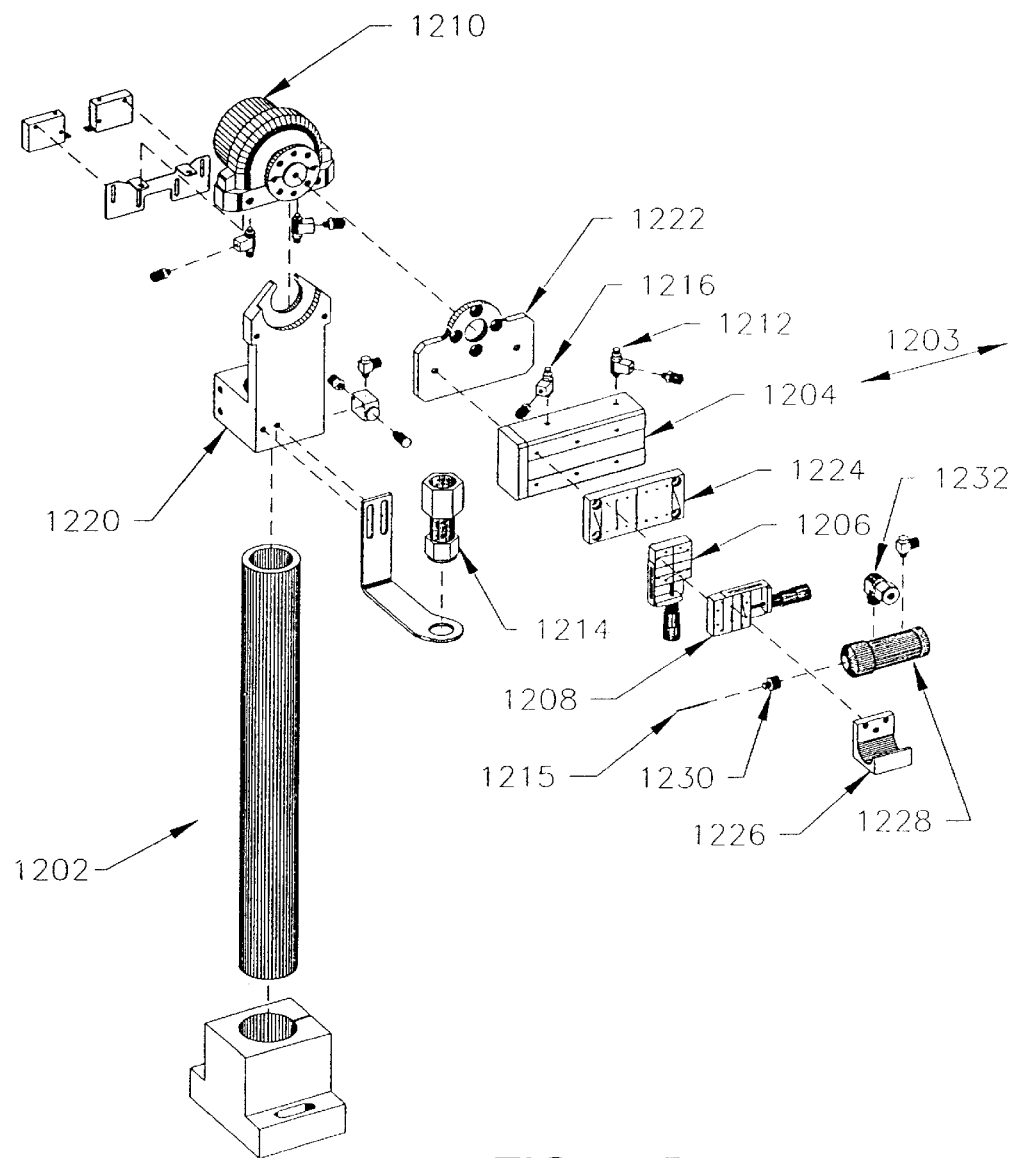
Figure 12C:
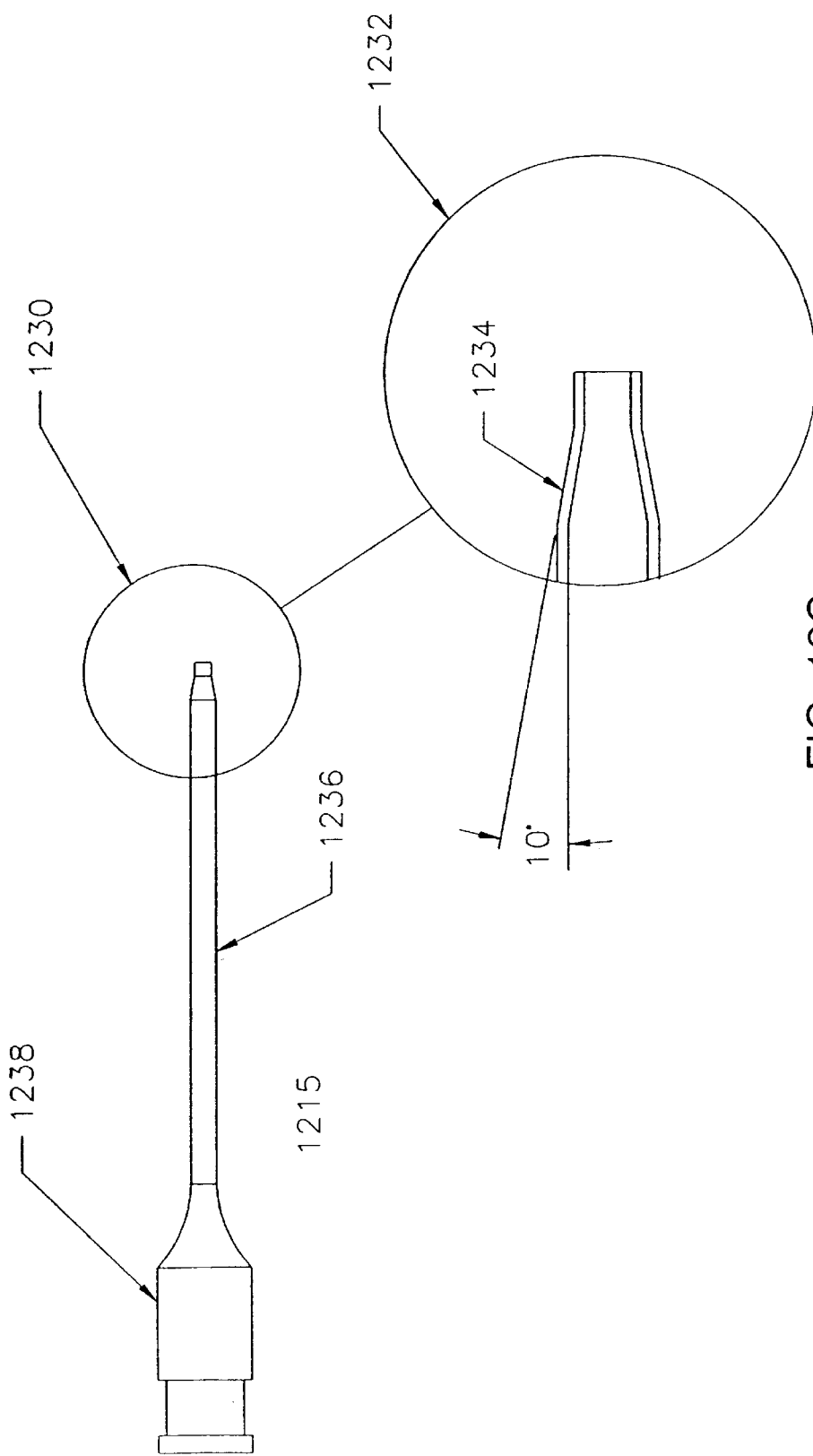

The structure of the resin dispenser 514 is shown in FIGS. 12A–C in perspective and exploded views. Resin dispenser 514 includes a stand 1202 to hold mount 1220 which holds servo 1210 and waste cup 1214. Servo 1210 (part no. DSRL-25-180-FW available from Festo) is connected to mounting plate 1222 to which is mounted horizontal actuator 1204 (part no. MXS12-50AS-A93L available from SMC). (Servo 1210 may be made to rotate the dispense assembly 1212 counter-clockwise such that needle 1215 is in vertical alignment with waste cup 1214, for example, during maintenance operations.) Actuator 1204 may be pneumatically controlled, by application of vacuum to vacuum ports 1216 and 1218, to move along the direction of arrow 1203 and is used to move needle 1215 into a desired position to dispense resin. Actuator 1204 holds micrometer plate 1224 and micrometer controls 1206 and 1208 (part nos. 101-X-M-PL and 101-X-M-PL-LEFT LOCK available from DEL-TRON). Micrometer controls 1206 and 1208 are used to fine tune the orientation of needle 1215, respectively, horizontally or vertically to a desired position so that the dispensed resin may attain a desired trajectory as explained below. Holder 1226 is mounted to the combination of plate 1224 and controls 1206 and 1208 and holds a pilot-actuated metering dispense valve 1228 (part no. 752VW/SSHEAD available from EFD). Valve 1228 holds a needle collar 1230 (part no. P-340 available from Upchurch Scientific.) and needle 1215 and receives heated, pressurized resin through valve 1232.

The structure of needle 1215 is shown in FIGS. 12C–D. For 34 mm moat geometries, needle 1215 is about 0.75 inches long and has a distal end 1230, defined by a projection 1232 that is about 0.04 inches long, is 18 gauge stainless steel and that has an inner diameter of about 0.0315 to 0.0345 inches. Projection 1232 is adjacent to transition portion 1234 which is defined by about a 10° radially outward extension until it reaches proximal portion 1236. Proximal portion 1236 has an inner diameter of about 0.053 inches and is 15 gauge stainless steel. Needle 1215 includes luer lock hub 1238.

For 22 mm moat geometries, the same needle 1215 is used but with the following sizes. Needle 1215 is about 1.5 inches long and has a distal end 1230, defined by a projection 1232 that is about 0.04 inches long, is 18 gauge stainless steel and that has an inner diameter of about 0.03 to 0.036 inches. Projection 1232 is adjacent to transition portion 1234 which is defined by about a 10° radially outward extension until it reaches proximal portion 1236. Proximal portion 1236 has an inner diameter of about 0.053 inches and is 15 gauge stainless steel. Needle 1215 includes luer lock hub 1238.

The resin dispenser 514 is controlled to move resin needle 1215 into a desired position. Preferred embodiments have the dispense process parameters adjusted based on the moat geometries. The following parameters are believed to be desirable starting points, but it is expected that end users may desire to adjust these parameters.

For 34 mm geometries this position is such that the tip of the needle is pointed radially toward the center point of the DVD and disposed about 19 mm from the outer diameter of the disk. The needle is approximately horizontal with a centerline of the bowed substrates. The needle 1215 projects resin about 5 mm while the bottom substrate is rotated at approximately 30–40 rpm for about 1 revolution (350–370°). The resin viscosity is about 600 cps. At an inner diameter region the substrates are clamped with about a 2 inch diameter with about 0.1 inches rounded interface edge due to the insert chuck.

For 22 mm geometries the resin is dispensed tangentially rather than radially. The needle is positioned along a tangent to a radius of the disk between 25–35 mm from the outer diameter. The needle may also be deflected relative to this tangent according to an angle $\ominus_D$ between 0–30°. The needle is approximately horizontal with a centerline of the bowed substrates. The needle 1215 projects resin while the bottom substrate is rotated at approximately 40–50 rpm for about 1 revolution (355–365°). The resin viscosity is about 400 cps. At an inner diameter region the substrates are clamped with about a 2 inch diameter with about 0.1 inches rounded interface edge due to the insert chuck The metal insert (which replaces the i.d. rings for the top bow device and the bottom station) provides approximately a 0.03 inch gap at the 2 inch diameter interface.

The top substrate rotates in unison as a result of friction forces. The resin is heated to approximately 70–90° F. and about 1–3 ml of resin is dispensed at approximately 20–30 psi (though the psi is viscosity dependent). The above causes the resin to have a desirable arcuate trajectory that just touches the concave up bow of the top substrate. The rotation of the substrates causes the dispensed resin to form a capillary bridge ring in-between the substrates; for the 34 mm geometry this bridge is at approximately 20 mm–24 mm in from the outer diameter; for 22 mm geometries this bridge is at approximately 25 mm–35 mm. The needle 1215 is then retracted outwardly to clear the outer diameter of the substrates.

The bottom station and the top station then both begin to un-bow. The un-bow rate is a function of the exhaust settings on the actuators and the bottom station is set to un-bow at a slightly faster rate than the top station. Near the end of the un-bowing of the bottom station the vacuum to the o.d. ring of the bottom station is released. Slightly later the o.d. vacuum of the top bow device is released. The bottom station is then actuated again to release the o.d. vacuum grip. The use of the compliance spring in the top bow device makes the un-bowing of the top station more consistent, effectively acting as a low pass filter.

Though a dispense machine 514 may operate with many types of resins, system 5 (see FIG. 2) preferably operates with resin L539-064 (400 c.p.s) available from Quretech.

The above arrangement has been found to form suitable capillary bridges on the substrates while achieving a suitably high fluid dispense velocity to minimize needle contamination, yet low enough to avoid fluid turbulence during dispense.

7. SPIN STATION

Figure 13A:
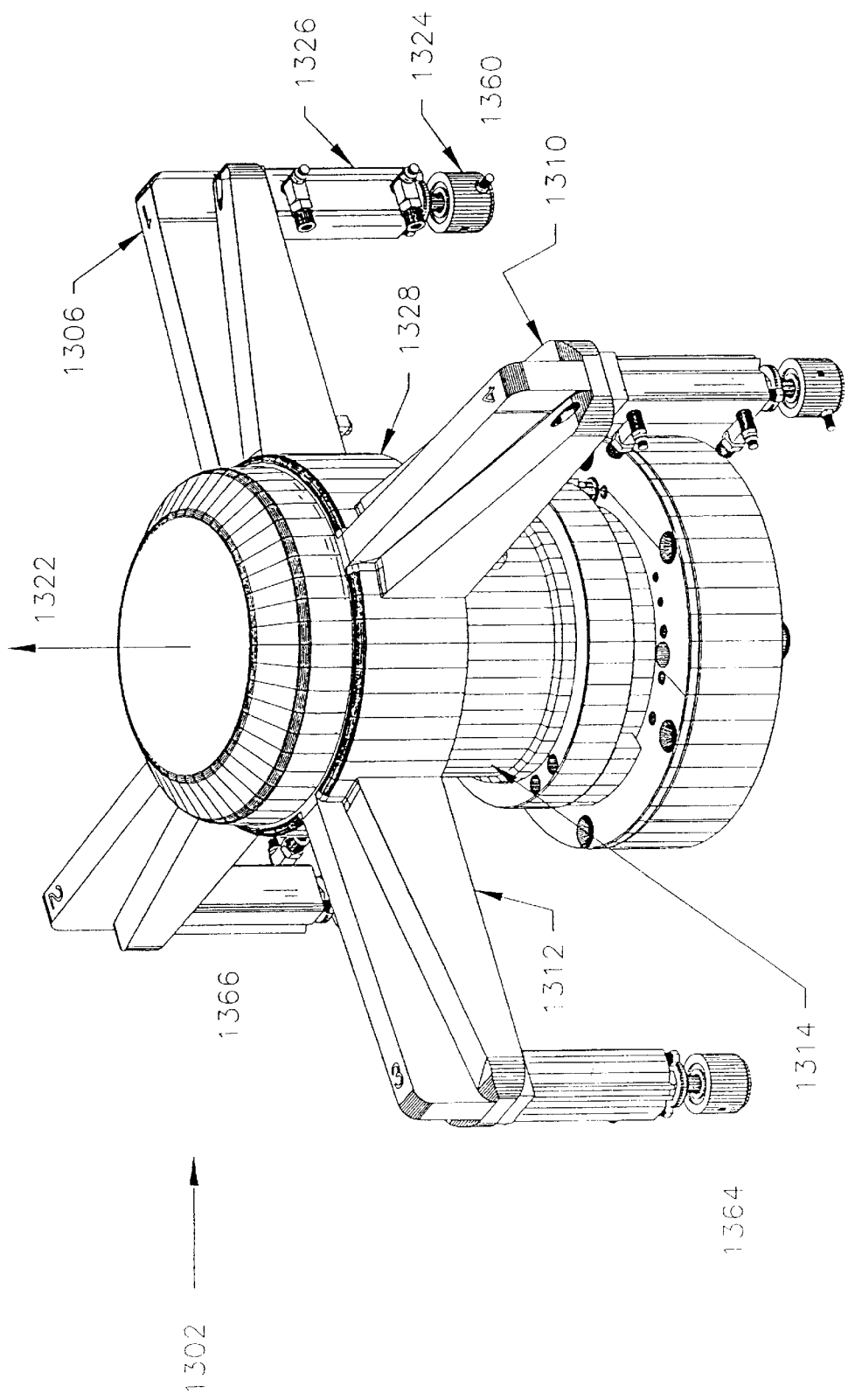
FIGS. 13A–B show an exemplary spin station robot.
Figure 13B:
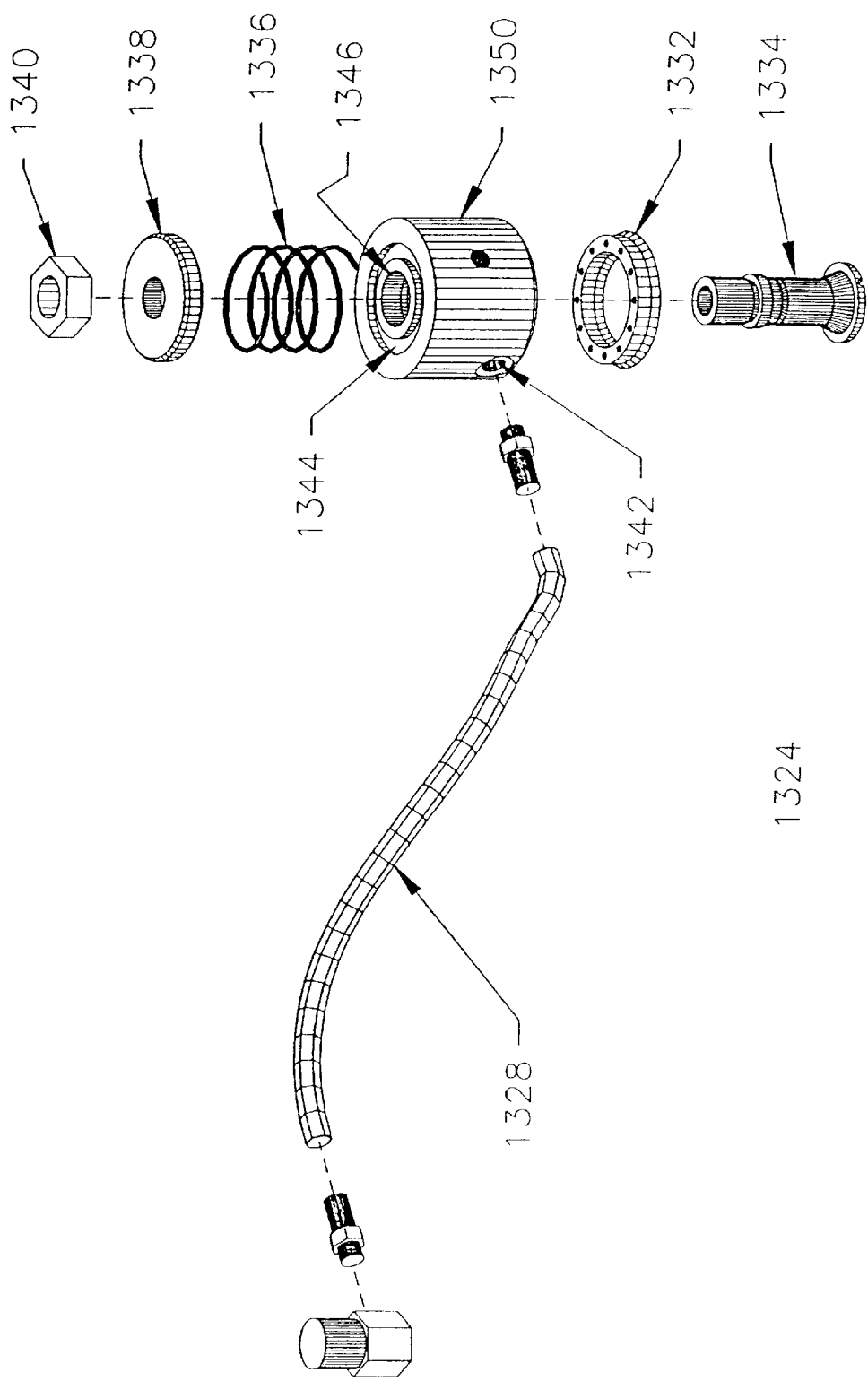
Figure 14A:
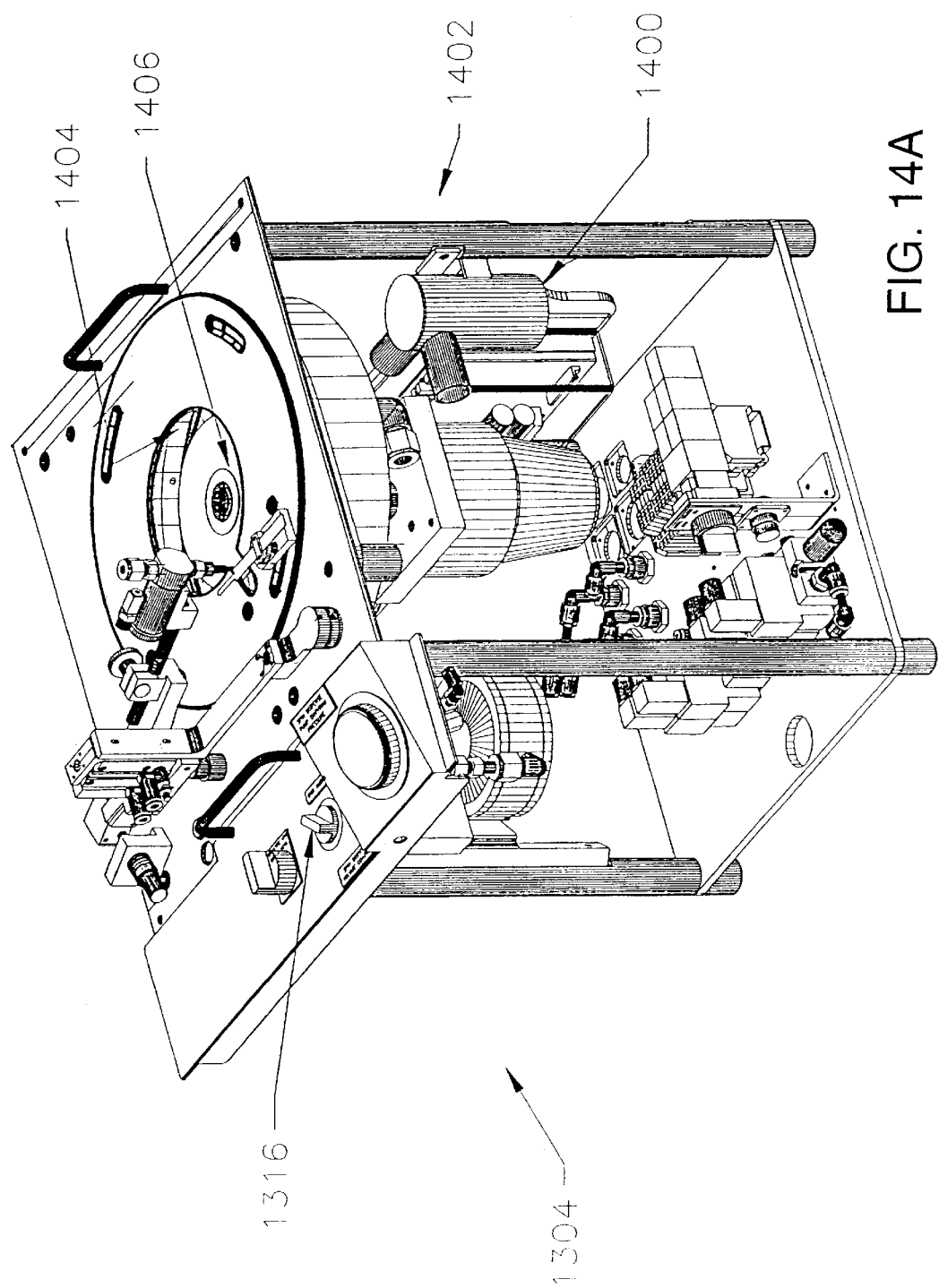
FIGS. 14A–E show an exemplary spin assembly.

A preferred spin station 40 (see FIG. 2) includes spin station robot 1302 (see FIGS. 13A–B) and two identical spin assemblies 1304 (see FIG. 2 for plan view and FIG. 14A for perspective view). The spin assemblies 1304 and robot 1302 are mounted on stands (not shown for robot) to place them in alignment with the conveyor 25 (see FIG. 2), as described below. More specifically, robot 1302 is centered between index position 41 and a cure index position 46 in one direction, and between the two spin assemblies 1304 in an orthogonal direction (see FIG. 2).

The spin station 40 is responsible for receiving combinations 7 at index 41 and producing spun combinations in which a fluid-state cure agent is more evenly distributed in-between the substrates 6 of a combination 7, extending from an inward location at or very near the moats to the outer diameter of the DVD.

a. Operation

Figure 1C:
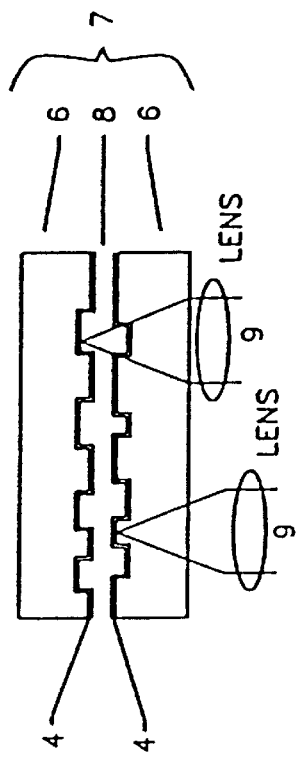
Figure 1E:
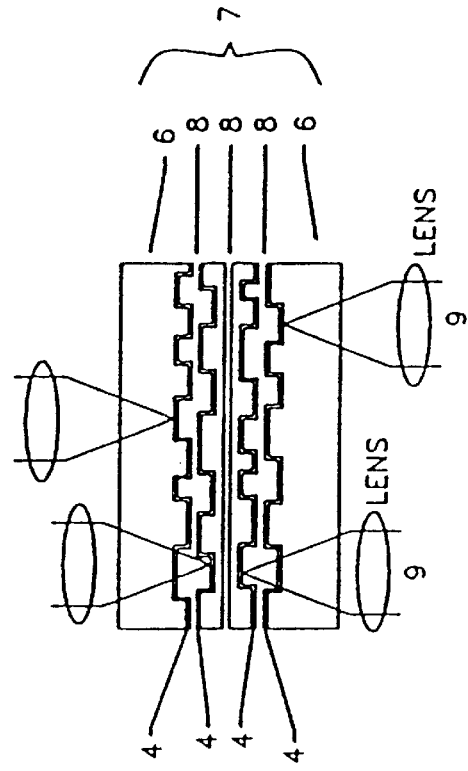
Figure 1D:
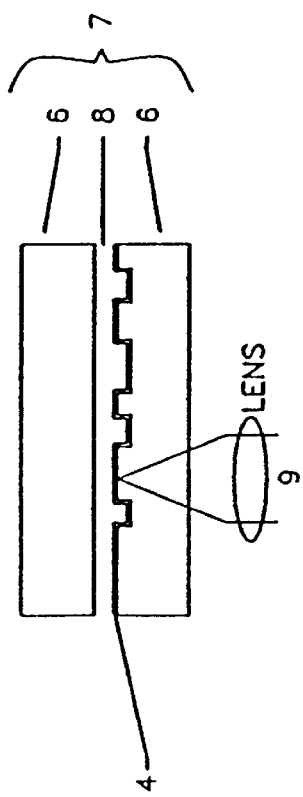
Figure 1F:
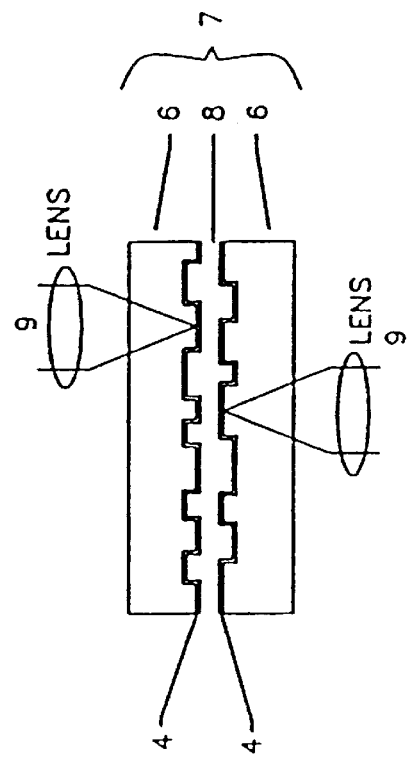

The preferred spin station 40 is spaced from the dispense station 35 to allow a suitable time delay for capillary forces to attract the resin to the facing moats of combination 7 (see FIG. 1B). Under a preferred embodiment, there is approximately a 24–28 second delay from the dispense station to the spin station for DVD5 and DVD10, and an approximate 33–39 second delay for DVD 9. This is accomplished with a 4.8 second double-index cycle time for DVD5, a 5.2 for DVD9, and a 6.2 for DVD10. Because of the event-based control, the actual times experience some jitter.

Robot 1302 is positioned so that robot position 1360 corresponds to conveyor index 41, robot position 1362 corresponds to a first spin assembly 1304, robot position 1364 corresponds to cure index position 46, and robot position 1366 corresponds to a second spin assembly 1304.

In a first state, the robot 1302 simultaneously vacuum grabs a combination 7 from conveyor position 1360 with arm 1306 and a spun combination from a first spin assembly position 1362 with arm 1310. In a second state, the robot 1302 rotates 90° clockwise about axis 1322 to simultaneously transfer the combination from the conveyor position 1360 to the first spin assembly position 1362 and the spun combination from first spin assembly position 1362 to the cure position 1364. This transition to the second state correspondingly moves robot arm 1308 to conveyor position 1360 and arm 1312 to the second spin assembly position 1366. While in the second state, the arm 1306 releases a combination to first spin assembly position 1362 and arm 1310 releases a spun combination to cure position 1364. At the same time, arm 1308 grabs a combination from conveyor position 1360, and arm 1312 grabs a spun combination from second assembly position 1366. In a third state, the robot 1302 rotates 90° counter-clockwise about axis 1322 to simultaneously transfer the combination from the conveyor position 1360 to the second spin assembly position 1366 and the spun combination from the second spin assembly position 1366 to the cure index position 1364. All of the above occurs under programmatic control and is repeated to interleave the operation of two spin assemblies.

Each spin assembly 1304 vacuum grabs the combinations from below by a spin device 1402. For 34 mm moat geometries, a spin arm 1316 moves into position above the combination to form a vacuum seal above the top surface of the top substrate and to create a vacuum in an interior chamber 1320 of the combination (see FIG. 14E). (The use of spin arm 1316 is optional for 22 mm geometries.) This vacuum created in the interior chamber is used to hold the resin that has migrated to or very near the moats. The spin device 1402 then spins the combination according to a predetermined spin profile to cause the resin to distribute radially outward and evenly. The vacuum at the interior chamber is chosen to balance the centrifugal forces created from the spin operation. Once spun, the combination is ready to be transferred by robot 1302 to the cure station 45 (index 46 in FIG. 2; robot position 1364 in FIG. 13A).

b. Spin Robot

The structure of spin robot 1302 is shown in FIGS. 13A–B in perspective and exploded views. The robot 1302 has four equal-length and equally-spaced arms 1306, 1308, 1310, and 1312, projecting radially outward from axis 1322. The arms and upper assembly 1328 may be caused to rotate by rotary servo 1314 (part no: DR5030 available from Compumotor) under programmatic control into one of the three states described above. Each arm has a downward projecting piston 1326 (part no: CDQ2WB15-50DCM-A731 available from SMC), which may be actuated vertically under programmatic control as described above. At a distal end of each piston a pick head 1324 is attached.

Each pick head 1324 includes a housing 1330, having an annular chamber (hidden on underside) that is in fluid communication with a vacuum gland (not shown) that is in fluid communication with port 1342 connected to vacuum supply line 1328. An i.d. ring 1332 identical to those described above is compression fit into the annular chamber. A compliance spring 1336 fits into a recess 1344 on the piston-side of housing 1330 and is held at the other end by retainer 1338 and nut 1340 which threads on to a piston bolt. Spring 1336 is preferably stainless steel, has a diameter of 0.845 inches, a length of 1.5 inches, and a wire diameter of 0.055 inches. A break-away post 1334 fits into an interior chamber 1346 of housing 1330 and screws onto a piston bolt (not shown) to hold the head 1324 on to the piston 1326. Tapered features on 1334 and matching interior features of 1330 allow lateral/angular compliance when the assembly is caused to over-travel slightly.

c. Spin Assembly

The structure of spin assembly 1304 is shown in FIGS. 14A–D in perspective and exploded views. Spin assembly 1304, includes stand 1400 on a top surface of which is mounted spin arm 1316 and underneath the top surface of which is mounted spin device 1402. Robot 1302 transfers combinations through opening 1404 onto a top surface of spin chuck 1406. The top surface of spin chuck 1406 is in horizontal alignment with conveyor 25.

Figure 14B:
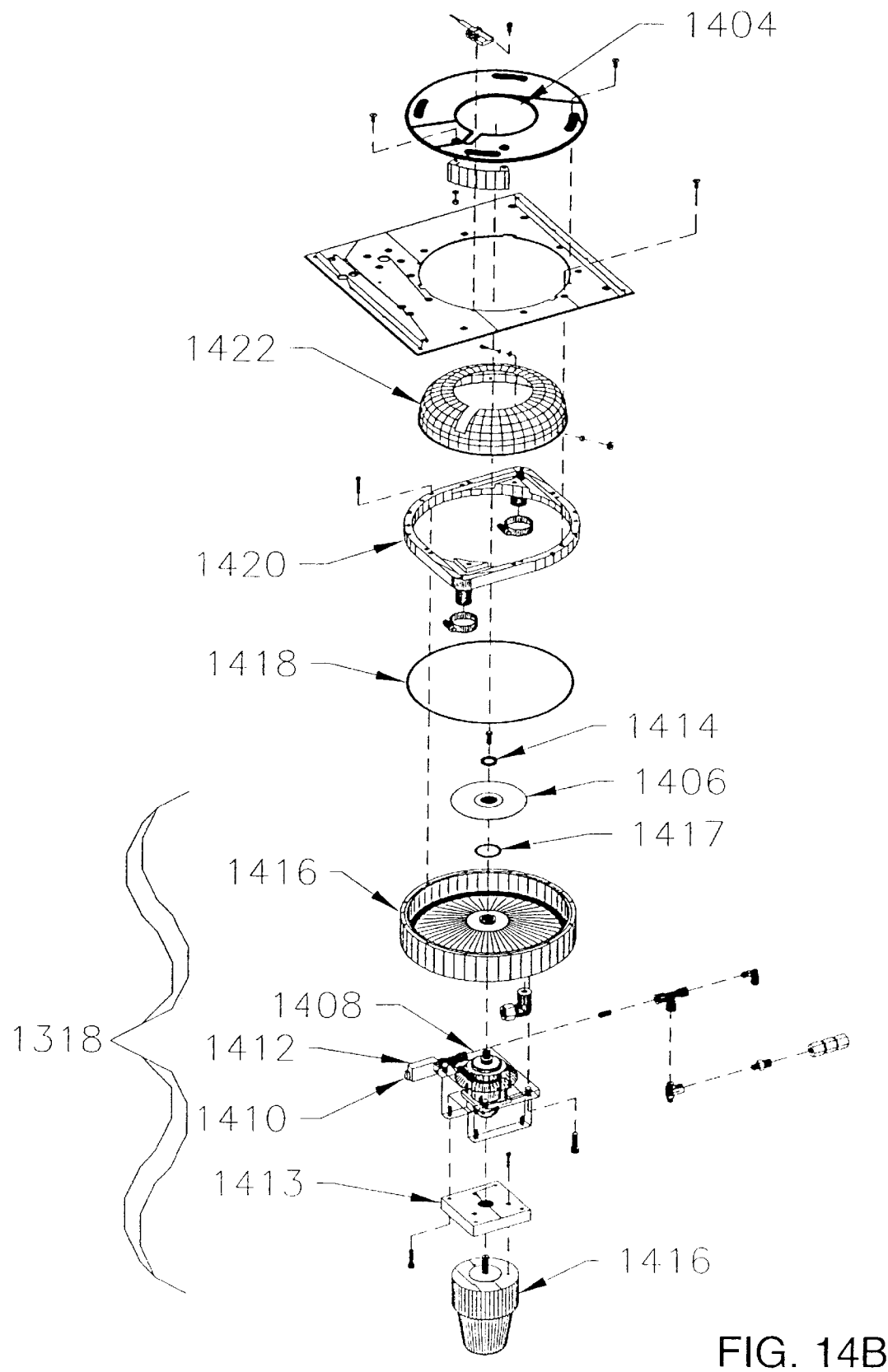

The structure of the spin device 1402 is shown more particularly in FIG. 14B. Chuck 1406 is made of aluminum and includes an annular chamber in fluid communication with a vacuum gland (not shown). The vacuum gland, in turn, is in fluid communication with a vacuum port at the center of the chuck 1406 and that is coupled to spindle port 1410 of rotary vacuum supply 1408 which supplies vacuum provided at input 1412. Thus vacuum applied at input 1412 is in fluid communication with the annular chamber of chuck 1406. An i.d. ring 1414, identical to the ones described above except that its durometer rating is 55, is compression fit into the annular chamber and is used to vacuum grab the bottom surface of a combination at the handling area.

Figure 14C:
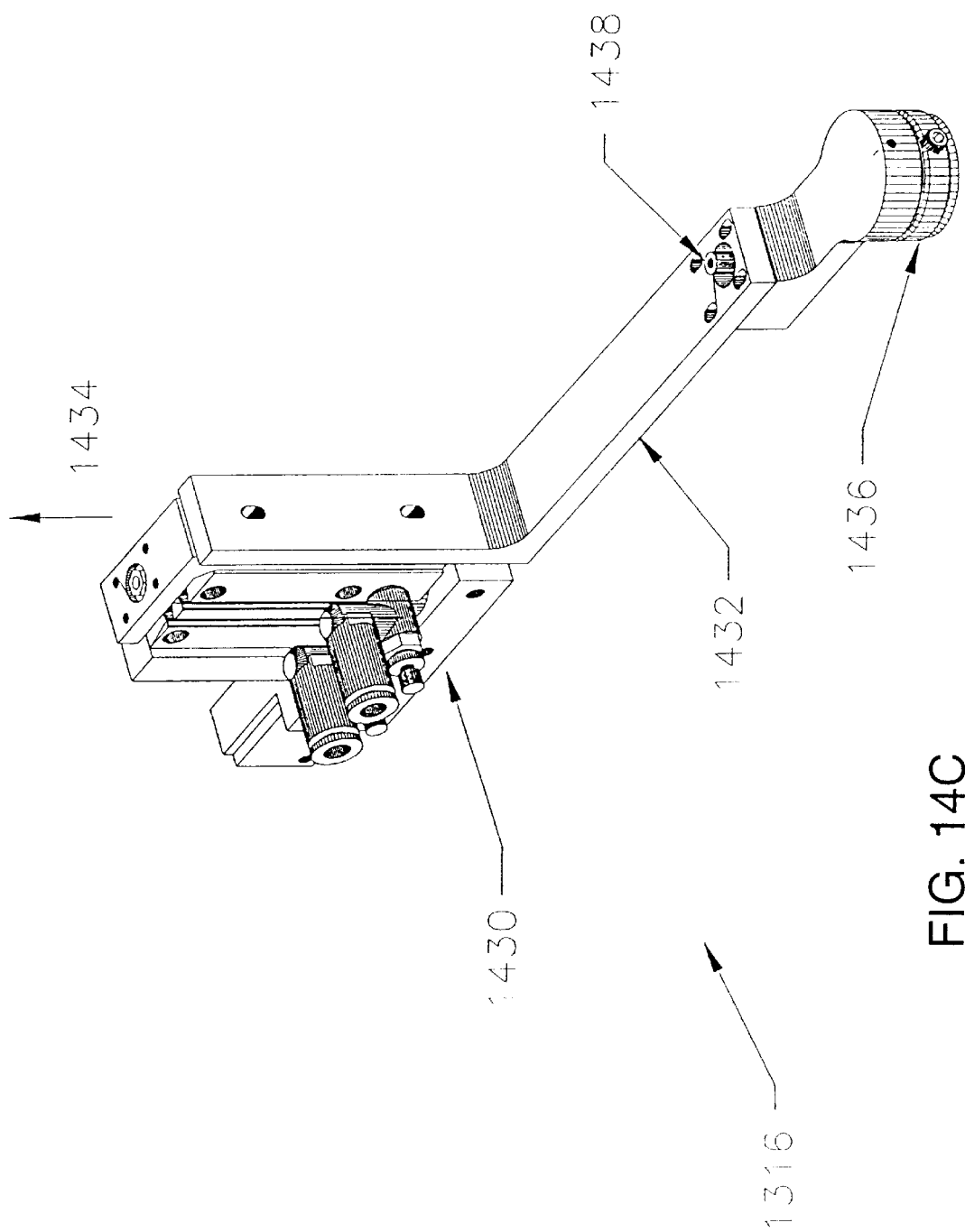
Figure 14D:
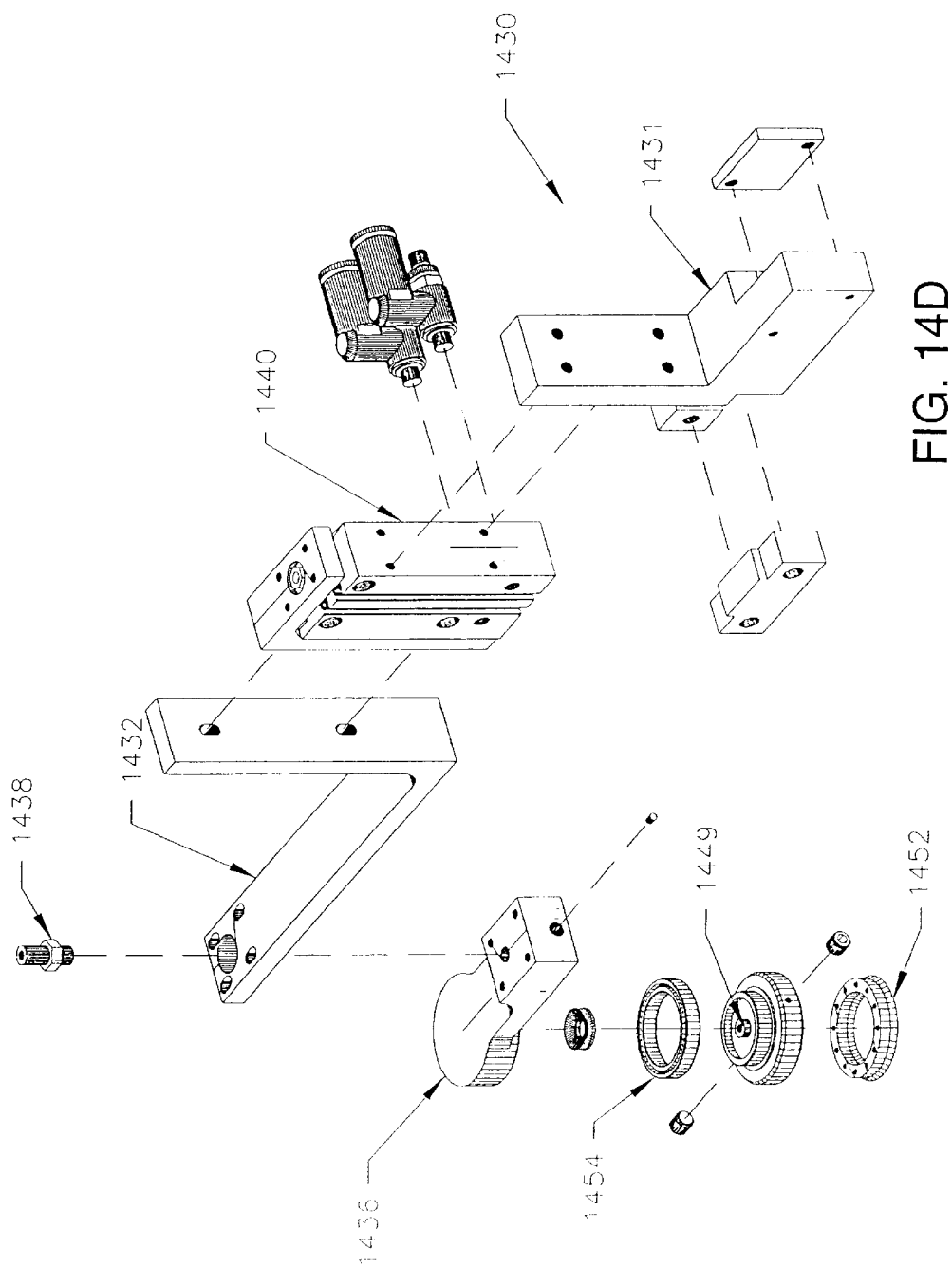
Figure 14E:
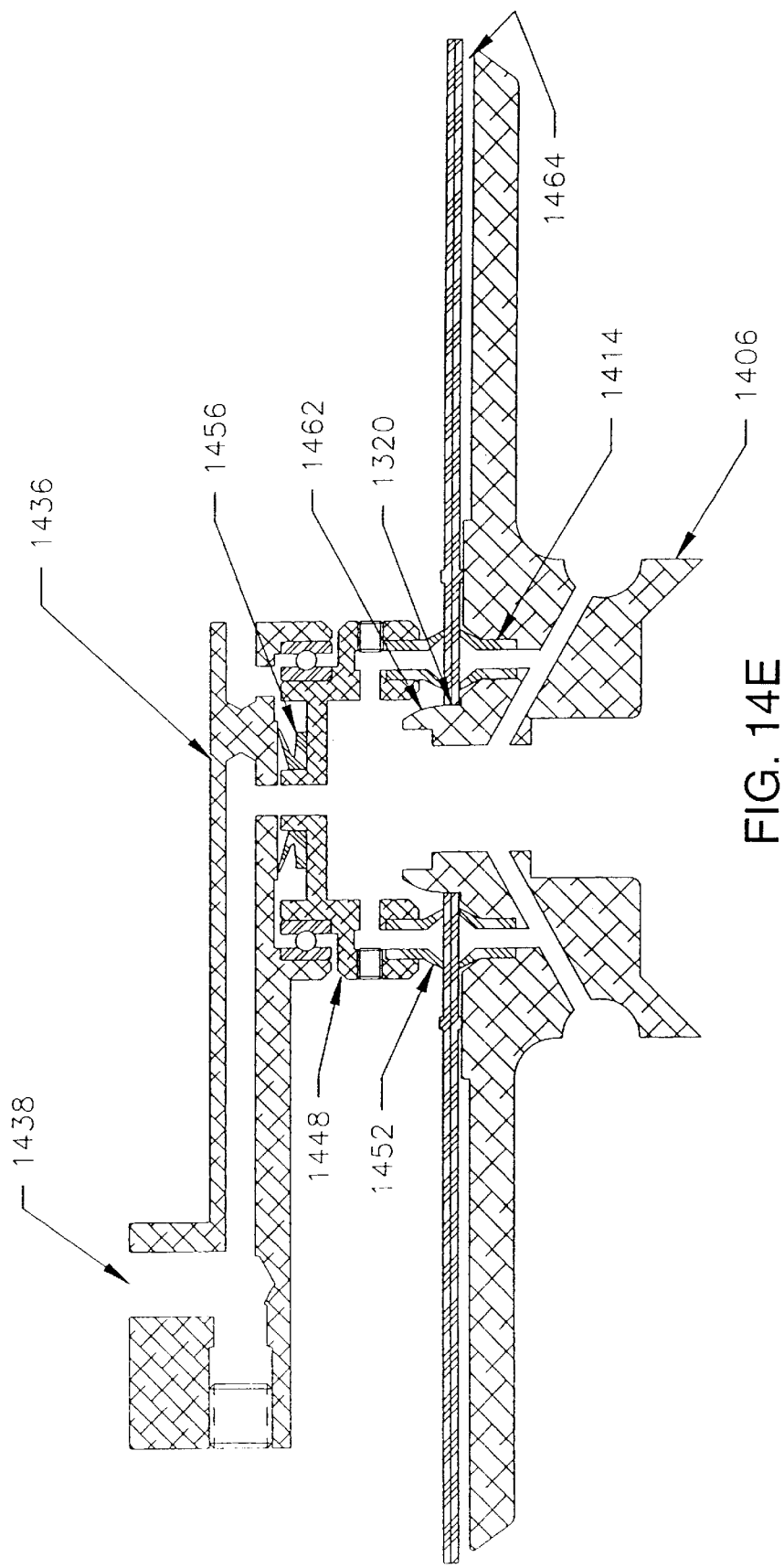

The structure of the metal spin chuck 1406 is shown more particularly in FIG. 14E. The i.d. arbor 1462 has an outer diameter of 0.591 inches +0.0 and −0.001 inches. The curved portion 1462 has a radius of curvature of about R.3745. Analogously to cure chuck arbor 1530 (see FIG. 15D), arbor 1320 includes three symmetric recesses of about R.25 radius to lessen the surface contact with the i.d. hole of the combination. The chuck includes a raised lip 1464 which starts at about 4.625 inch diameter and ends at about 4.7 inch diameter and has a height of about 0.03 inches.

The rotary vacuum supply 1408 includes a housing and also have a bearing and is mounted to rotary servo 1416 (part no. MO-80 available from Mavilor) via adapter plate 1418. The rotary may be programmatically controlled to implement a preferred spin profile. A preferred embodiment uses a dual acceleration profile that includes an initial acceleration of 50 rpss until a velocity of 1000 rpm ±200 rpm is attained. Then the combination is spun at that velocity for about 8 seconds ±2 seconds and the combination is again spun at an acceleration of about 200 rpss until a velocity of about 2800 rpm ±100 rpm is attained. The combination is spun at that velocity for about 0.5 to 1.0 seconds and then the combination is decelerated at a rate of about 200 rpss until the combination is caused to come to a rest. The dual acceleration profile causes a relatively even distribution of resin to result free of bubbles. It has been observed that the preferred spin profile when operating with the above preferred aspects and for 22 mm geometries causes a substantially even bond layer of approximately 45–58 microns ±7–8 microns within a disk, and ±≦3 microns within any radius.

The chuck 1406 is contained within spin bowl 1416 which is shaped to catch and drain to a reservoir (not shown) any resin projected as a result of the spinning operation. An o-ring 1417 is positioned between the chuck 1406 and the spin bowl 1416 to provide a seal. Another o-ring 1418 is provided on a top surface of the spin bowl 1416 to provide a seal with the exhaust manifold 1420 mounted on top of o-ring 1418. Manifold 1420 catches and drains resin mist that may result from the spinning process, and a shield 1422 protects the combination from any projected resin or resin mist that moved upward and this protection may be supplemented with splash back screens, for example, of medium mesh.

The structure of spinner arm 1316 is shown more particularly with FIGS. 14C–E. Arm 1316 include a mount assembly 1430 which is connected to a rotary (not shown) to rotate an extension 1432 about axis 1434 under programmatic control to position spin head 1436 over opening 1404 of spin assembly 1304. The spin head 1436 includes a 0.094 inch diameter vacuum gland (not shown) providing fluid communication to vacuum supply 1438 and a downward-facing center port (not shown) in head 1436.

The head assembly's 1436 downward-facing port is aligned with an opening 1449 of ring housing 1448, and is sealed by rotary seal 1456. Ring housing 1448 is compression fit into a bearing 1454 which in turn is compression fit into a recess (not shown) of head assembly 1436. Housing 1448 includes a vacuum gland (not shown) that extends from opening 1449 to a downward-facing port in the center of the housing. It also includes a downward-facing annular chamber (not shown) into which an i.d. ring 1452, identical to those discussed above, is compression fit. The i.d. ring, in this instance, however, is not supplied with vacuum to vacuum grab a substrate or combination; instead, it is used just to form a seal when the head 1436 is actuated downward to engage a top surface of a combination. Vacuum supplied by port 1438 is used to create the vacuum in the interior chamber 1420 of the combination. For 34 mm geometries, about 18–24 inches of mercury of vacuum are provided.

The assembly 1430 includes a mount 1431 to attach to the rotary servo (not shown) that rotates extension 1432 into position. Vertical actuator 1440 (part no. MXU6-25-A93L available from SMC) is mounted to mount 1431 to raise and lower the spin arm 1316 in the direction of axis 1442 to engage and disengage a combination through opening 1404 in the spin assembly.

8. CURE STATION

Figure 16A:
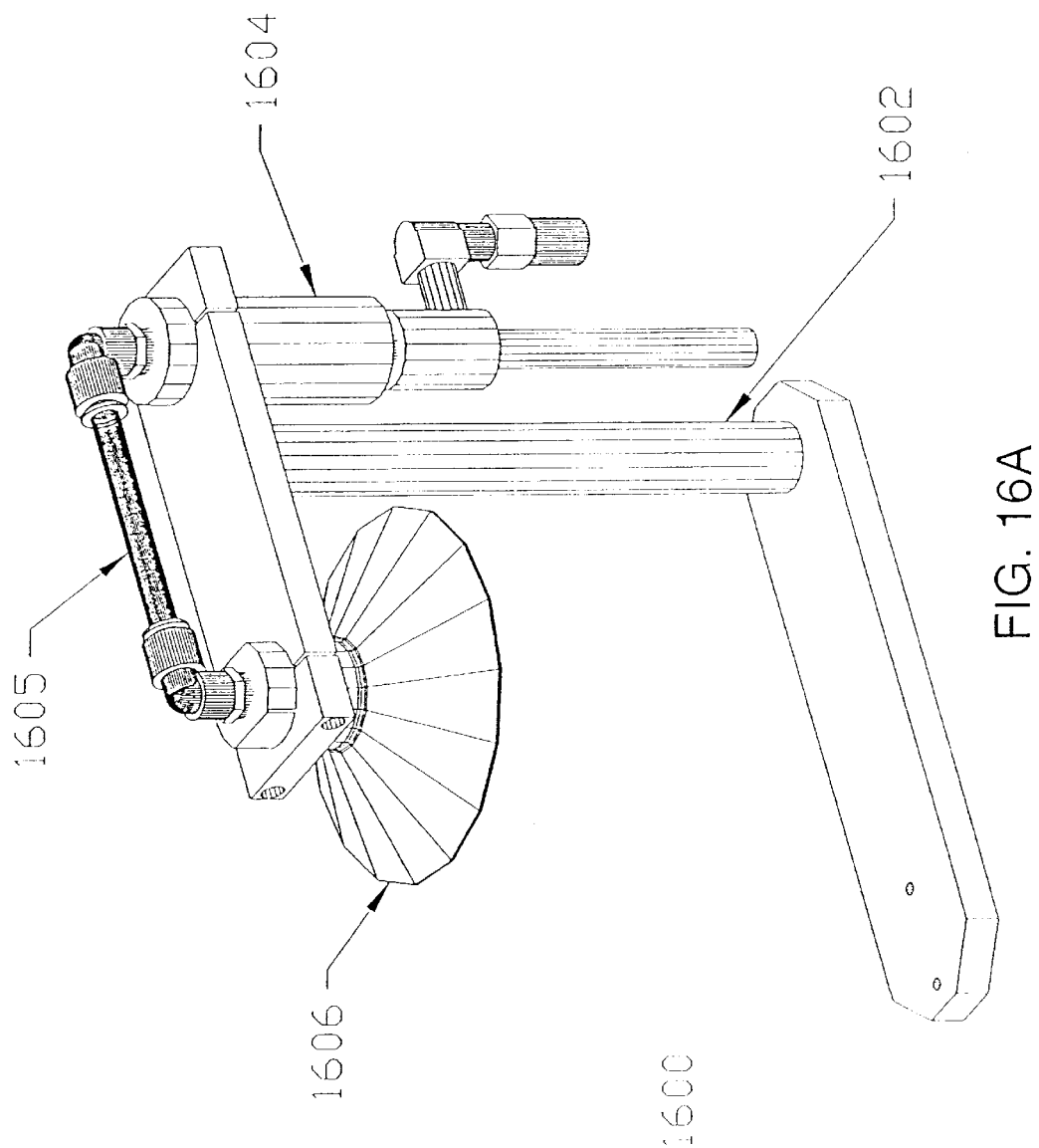
Figure 17A:
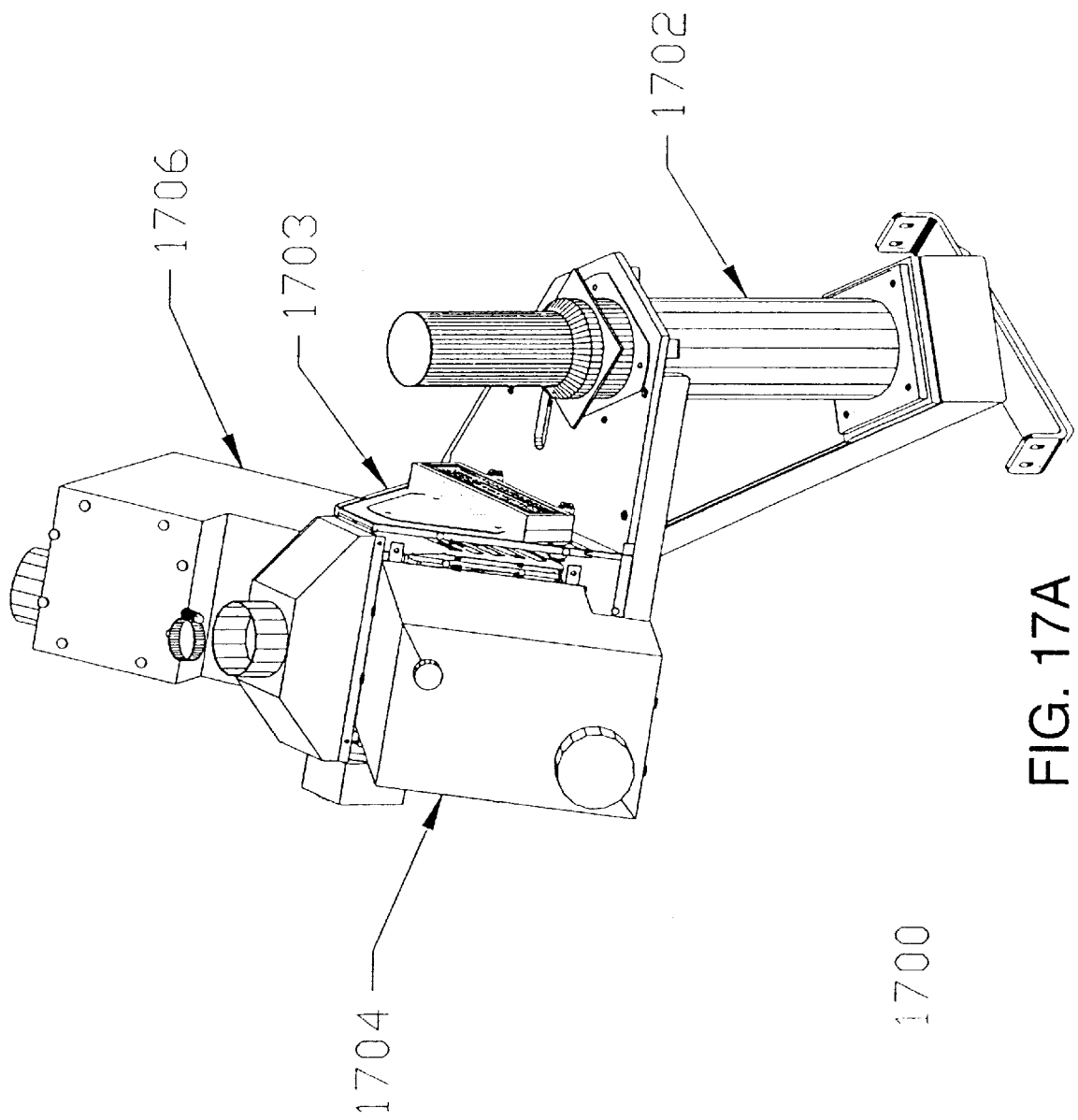
FIGS. 17A–D show an exemplary lamp assembly.
Figure 17B:
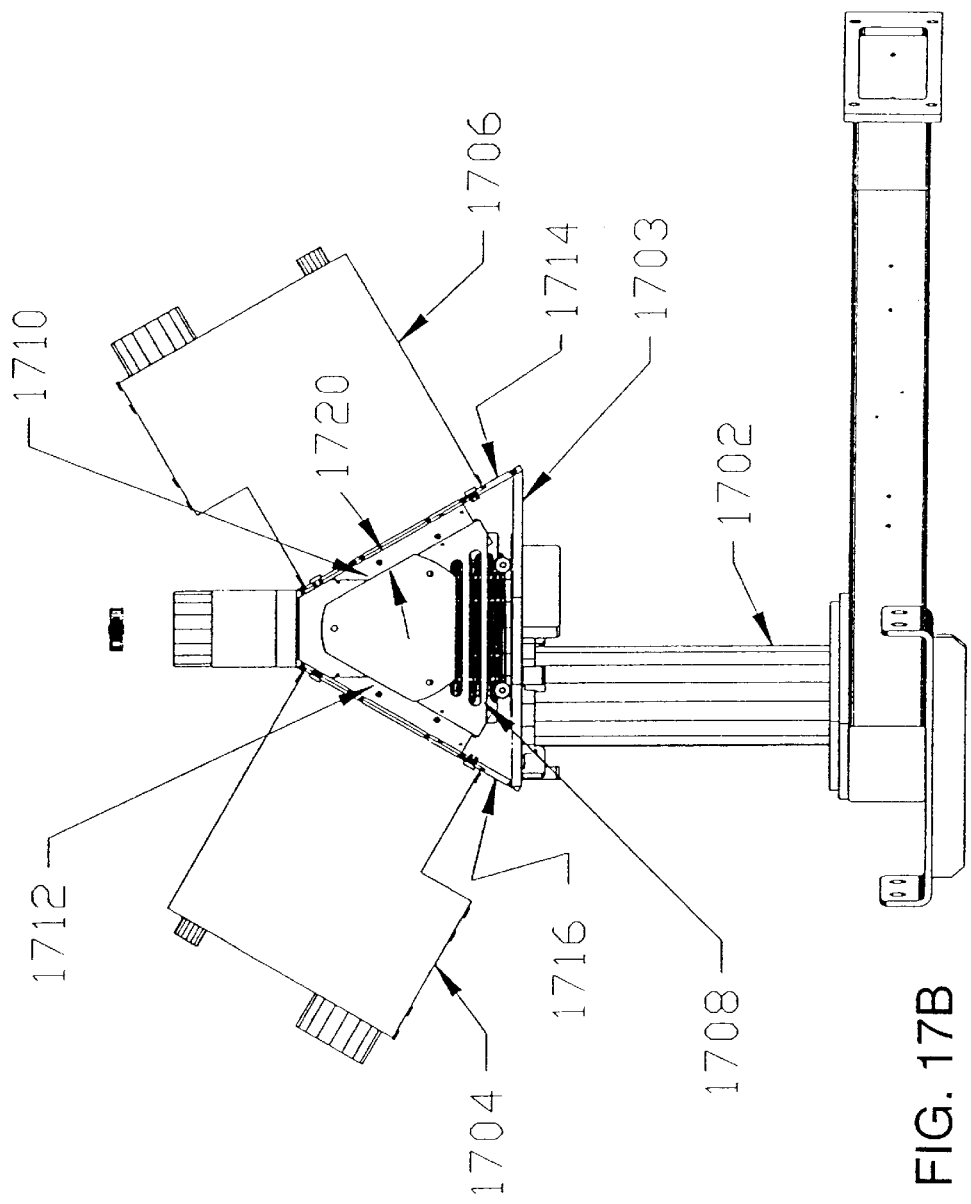
Figure 17C:
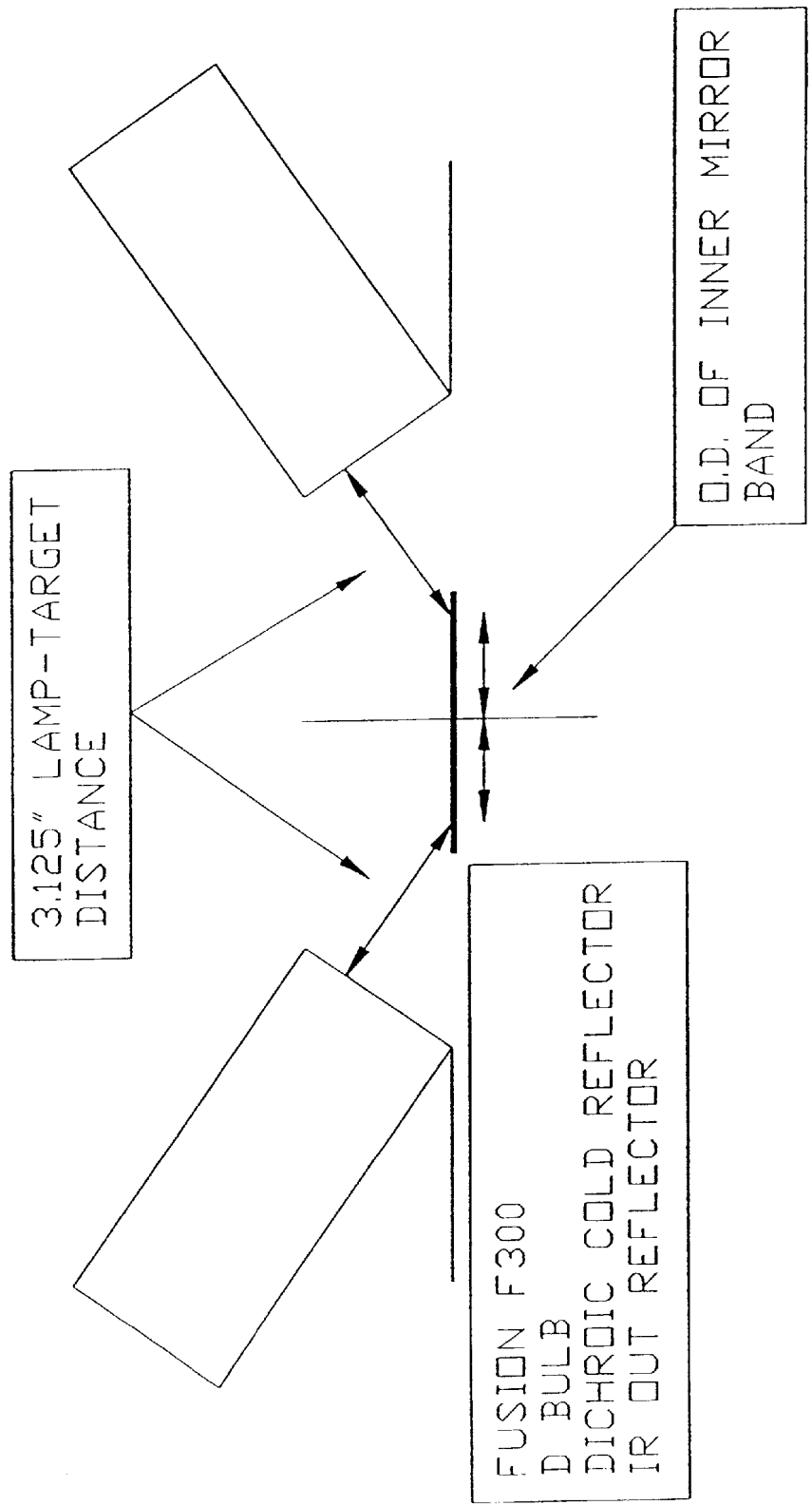

A preferred cure station 45 (see FIG. 2) includes a cure table assembly 1500 (see FIGS. 15A–H), a thermal management system having a pre-cooling device 1600 (see FIGS. 16A–C) and post-cooling devices 1800 (see FIGS. 18A–B), and a lamp assembly 1700 (see FIGS. 17A–C). The cure table assembly 1500 is mounted on a stand (not shown) to place a cure table surface 1508 in horizontal alignment with conveyor 25 and spin station 40 (see FIG. 2). The pre-cooling device 1600 is vertically aligned with a pre-cooling index 1512 and above surface 1508. The lamp assembly 1700 is vertically aligned with a curing index 1514 and above surface 1508, and post-cooling devices 1800 are vertically aligned with post-cool indexes 1516, 1518, and 1520 and below surface 1508.

The cure station 45 is responsible for receiving spun combinations (not shown) at a receiving index (index 46 in FIG. 2; robot position 1360 in FIG. 13A and FIG. 15A) and producing a cured DVD ready to be tested by finishing station 50 (see FIG. 2).

a. Operation

After a combination is spun by the spin station, the spin robot 1302 transfers it to a free-floating cure chuck 1530 at receiving index 1360 of cure table assembly 1360. Once there, the combination is double-stepped through the cure table 1502 to perform certain pre-cooling, curing, and post cooling operations.

More specifically, a spun combination makes the following path indicated by the arrows through a nine-index, double-step cure table 1502. The combination is received at 1360 and double-stepped to cure index 1510. Though two cure indexes are stepped,-this occurs in one index interval.

Next, the combination is double-stepped to pre-cool index 1512 where a top surface of the spun combination is pre-cooled. In short, the pre-cooling operation is intended to pre-shrunk the top surface as an inverse operation to the thermal expansion that will occur in a substrate cure operation.

The combination is then double-stepped to curing index 1514 where the spun combination is raised by a cure chuck lifting assembly 1560 (see FIGS. 15F–H) into a lamp assembly 1700 (see FIG. 17) and cured with UV light. This curing operation will introduce energy that is absorbed in part by the combination and by cure chuck 1530. Raising the chuck 1530 to the lamp assembly helps isolate the energy absorption to the chuck 1530, and helps insulate the table 1502, which facilitates thermal management. During the curing operation, the cure chuck lifting assembly 1560 vacuum holds the entire combination flat and rotates the combination. This facilitates even curing and reduces warping.

The cured combination is then double-stepped in sequence through post-cooling indexes 1516, 1518, and 1520. At each post-cooling index a post cooling device 1800 (see FIG. 18) is raised into contact with the cure chuck 1530 to help cool the chuck.

The combination is then double-stepped to index 1522 where the cured, cooled combination (i.e., the DVD) is removed by the finishing station 50.

Cure index 1524 is an empty station.

a. Cure Table Assembly

The structure of the cure table assembly 1500 is shown in FIGS. 15A–H in perspective and exploded views. The assembly 1500 includes a nine-index aluminum cure table 1502, an aluminum cure chuck 1530, and a cure-chuck lifting assembly 1560, positioned below cure index 1514. The table 502 is double-step rotated, i.e., 40° at a time, counter-clockwise by a servo (not shown). The table 502 includes nine beveled openings 1526 shaped to mate with a beveled surface 1532 of cure chuck 1530.

The structure of cure chuck 1530 is shown in FIGS. 15B–C in perspective and cross-section views. The chuck 1530 includes thirteen outer grooves 1534 and two inner grooves 1536. Each of the grooves is in fluid communication with a vacuum gland 1538 that is in fluid communication with a vacuum port 1540. Each groove is about 0.040 inches wide. The outermost groove 1542 is about 0.3 inches from the chuck's edge. The innermost groove 1544 is about 0.383 inches from the centerline of the chuck 1530. Each groove is separated from a neighboring groove by about 0.120 inches, except that the innermost outer groove 1546 is separated from the outermost inner groove 1548 by about 0.337 inches. (All separations are measured centerline to centerline.) The production dimensions of a preferred chuck 1530 are shown in FIG. 15C, and the sizes of those dimensions are shown in Table 11 measured in inches.

TABLE 11

| dimension | size |
|---|---|
| A | 0.34 |
| B | 0.3 |
| C | 90° |
| D | 0.312 |
| E | 5.164 |
| F | 0.35 |
| G | 0.165 |
| H | 0.09 |
| I | 0.605 |
| J | 60° |
| K | 0.196 |
| L | 4.276 |
| M | 4.940 |
| N | 0.1 |
| O | 60° |

Projection 1550 is sized to receive a cure chuck arbor 1554 (see FIGS. 15D–E) and recess 1552 is shaped to receive the cure chuck lifting assembly 1560 (see FIGS. F–H and the post-cooling devices 1800 (see FIG. 18A).

Figure 15A:
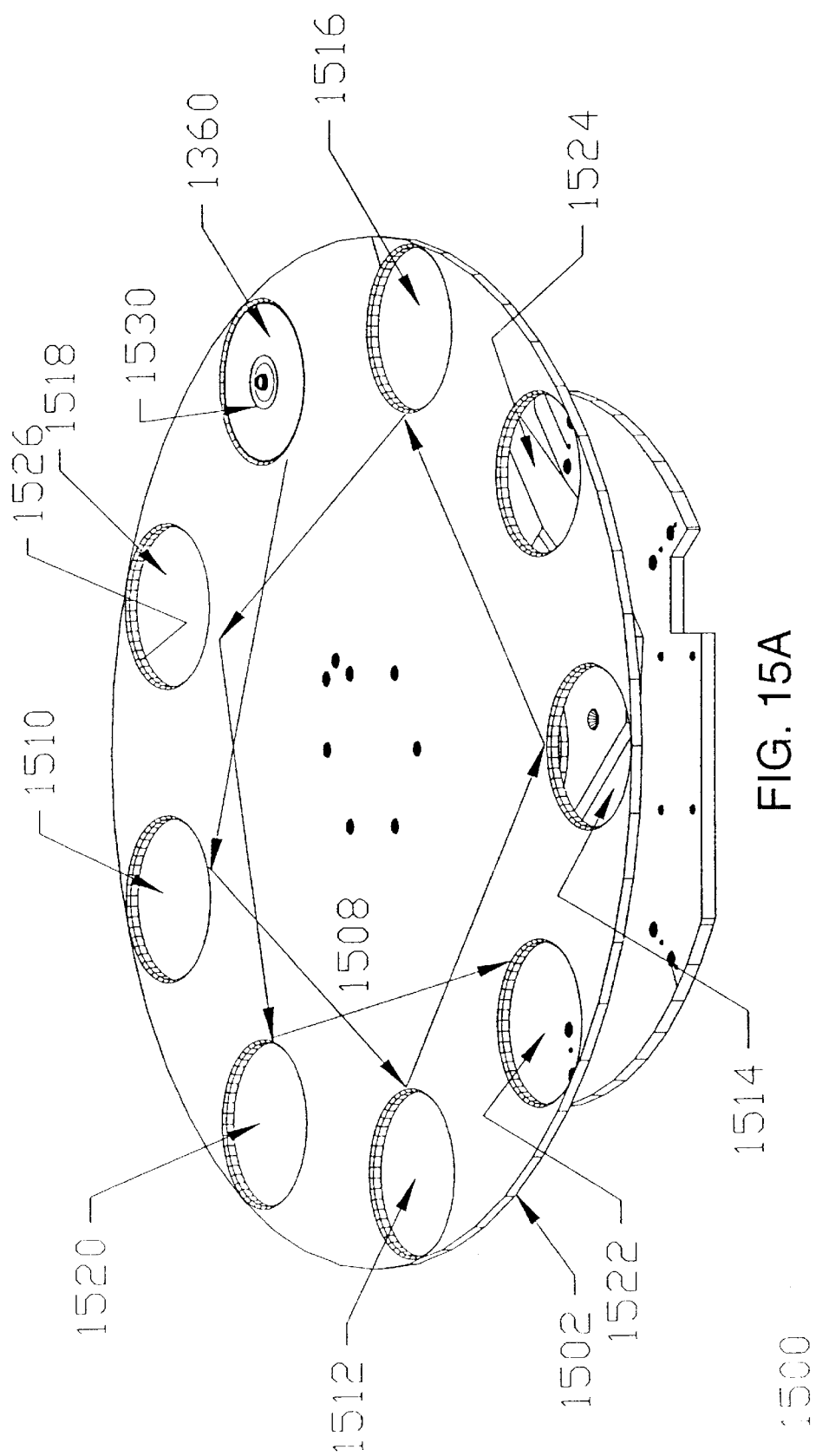
Figure 15D:
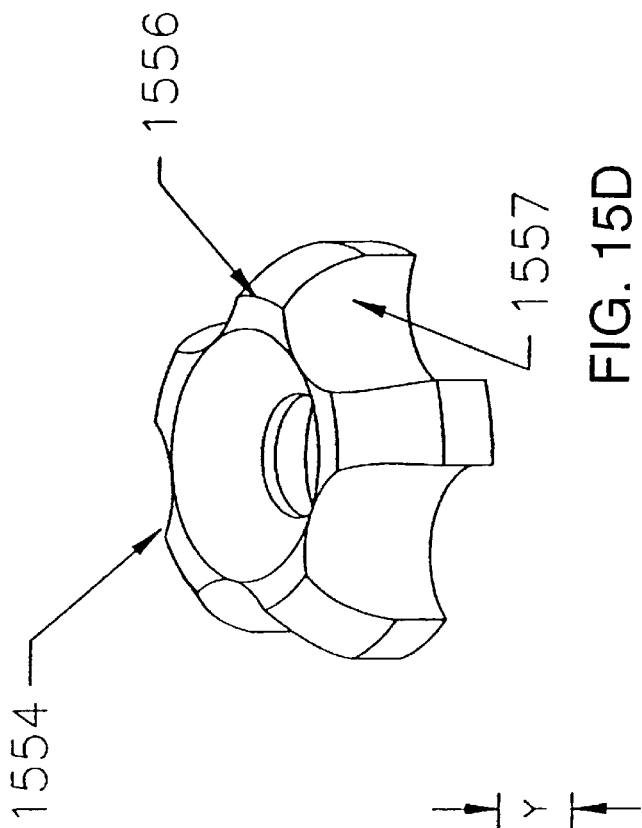
Figure 15E:
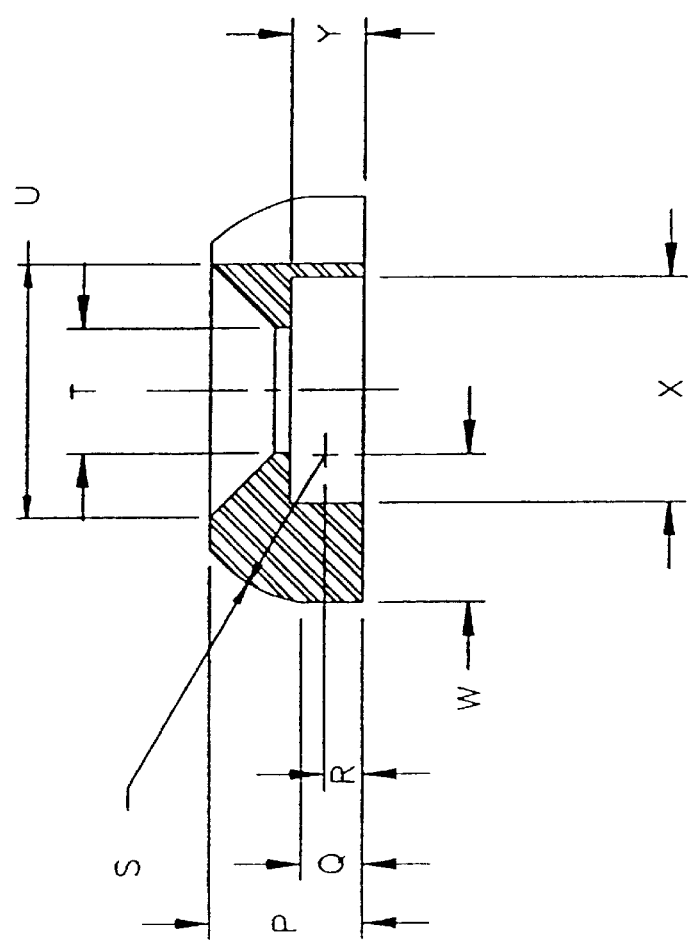

The structure of cure chuck arbor 1554 is shown in FIGS. 15D–E in perspective and cross-section views. The arbor is preferably made of hardened and polished tool steel that is electro-less nickel plated. The shape of the arbor 1554 forms a concentricity constrain together with the spring-loaded pick head 1324 (FIG. 13B) of the spin robot 1302. The arbor includes five equally spaced projections 1556 defined by cutaways 1157 having a radius of curvature of R.125. FIG.

15E shows the production dimensions of a preferred chuck arbor 1554, and the sizes of those dimensions are shown in Table 12 measured in inches. The recessed shape of arbor 1554 lessens the surface area of the arbor that could potentially become contaminated with resin.

TABLE 12

| dimension | size |
|---|---|
| P | 0.211 |
| Q | .083 |
| R | .052 |
| S | R.206 |
| T | 0.173 |
| U | 0.35 × 45° |
| V | 0.1 |
| W | 0.204 |
| X | 0.313 |

Figure 15F:
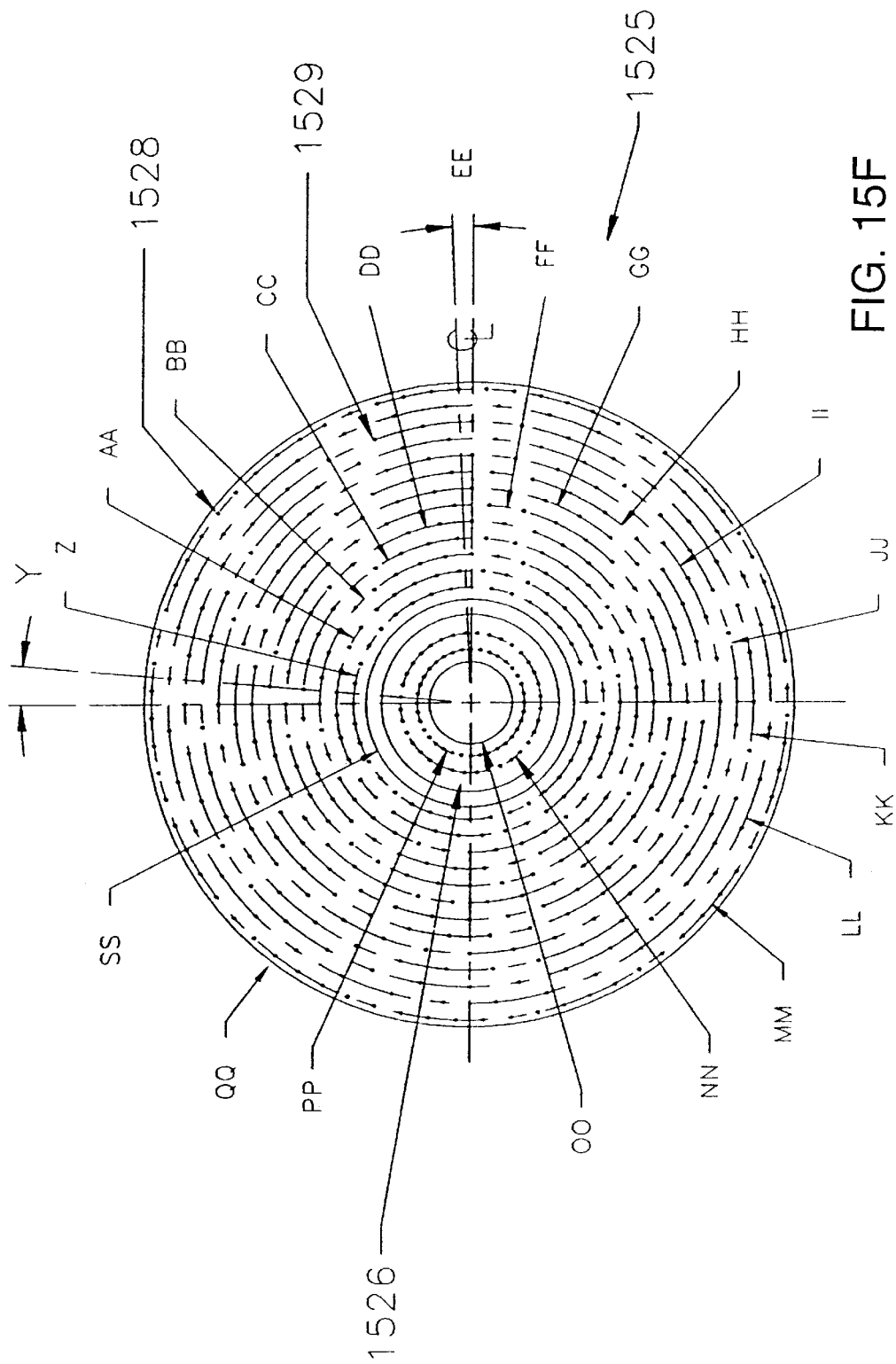

A two-piece cure pad 1525 (see FIG. 15F) having outer piece 1527 and inner piece 1526 is placed over each chuck 1554 to distribute the vacuum supplied by port 1540 during the curing operation. A preferred pad 1525 is made of 0.0375 inch U.V. rubber (durometer value of 65) with pressure sensitive adhesive. FIG. 15F shows the production dimensions of a preferred pad, and Table 13 shows the size of those dimensions measured in inches (all measurements except Y and EE are radius measures).

TABLE 13

| dimension | size |
|---|---|
| Y | 5° |
| Z | 1.68 |
| AA | 1.92 |
| BB | 2.16 |
| CC | 2.4 |
| DD | 2.64 |
| EE | 2.5° |
| FF | 2.88 |
| GG | 3.12 |
| HH | 3.36 |
| II | 3.6 |
| JJ | 3.84 |
| KK | 4.08 |
| LL | 4.34 |
| MM | 4.56 |
| NN | 1.01 |
| OO | 0.593 |
| PP | 0.77 |
| QQ | 4.66 |
| RR | 1.28 |
| SS | 1.5 |

Ring 1528, unlike all other rings of both pieces 1526 and 1527, has its holes spaced 5° apart. All other rings, e.g., 1529, have their holes spaced 10° apart. Each hole is 0.025 inch diameter. The distribution of vacuum holes has been observed to effectively hold the combination during the curing process while minimizing dimpling and waffling effects while combatting warping forces and providing thermal stability.

Figure 15G:
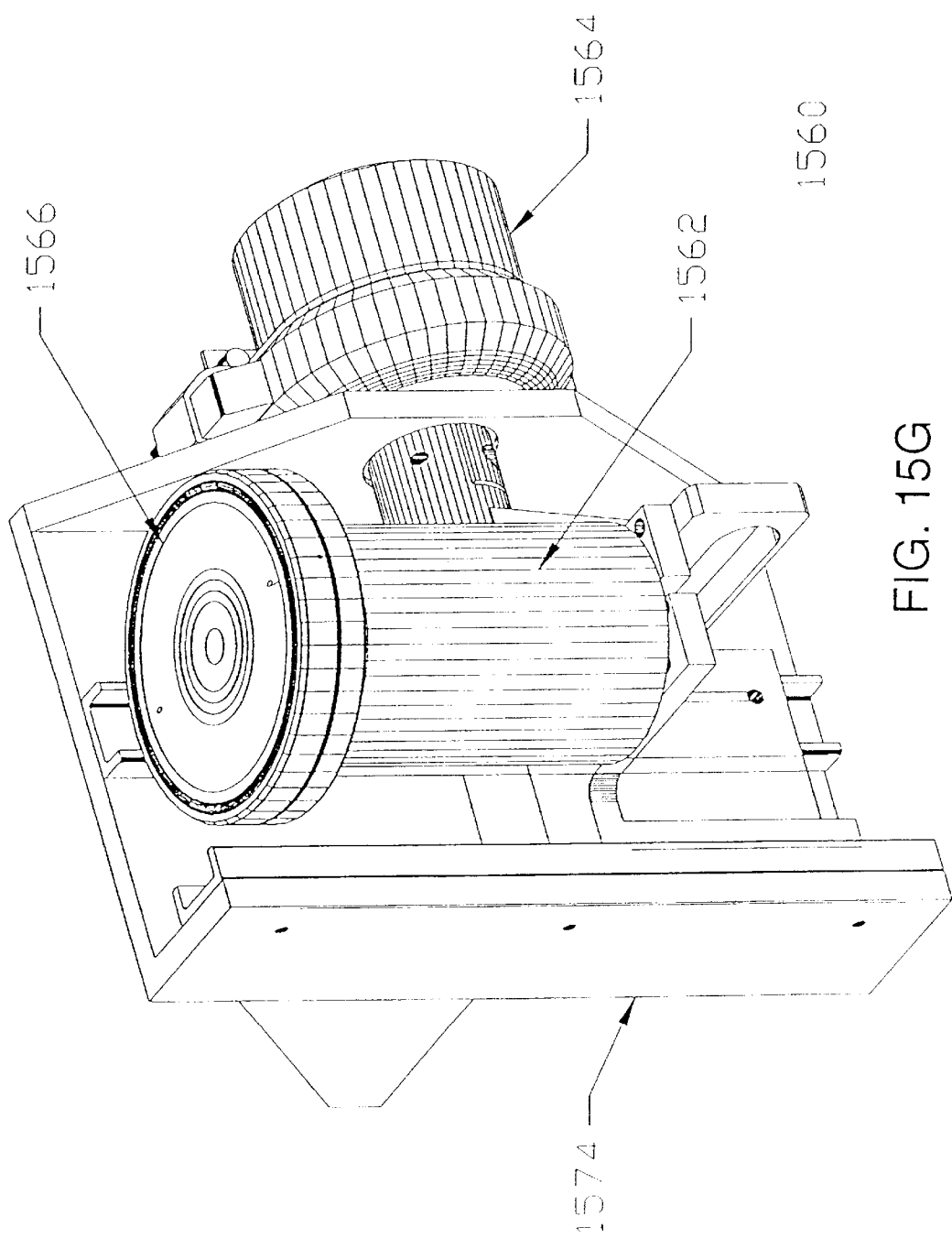
Figure 15H:
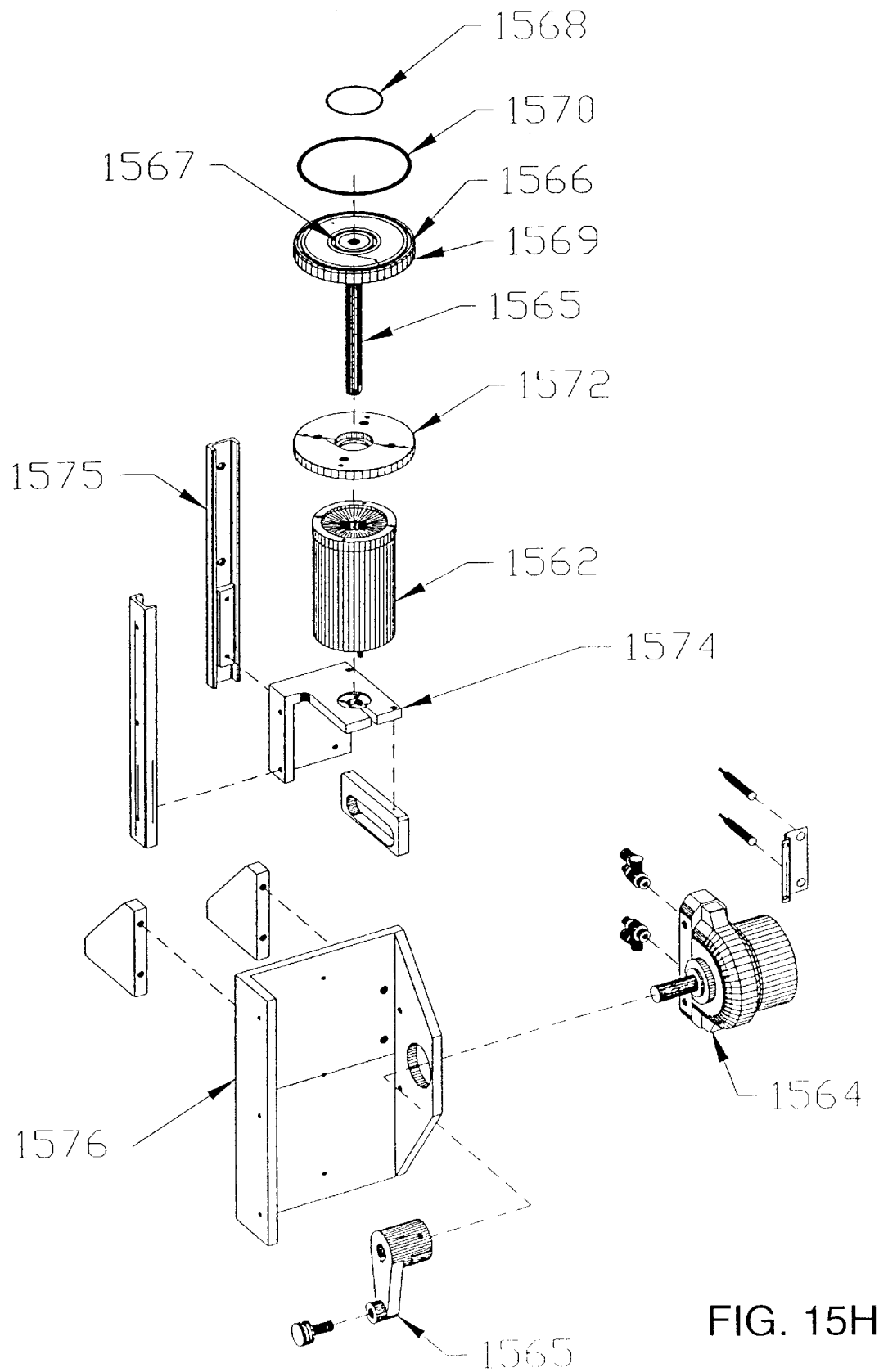

The structure of cure chuck lifting assembly 1560 is shown in FIGS. 15G–H in perspective and cross-section views. Lifting assembly 1560 is mounted below and in vertical alignment with index 1514 so that lifter head 1566, under programmatic control, may be raised to engage recess 1552 and vacuum grab chuck 1530 to both hold chuck 1530 and to provide vacuum to port 1540 so that the chuck may hold the combination. Under a preferred embodiment, 850 mbar (max) of vacuum is applied to hold the chuck and the combination.

More specifically, head 1566 has a vacuum gland extending through its shaft 1565 that is connected to a vacuum supply (not shown). A top surface of head 1566 includes an annular chamber 1569 for holding an outer diameter o-ring 1570 and an annular chamber 1567 for holding an inner diameter o-ring 1568. The o-rings are used to help seal vacuum within recess 1552 of chuck 1530 and to assist with any deflection of the chuck resulting from the application of vacuum. The head 1566 is bolted to plate 1572 which is bolted to servo 1562 (part no. M-JS0002FN001 available from NSK). Servo 1562 is attached to mount 1574 having vertical guides 1575 mounted within fixed mount 1576. The mount 1574 may be raised or lowered within guides 1575, under programmatic control, by cam 1565 and rotary actuator 1564 (part no. 11912/DSR-32-180-P available from Festo).

c. Pre-Cooling Device

The structure of the pre-cooling device 1600 is shown in FIGS. 16A–D in perspective and exploded views. Pre-cooling device is mounted above and in vertical alignment with cure index 1512. The device 1600 is caused to blow turbulent cool air preferably at about 35–600° F. and at about 1–5 cfm onto a combination one double-step before the combination is subjected to the curing process. The pre-cooling will cause a top surface of the top substrate of a combination to have a lower temperature than a bottom substrate and thus cause the combination to shrink accordingly from the shrinkage induced in the top substrate. This shrinkage is designed to roughly match the inverse of the warping that results from the curing process. In short, the curing process will cause the top substrate to heat and thus expand. Without more, the curing and subsequent cooling would cause the combination to warp concave us. But, with the pre-cooling this effect is reduced by effectively pre-shrinking the combination, before the resin is cured.

Pre-cooling device 1600 includes a stand 1602 holding a vortex tube 1604 (part no. 3440 available from ExAir) to generate cool air and cone 1606 to distribute cool air. The cone 1606 and tube 1604 are connected by supply hose 1605. The cone 1606 contains a baffle 1608 on its underside to move flow distribution away from the center of the disk. The production dimensions of a preferred cone 1606 and baffle 1608 are shown in FIGS. 16B–D, and the sizes of the dimensions are shown in table 14.

TABLE 14

| dimension | size |
|---|---|
| A | 1.403 |
| B | 1.0 |
| C | 0.578 |
| D | 1.5 |
| E | 30° |
| F | 4.724 |
| G | 0.128 |
| H | 0.047 |
| I | 0.094 |
| J | 0.578 |
| K | 0.25 |
| L | 5.274 |
| M | 0.578 | d. Lamp Assembly

The structure of the lamp assembly 1700 is shown in FIGS. 17A–B in perspective and cross-section views. The lamp assembly 1700 is positioned above and in vertical alignment with cure index 1514 so that the lifting assembly 1560 may raise a vacuum-grabbed combination into the assembly 1700.

The assembly 1700 includes a stand 1702 holding a nest 1703 having a first angled surface 1716 for mounting a first UV lamp 1704 and a second angled surface 1714 for mounting a second lamp 1706. A liquid-cooled tunnel 1708 is positioned above index 1514 and receives the combination to be cured. To filter IR radiation caused by the lamps 1704 and 1706, a first dichroic filter 1712 is positioned at an angle relative to lamp 1704 and a second dichroic filter 1710 is positioned at an angle relative to lamp 1706

The cure lamps 1704 and 1706 are preferably F300 lamps available from Fusion, Inc. with 'D' type bulbs. The bulbs from these lamps are normal to the Figure and emit a beam of light toward the combination, which is parallel to the top of tunnel 1708, toward the outer diameter of the inner mirror band of the combination. The first and second angled surfaces 1716 and 1714 of nest 1703 hold the lamps 1704 and 1706 to have a target distance of 3.125 inches and an angle of incidence of 30°. The lamps hold the bulbs approximately 2.1 inches from the face of the lamp and have elliptical reflectors arranged around the bulbs.

Angle 1720 is preferably maximized provided that the above target distance and angle of incidence are substantially maintained. With currently-available lamps 1704 and 1706, this angle.is about 30°. The filters 1710 and 1712 are diachrilic cold reflectors and IR hot reflectors (part no. 526451 available from Fusion).

Figure 17D:
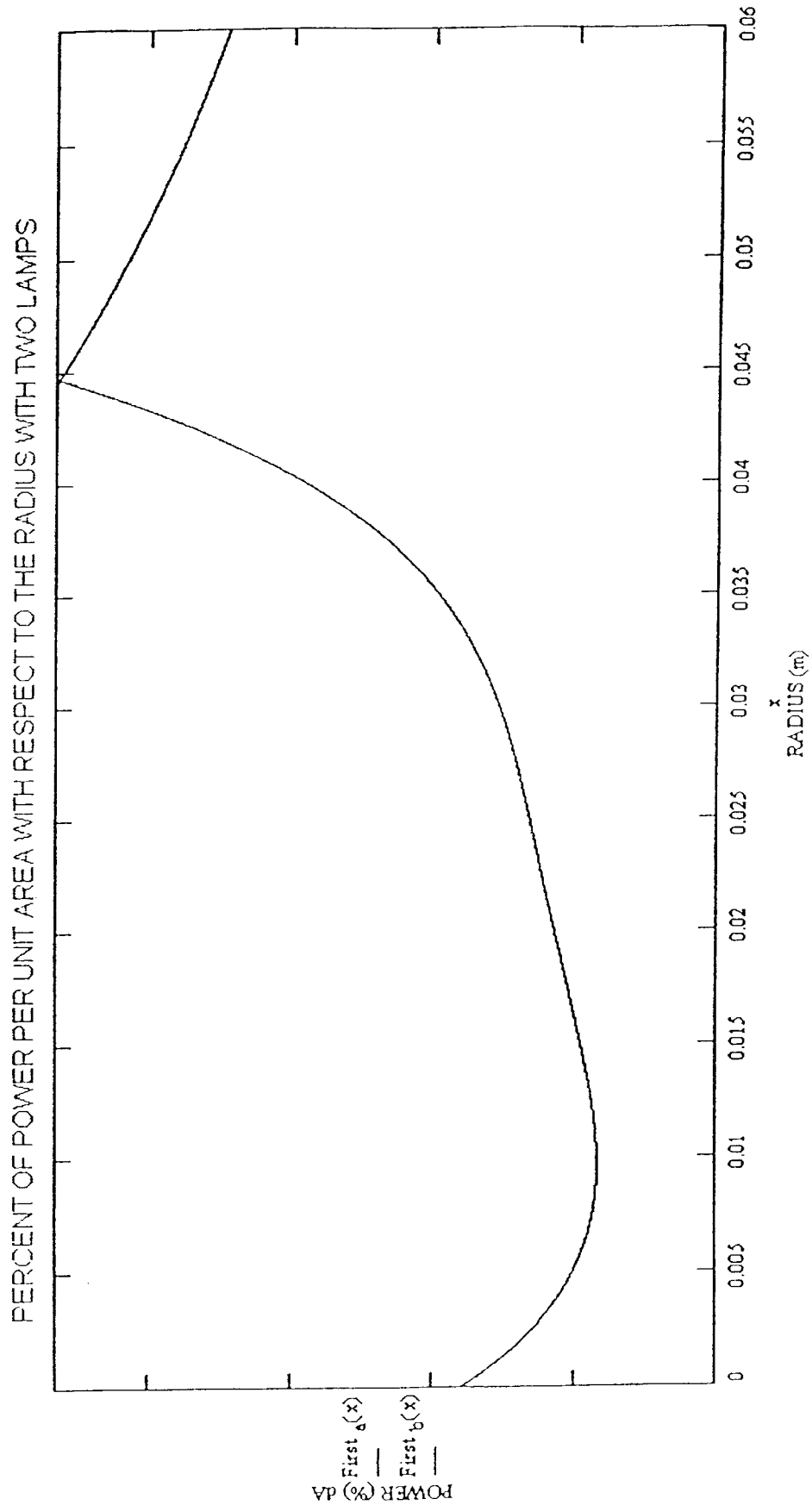

FIG. 17C shows the positioning of the lamps. FIG. 17D shows the light pattern resulting from the superimposed beams, in particular the percentage of light relative to the position on the substrate. As can be seen the light pattern is essentially flat across the entire area of interest. The angled light effectively directs the UV light at the sides of the metallized pits. These metallized pits have been found to have most of their reflective or semi-reflective material on the top of the pits and less material on the sides of the pits. Thus, by directing the light at the desired angle a much larger portion of the emitted UV light is transmitted through the metal into the space between the substrates where it can cure the resin-and much less is reflected by the combination's metallized surface. Thus, UV energy is more efficiently transmitted to the bond resin resulting in less thermal stressing of the combination. Cooler combinations, in turn, reduce warping which otherwise occurs as a result of the thermal gradient between upper and lower substrates as described above. In contrast to conventional techniques which emit UV light normal to the surface of the combination, the preferred arrangement allows for lower intensity UV curing.

The tunnel 1708 is formed from cooper cylinder with coiled tubing silver soldered to it. The assembly is painted with black high temperature enamel and carries water at approximately 10–15° C. The tunnel is approximately 4 inches high and helps maintain a stable air temperature within cure station.

During the cure operation the combination is rotated by lifting assembly 1560 at an angular velocity of between 200–400 rpm.

The combination is subjected to the lamp energy for a predetermined time. Under a preferred embodiment that uses the Quretech resin identified above, the combination is subjected to light for 2.5 seconds for DVD5 disks, 3 seconds for DVD9 disks, and 3.5 seconds for DVD10.

The combination is raised and simultaneously rotated through tunnel 1708 so that the UV light emitted from lamps 1704 and 1706 has an effect as if the combination was suddenly flooded with light, rather than gradually exposed to increasing intensity of light.

e. Post Cooling Device

Figure 18:
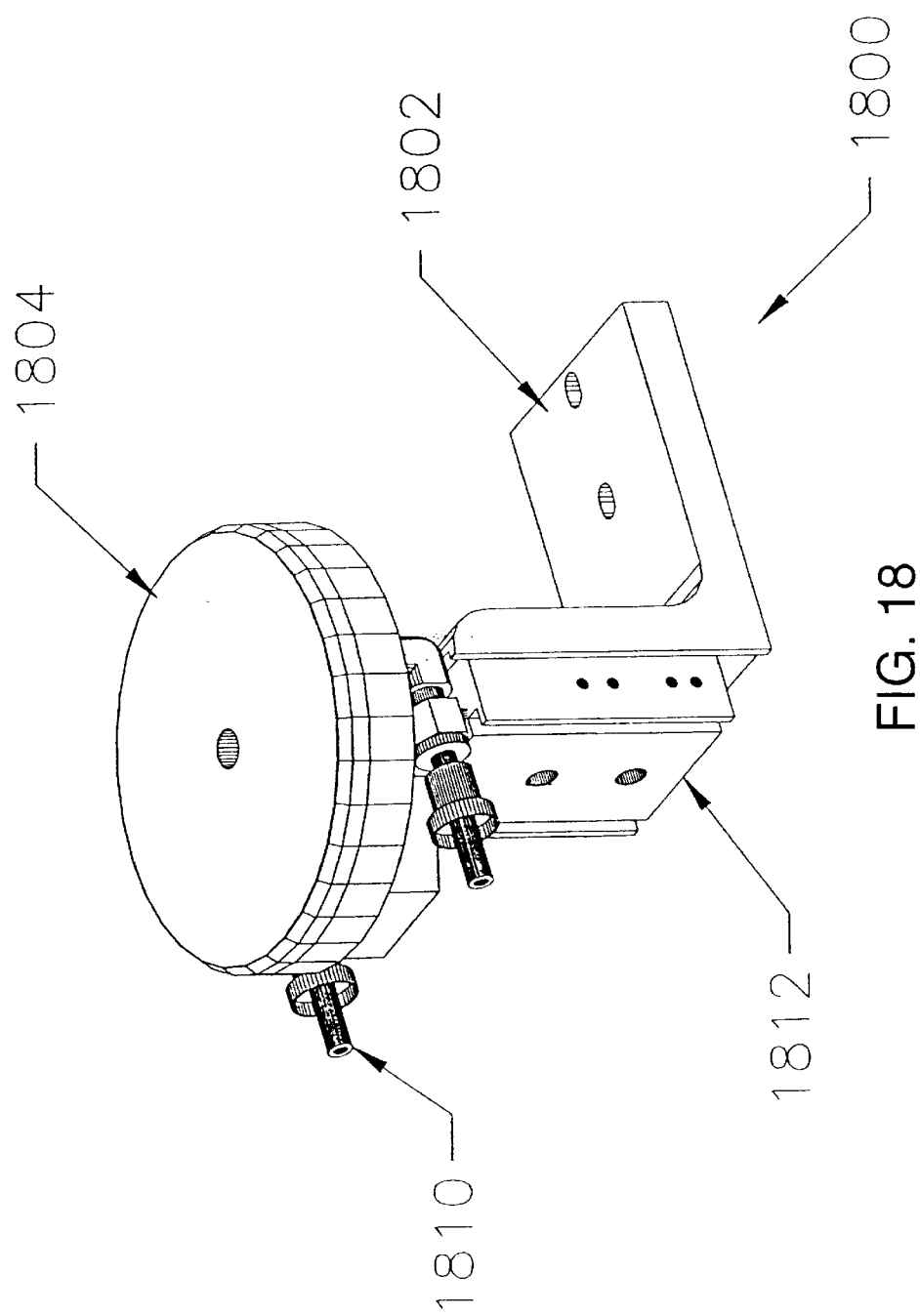
FIGS. 18 show an exemplary post-cooling device.

The structure of the post cooling device 1800 is shown in FIGS. 18 in perspective view. A post cooling device is positioned under indexes 1516, 1518, and 1520 to help cool the cure chuck 1530 after it has been heated as a result of the curing operation.

More specifically, post cooling device 1800 includes a liquid cooled chuck 1802 having a top plate 1804 mounted and sealed to a housing. Housing receives water at about 10–15° C. from supply lines 1810. The housing is mounted to vertical actuator 1812 (part no. CXSL15–10 available from SMC) which is attached to mount 1822. Actuator 1812 under programmatic control may be caused to raised the chuck 1802 into contact with recess 1552 of cure chuck 1530.

Post-cooling facilitates testing in that any scanning operations or the like are performed on disks at approximately room temperature.

9. OTHER EMBODIMENTS

The above embodiment focused on a preferred low power curing system. Many of the combinations of processing parameters may yield desirable results.

The above embodiment focused on one exemplary in-line system. The actual arrangement was influenced by the economics of various stations. For example, the metallizer and molding machines are the most expensive stations and thus the remainder of the construction was largely influenced with a goal of keeping those stations busy. Thus higher or lower degrees of interleaving of other stations, e.g., dispense, are clearly within the ambit of the invention.

Moreover, there is a wide degree of flexibility and choice in the various handling mechanisms and robots, though certain aspects thereof are believed to be particularly novel, e.g., concentricity constraint.

In an exemplary embodiment, the top substrates of DVD5 format are not presented to the metallizer. Under alternative embodiments, the top substrate is presented to the metallizer but the metallizer is not energized to sputter that substrate.

One described embodiment pre-shrinks the top substrate in anticipation of its subsequent expansion during the curing operation. Alternatively, the bottom substrate could have been pre-expanded.

The described embodiments focused on a two lamp arrangement but the above teachings also apply to other arrangements including those with more or less lamps and different types of lamps.

Likewise, even for the two lamp arrangements various sub-arrangements may be desirable. As described above, the lamps may be arranged so that the superimposed pattern is desirable, though the pattern from a single one of the lamps may be less than desirable. Besides the above embodiment, for example, arrangements in which the lamps have a target distance of 4.1 inches are believed to be desirable, among others. Likewise, variations in the angles may be desirable.

The process parameters may be adjusted by the user. These parameters include, but are not limited to, the amount of metallization, the positioning of the metallization, the positioning of the resin needle, the angular velocity of the disks while resin is dispensed, the pressure and temperature of resin, the index interval, and the spin profile. Users may adjust these parameters to respond to observations made on the manufactured DVDs. For example, if the resin layer is thicker than desired one approach would be to increase the angular velocity of the combination during resin dispensing. Likewise the parameters may be adjusted based on process materials, such as the resin type used.

The preferred embodiment was described with reference to event-based control but other mechanisms could be substituted.

Certain conventions were carried throughout the description portion, e.g., top and bottom substrate, the meaning of "vacuum" etc. It should be understood that those conventions were intended to aid clarity of the detailed description and not to be definitions of those terms limiting the scope of the following claims.

Having described an exemplary embodiment, it should be apparent to persons of ordinary skill in the art that changes may be made to the embodiment described without departing from the spirit and scope of the invention.

What is claimed is:

1. A system for curing a combination of a top and a bottom substrate with a resin disposed in-between, comprising:

a cure platform including a plurality of chucks on which individuals combinations rest;

a cure device for curing the resin;

the cure platform including a thermally controllable chuck on which the combination rests and means to cool the chuck after operation of the cure device.

2. The system of claim 1 including a controller to cause the thermally controllable chuck to cool after operation of the cure device.

3. The system of claim 1 wherein the thermally controllable chuck is liquid cooled.

4. A method of curing a combination of a top and a bottom substrate with a resin disposed in-between, comprising the acts of:

resting the combination on a chuck positioned in a cure platform, wherein the cure platform includes a plurality of chucks on which individual combination rest;

curing the resin;

thermally controlling the chuck by cooling the chuck after curing the resin.

* * * * *